(12) United States Patent
Levesque et al.

(10) Patent No.: US 12,325,646 B2
(45) Date of Patent: Jun. 10, 2025

(54) FERTIGATION WATER TREATMENT

(71) Applicant: UNIVERSITY OF GUELPH, Guelph (CA)

(72) Inventors: Serge Levesque, Guelph (CA); Thomas Graham, Guelph (CA); Dorin Bejan, Guelph (CA); Jamie Lawson, Guelph (CA); Mike Dixon, Guelph (CA); Ping Zhang, Guelph (CA)

(73) Assignee: UNIVERSITY OF GUELPH (CA)

( * ) Notice: Subject to any disclaimer, the term of this patent is extended or adjusted under 35 U.S.C. 154(b) by 570 days.

(21) Appl. No.: 17/609,549

(22) PCT Filed: May 8, 2020

(86) PCT No.: PCT/CA2020/050634
§ 371 (c)(1),
(2) Date: Nov. 8, 2021

(87) PCT Pub. No.: WO2020/223824
PCT Pub. Date: Nov. 12, 2020

(65) Prior Publication Data
US 2022/0234916 A1   Jul. 28, 2022

Related U.S. Application Data

(60) Provisional application No. 62/891,398, filed on Aug. 25, 2019, provisional application No. 62/845,302, filed on May 8, 2019.

(51) Int. Cl.
C02F 1/46       (2023.01)
C02F 1/461      (2023.01)
(Continued)

(52) U.S. Cl.
CPC ........ *C02F 1/4672* (2013.01); *C02F 1/46109* (2013.01); *C05C 3/00* (2013.01);
(Continued)

(58) Field of Classification Search
CPC ...... C02F 1/46; C02F 1/32; C02F 1/48; C02F 1/42; C02F 1/72; A01C 23/042; Y02P 60/21; Y02W 10/37
See application file for complete search history.

(56) References Cited

U.S. PATENT DOCUMENTS

2003/0178373 A1    9/2003  Kondo et al.
2020/0147553 A1*   5/2020  James ................. C02F 1/441

FOREIGN PATENT DOCUMENTS

WO    WO-2006061192 A1 *  6/2006  ............ C02F 1/4672

OTHER PUBLICATIONS

WO-2006061192-A1—Translation (Year: 2006).*
(Continued)

*Primary Examiner* — Chester T Barry
(74) *Attorney, Agent, or Firm* — Jason A. Smith; Shumaker, Loop & Kendrick, LLP

(57) ABSTRACT

Methods and systems for in situ electrochemical treatment of aqueous solutions used in agricultural systems, community systems and industrial systems. In aspects, is an in situ electrochemical method for the treatment of fertigation water, comprising: flowing the fertigation water through an electrochemical cell comprising at least one anode and at least one complementary cathode while simultaneously adjusting one or more of current density, flow rate and pH, wherein said flowing fertigation water contacts the anode and cathode causing one or more of: degradation of a recalcitrant organic contaminant, mineralization and solubilization of an organic, forming a disinfection agent against a pathogen, and maintaining nutrient levels in said fertigation water; and collecting treated effluent.

19 Claims, 40 Drawing Sheets

(51) Int. Cl.
    *C02F 1/467*     (2023.01)
    *C05C 3/00*     (2006.01)
    *C05C 5/00*     (2006.01)
    *A01G 31/02*     (2006.01)
    *C02F 101/30*     (2006.01)

(52) U.S. Cl.
    CPC .............. *C05C 5/00* (2013.01); *A01G 31/065* (2025.01); *C02F 2001/46147* (2013.01); *C02F 2101/306* (2013.01); *C02F 2201/4614* (2013.01); *C02F 2201/46145* (2013.01); *C02F 2201/46185* (2013.01); *C02F 2209/06* (2013.01); *C02F 2209/40* (2013.01); *C02F 2301/046* (2013.01); *C02F 2303/04* (2013.01)

(56) References Cited

OTHER PUBLICATIONS

Serge Lévesque, "Comparative Analyses of Conventional and Novel Water Treatment Technologies for Recirculating Greenhouse Fertigation Solutions", Sep. 1, 2019 (Sep. 1, 2019), [online] [retrieved on Jul. 7, 2020 (Jul. 7, 2020)]. Retrieved from the Internet: <https://atrium.lib.uoguelph.ca/xmlui/handle/10214/17460>.

Lévesque et al., "Inactivation of Rhizoctonia solani in fertigation water using regenerative in situ electrochemical hypochlorination". Scientific Reports, Oct. 2, 2019 (Oct. 2, 2019), vol. 9, 14237, [online] [retrieved on Jul. 7, 2020 (Jul. 7, 2020)]. Retrieved from the Internet: <https://doi.org/10.1038/s41598-019-50600-7>.

Lévesque et al., "An electrochemical Advanced Oxidation Process (EAOP) for the Inactivation of Rhizoctonia solani in Fertigation Solutions". Canadian Journal of Plant Science, Feb. 28, 2020 (Feb. 28, 2020), [online] [retrieved on Jul. 7, 2020 (Jul. 7, 2020)]. Retrieved from the Internet: <https://doi.org/10.1139/cjps-2019-0241>.

Lévesque et al., "Electrochemical advanced oxidation process (EAOP) system efficacy in managing greenhouse pathogens Fusarium oxysporum and Rhizoctonia solani". Ontario Pest Management Conference, Nov. 2, 2017 (Nov. 2, 2017), [online] [retrieved on Jul. 7, 2020)]. Retrieved from the Internet: <https://www.opmconference.ca/programs/2017_OPMC_Program.pdf>.

Serge Lévesque, "The Research Seminar Presentation by Serge Levesque" University of Guelph School of Environmental Sciences, Mar. 6, 2018 (Mar. 6, 2018), [online] [retrieved on Jul. 7, 2020)]. Retrieved from the Internet: <https://ses.uoguelph.ca/sites/default/filters/Serge%20Levesque%20ENVS6900%20Seminar%20announcement.pdf>.

Lèvesque et al., "Inactiviation of Rhizoctonia solani in irrigation water using regenerative in situ electrochemnical hypochlorination". Ontario Pest Management Conference, Nov. 6, 2018 (Nov. 6, 2018), [online] [retrieved on Jul. 7, 2020 (Jul. 7, 2020)]. Retrieved from the Internet: <https://www.opmconference.ca/posters/2018OPMCProgramFinalOct11.pdf>.

Levesque et al. "Pathogen Inactivation by Electrochemical Disinfection for Recirculating Hydroponic Irrigation Systems". Ontario fruits and vegetables conference, Feb. 20, 2019 (Feb. 20, 2019), [online] [retrieved on Jul. 7, 2020 (Jul. 7, 2020)].

Lévesque et al., "Controlling Pathogens and Chemical Contaminants in Greenhouse Irrigation Water through Electrochemical Processes". Rural Review Ontario Rual Planning Development, and Policy, Mar. 13, 2019 (Mar. 13, 2019), vol. 3 (1), [online] [retrieved on Jul. 7, 2020 (Jul. 7, 2020)]. Retrieved from the Internet: <https://doi.org/10.21083/ruralreview.v3il.6010>.

International Search Report for PCT/CA2020/050634 mailed Aug. 4, 2020 (5 pgs).

Written Opinion for PCT/CA2020/050634 mailed Aug. 4, 2020 (5 pgs).

\* cited by examiner

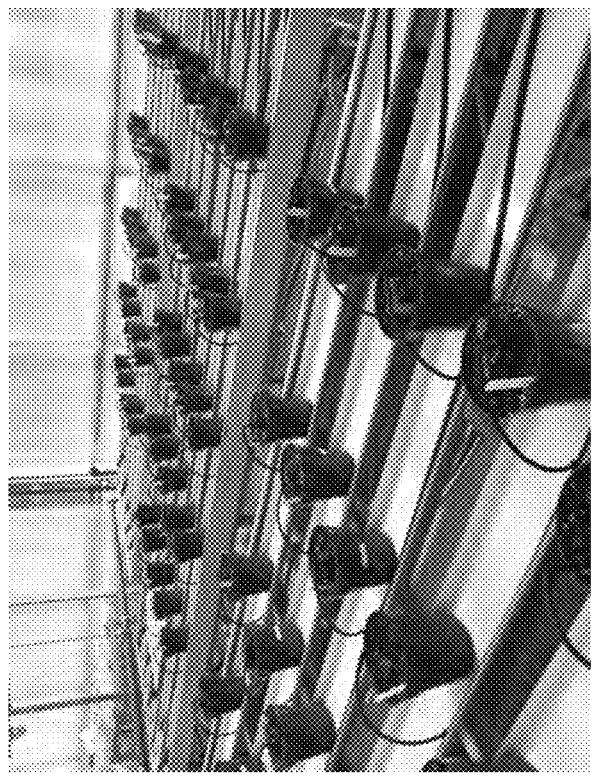
FIG. 21
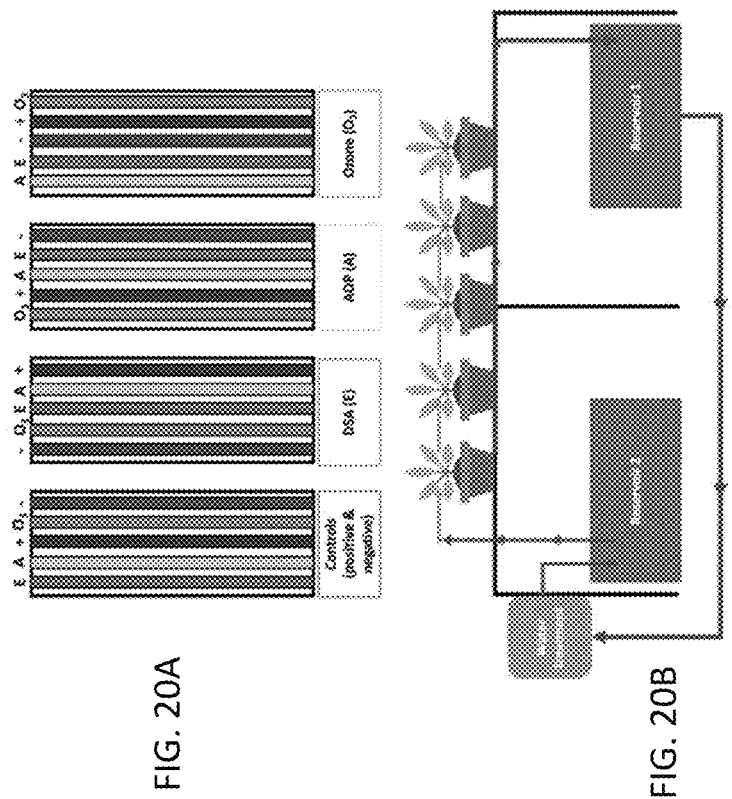
FIG. 20A
FIG. 20B

|   | 1 | 2 | 3 | 4 | 5 | 6 |
|---|---|---|---|---|---|---|
| A | 71.65 | 71.68 | 77.53 | 77.77 | 67.37 | |
| B | 69.79 | 80.1 | 87.55 | 87.89 | 79.57 | 67.59 |
| C | 75.49 | 87.49 | 96.25 | 95.18 | 85.36 | 72.79 |
| D | 79.2 | 91.81 | 100.1 | 100.2 | 89.46 | 75.99 |
| E | 75.59 | 88.52 | 96.45 | 97.22 | 85.76 | 72.34 |
| F | 70.13 | 78.35 | 86.34 | 88.25 | 79.55 | 65.91 |

85:10:5 Red:Blue:White

FERTIGATION WATER TREATMENT

FIELD

The present disclosure generally relates to the field of water treatment. More particularly, but not limited to, the in situ electrochemical treatment of aqueous solutions used in and/or derived from agricultural systems, community systems and industrial systems. In aspects, in situ electrochemical treatment of aqueous nutrient solutions for use in agricultural systems inclusive of controlled environment agricultural systems.

BACKGROUND

Controlled Environment Agriculture ("CEA") is an agricultural technology that enables the grower to manipulate a crop's environment to desired conditions for more sustainable food production allowing for the production of crops year-round. Controlled conditions may include light, carbon dioxide, temperature, humidity, water, pH levels and nutrients. CEA allows for local crop growth and includes for example greenhouse, hydroponics, aquaculture, and aquaponics and can be used both for food crops and non-food crops. CEA may also be used by researchers to study production of a desired plant in a maintained setting to obtain data for scientific study.

Current technologies to address water quality concerns in CEA include filtration, heat, ultraviolet radiation, ozone, hydrogen peroxide and chlorination, with each having drawbacks. For example, chlorination requires continuous addition of free chlorine to maintain disinfection targets which is problematic in terms of cost of free chlorine, the handling/management systems, worker safety handling hazardous chlorine-based disinfectants, and accumulation of toxic levels of chloride salts caused by the continuous addition of free chlorine.

There remains a need for making and delivering safe and healthier water sources used in agricultural, community and industrial water systems and in aspects safer sustainable fertigation water for CEA operators for crop security.

The discussion of the background herein is included to explain the context of the inventions described herein. This is not to be taken as an admission that any of the material referred to was published, known, or part of the common general knowledge as of the priority date of any of the claims.

SUMMARY

Herein described are electrochemically treated aqueous solutions for use in agricultural, community and industrial water systems.

Herein described is an electrochemically treated aqueous solution derived/made from agricultural, community and/or industrial sources.

Herein described is a safe and sustainable electrochemically treated fertigation water source for use in agricultural systems, such as Controlled Environment Agriculture (CEA), that help to increase crop security and reduce the amount of use, thus reliance on, of chemical fertilizers.

Herein described are stable nutrient solutions made by in situ electrochemical treatment. The nutrient solutions (a fertigation water) provide a stable source of nutrients to plants during plant irrigation. The nutrient solutions are recycled within an irrigation system and during the recycling can be further electrochemically re-treated or continuously electrochemically re-treated within the irrigation system during the entire course of plant growth and maintenance. The in situ electrochemical treatment methods of the invention maintain a stable nutrient source for plants in the fertigation water, disinfect pathogens in the fertigation water, degrade undesired contaminants such as pesticides in the fertigation water, and mineralize any organic components to release inorganic ions solubilized in the fertigation water for uptake by plants. The in situ electrochemical treatment methods of the invention can maintain stable free chlorine concentrations below phytotoxic thresholds.

Herein described are in situ electrochemical treatment methods to make stable and sustainable nutrient solutions, in aspects inorganic or organic, for use as recyclable fertigation water for crops in CEA.

Herein described is a method to treat organic waste, the method comprising in situ electrochemical treatment of an organic waste solution to mineralize organic components therein to release soluble inorganic ions. The treated organic waste solution can be used as a fertigation water for crops in CEA in both soil and hydroponic systems.

Herein described are in situ electrochemical treatment methods to degrade agrichemical contaminants in fertigation water.

Herein described are in situ electrochemical treatment methods for degradation and solubilization of nutrients comprising for example one or more of nitrate, sulphate, ammonium, phosphate and calcium ions from organic waste materials such as but not limited to compost, bone meal, soya meal, manure and inedible biomass from plant production systems.

Herein described are in situ electrochemical treatment methods for mineralization of organic fertilizer solutions.

Herein described are in situ electrochemical treatment methods for recirculating nutrient solutions in CEA. In aspects for commercial floriculture production comprising plants propagated in soil.

Herein described is an in situ electrochemical treatment method for treating circulating nutrient solutions in hydroponic CEA.

Herein described are in situ electrochemical treatment methods to degrade recalcitrant organic pollutant contaminants found in aqueous solutions from community or industrial water sources such as for example municipal water, waste water and post-treatment outflow water. In aspects the organics are pesticides. The in situ electrochemical treatment methods of the invention can be used in conjunction with currently used water treatment and sewage treatment methods and facilities. The in situ electrochemical treatment methods can be incorporated to after conventional water treatment and after conventional sewage treatment.

The invention provides methods and systems for delivering crop security for CEA operators using fertigation water through the effective management of potential pathogen threats, chemical contaminant control, degradation of recalcitrant organic pollutants, and for more effective utilization of nutrients in the fertigation water for crop growth.

Fertigation is a process in which fertilizer is dissolved and distributed via the irrigation water ("fertigation water" or "fertigation solution" or "nutrient solution" are interchangeable). Herein provided are methods and systems of making and using secure "healthy" fertigation water. The invention overcomes the threats of using and re-cycling fertigation water with respect to pathogen distribution and proliferation resulting from the use of contaminated sources, the accumulation of phytotoxic chemical contaminants and/or organic pollutants under a water recycling protocol, the potential of nutrient imbalances that may occur in recirculated water, and contamination by pesticides.

The invention also provides methods and systems for delivering water security for community and industrial water systems. For example, municipal water sources, commercial water sources, wastewater and post-treatment outflow water can be treated using the in situ electrochemical methods and systems described herein. In aspects, a chloride containing water supply may be treated in accordance with methods of the invention to dechlorinate. This may be used in conjunction with post UV treatment.

A contaminant as referred to herein, is generally any polluting substance harmful (toxic) to the environment and living organisms such as animals, birds and humans. A contaminant in an aspect is an agrichemical, a chemical used in agriculture such as a pesticide. In a further aspect, the contaminant is not an agrichemical but a further recalcitrant organic pollutant such as for example Bisphenol A (BPA), Naproxen, Ibuprofen, Estrogens, Antibiotics, and Insulin.

The electrochemical methods described herein provide at least one or more of the following: pathogen inactivation, degradation of recalcitrant organic pollutants; degradation of contaminants; providing sustained nutrients; and mineralizing organic materials into solubilized nutrients. The methods and systems provide a secure fertigation water and secure re-circulated fertigation water for use in CEA and other applications.

The electrochemical treatment of fertigation water has many benefits for use in Controlled Environment Agriculture for both soil and hydroponic systems. The methods can incorporate the use of any organic waste material including but not limited to compost, bone meal, soya meal, manure and inedible biomass from plant production systems. This is beneficial to decrease the reliance on synthetic fertilizers.

The invention in aspects provides novel and effective methods and systems that can be deployed in isolation or as part of an integrated water management system in municipal, industrial and CEA operations. With respect to CEA operations, utilizing fertigation water (i.e. fertigation) provides source water treatment to ensure crop security. Encompassed are both single pass (initially treated) fertigation water and re-cycled (captured, re-used and retreated) fertigation water to provide a safe source of fertigation water to ensure crop security. The methods and systems also help to conserve water as the fertigation water is recycled for re-use as part of a water management system.

The in situ electrochemical methods of the invention are capable of efficiently meeting the nutritional needs of crops. Further, nutrient levels of the treated fertigation water remain substantially unchanged, i.e. are sustained. In an aspect, the method provides for increases in some essential ions serving as an enrichment of the fertigation water for improving growth conditions for crops.

In further aspects, the method incorporates electrochemistry to enrich nutrients (e.g. nitrogen) in the fertigation water during treatment thereof.

Advantageously, the method also allows for nutrients contained in the fertigation water to be conserved. Macronutrient ions are substantially unaffected. The loss of total nitrogen levels is limited and may be controlled by pH adjustment of the fertigation water during treatment. Thus the methods of the invention provide a sustained, safe nutrient solution for CEA.

In one embodiment, the system incorporates the use of dimensionally stable anodes (DSAs) such as, but not limited to $RuO_2$.

In a further non-limiting embodiment, the system incorporates the use of boron doped diamond electrodes (BDD) to continuously produce reactive oxygen species (ROS) such as $O_2$, $O_3$, $H_2O_2$ and OH. In aspects, this is a regenerative in situ oxidant generating method for the control of oxidant-susceptible pathogens in aqueous solutions. In aspects in fertigation water in commercial CEA. Advantageously, any chlorate species formed (typically <2 ug/L) are below acceptable levels (e.g. below 2 mg/L).

The use of BDD conserves the nutrients contained in the fertigation water. The loss of total nitrogen levels is limited and may be controlled by pH adjustment of the fertigation water during treatment. Advantageously, organic components of the fertilizer or other organic contaminants in the fertigation water are degraded releasing ammonium, nitrate, sulphate and calcium that enrich the fertigation water for improving the growth conditions for crops. As such in a further aspect, the invention incorporates electrochemistry to advantageously increase nutrient availability and sustainability within the fertigation water for crop growth. Electrochemical mineralization of the fertigation water degrades organic matter therein containing nitrogen, e.g., proteins and nucleic acids, to release ammonia/ammonium that is oxidized to nitrate ions essential for crop growth. This enriches the fertigation water as it is being treated since the released ammonium ions and nitrate become available for crop growth.

In further aspects using BDD, additional chloride may be added that is also regenerated without a build-up of free chlorine while maintaining acceptable low chloride effluent levels in the treated fertigation water. In this aspect, a combination of oxidative species and free chlorine are regenerated at disinfecting amounts that may target the same or different pathogens in the fertigation water, while still maintaining safe levels of chlorine and safe levels of chlorate. Thus effluent free chlorine and chlorate species concentrations remain below phytotoxic thresholds.

Fertigation water for treatment in accordance with the invention may comprise inorganic and/or organic fertilizer. Fertilizers containing $NH_4^+$ may be used, with lower current densities which do not release chloramines at concentrations higher than the phytotoxic threshold (0.2 mg/L $NH_4Cl$). At higher current densities for certain aspects, tertiary treatment methods such as UV light may be further incorporated to produce crops without negative impacts on growth. Furthermore, $NO_3$ based fertilizers without the presence of $NH_4^+$ may be also used. The electrochemical process with BDD electrodes can be successfully used for mineralizing organic materials and solubilizing nutrients in the fertigation water.

The fertigation water may be treated, then used to irrigate crops. Treated fertigation water used to irrigate crops may be collected (for example the run off collected) and pooled for retreatment and re-use. Untreated fertigation water may also be mixed with treated fertigation water for treatment.

In aspects of the invention, the pH of the fertigation water during treatment is at least about 5.4. In further aspects, the pH is between about 5.4 to about 8.5. In further aspects, the pH is about 5.5 to 6.5, this pH is favorable for chloride and nitrogen species therein. In any of these ranges, all integers are included.

In aspects of the invention, the current density used in the methods is at least about 0.76 $mA/cm^2$. In further aspects the current density is about 0.76 $mA/cm^2$ to about 9.09 $mA/cm^2$. In further aspects, the current density is at least about 1.14 $mA/cm^2$, at least about 2.27 $mA/cm^2$, at least about 3.41 $mA/cm^2$, at least about 4.55 $mA/cm^2$, at least about 6.82 $mA/cm^2$ and at least about 9.09 $mA/cm^2$. The effective current density range for use varies with contact times. In non-limiting aspects it may be about 0.76 to about 2.27 mA/cm$^2$, or about 0.76 to about 9.09 mA/cm$^2$, or about 0.76 to about 1.14 mA/cm$^2$ inclusive of any subranges within these ranges as understood by one of skill in the art. One of skill in the art may recognize that in particular aspects, higher current densities may be applied for different periods of time or combinations of current densities may be used for different periods of time, or a gradual increase and/or decrease of current density over time may be used.

In aspects of the invention the residence time (time in contact with electrodes) may be up to about 1 minute, up to about 2 minutes, up to about 3 minutes, up to about 4 minutes, up to about 5 minutes, up to about 6 minutes, up to about 7 minutes, up to about 8 minutes, up to about 9 minutes, up to about 10 minutes, up to 20 minutes or longer. All time periods within these ranges is included. In certain aspects longer residence times may be desired. The residence time is affected by flow rate. Higher flow rates provide less residence time. Flow rates may be up to about 720 mL/min or more.

In aspects of the invention the methods are conducted under ambient light at room temperatures. It is understood however, that lighting and temperatures may be further adjusted.

In accordance with another aspect, is an in situ oxidant producing method for the treatment of fertigation water, comprising:
  continuously regenerating oxidative species in an effective amount to control a pathogen in said fertigation water; and optionally
  degrading nitrogen containing matter in said fertigation water to release ammonium ions and nitrate.

In aspects, is an electrochemical flow cell (EFC) that is outfitted with dimensionally stable anodes (DSA), in aspects ruthenium dioxide (RuO$_2$). In the methods, an aqueous solution to be treated, for example fertigation water, is pumped into the EFC, where it contacts and flows through the electrically charged DSAs and exits the EFC for collection. Pathogen inactivation is achieved by regenerative mediated electrolysis, whereby chloride ions in the flowing fertigation water are transformed to free chlorine forms (e.g. hypochlorous acid) that neutralizes pathogens while simultaneously releasing chloride ions back to the solution where the chloride ions migrate back to the anode through electrostatic migration where again, the chloride ions can be transformed to hypochlorous acid for pathogen neutralization.

In further aspects, methods of the invention are achieved through the use of an electrochemical flow cell (EFC) that is outfitted with BDD anodes. In the methods, an aqueous solution to be treated, for example fertigation water, is pumped into the EFC, where it contacts and flows through the electrically charged BDDs and exits the EFC for collection. Pathogen inactivation is achieved by regenerative mediated electrolysis, whereby oxidants are generated in situ (a combination of reactive oxygen species (ROS) such as O$_2$, O$_3$, H$_2$O$_2$ and OH) that neutralizes pathogens by attacking pathogens membrane, DNA, and other essential components needed for its survival. The treated fertigation water is chemically decomposed from recalcitrant organic pollutants. Optionally, chlorine may be added that is also regenerated with stable chloride levels being maintained and safe free chlorine levels.

Treatment of an aqueous solution containing a contaminant(s) includes electrochemical treatment using dimensionally stable anodes (DSAs) or using BDD (boron doped diamond electrodes) providing electrochemical advanced oxidation processes (EAOP) to degrade the contaminant(s). Contaminants may be agrichemicals or recalcitrant organic pollutants. Aqueous solutions comprising chloride ions may also be electrochemically treated as described herein.

In aspects of the present invention is the in situ electrochemical treatment of an aqueous solution through electrochemical cells incorporating DSA electrodes (such as, but not limited to RuO$_2$) or BDD electrodes in order to degrade a contaminant(s) therein. In aspects the contaminant is an agrichemical such as a pesticide, for example glyphosate or paclobutrazol. Both DSA and BDD electrodes can be used in the methods to degrade glyphosate and paclobutrazol. Contaminants may also comprise recalcitrant organic pollutants such as bisphenol A (BPA), naproxen, ibuprofen, estrogens, antibiotics and insulin. The aqueous solution may be a municipal, agricultural or industrial water source.

The methods are effective to degrade, that is break down one or more pesticides present in aqueous solutions such as for example fertigation water, to safe(r) byproducts rendering the treated fertigation water non-toxic or substantially less toxic than non-treated fertigation water. Thus the degradation reduces the amount of the pesticide present in the fertigation water. Further, the treated fertigation water is also not toxic to crops for which it is used to irrigate.

In aspects of the present invention is a method for the in situ electrochemical treatment of aqueous solutions containing glyphosate, the method incorporating the use of dimensionally stable anodes (DSA) electrodes (such as, but not limited to RuO$_2$) to degrade the glyphosate into less toxic by-products.

In aspects of the present invention is a method for the in situ electrochemical treatment of aqueous solutions containing glyphosate, the method incorporating the use of dimensionally stable anodes (DSA) electrodes (such as, but not limited to RuO$_2$) to degrade the glyphosate resulting in treated solution with safe(r)/acceptable levels of glyphosate compared to untreated solution.

In aspects of the present invention is a method for the in situ electrochemical treatment of an aqueous solution containing paclobutazol, the method incorporating the use of BDD electrodes to generate reactive oxidative species that degrades the paclobutazol into less toxic by-products.

In aspects of the present invention is a method for the in situ electrochemical treatment of an aqueous solution containing paclobutazol, the method incorporating the use of BDD electrodes to generate reactive oxidative species to degrade the paclobutazol resulting in treated solution with safe(r)/acceptable levels of paclobutazol compared to untreated solution.

In any of the aforementioned methods the aqueous solution can be fertigation water (organic or inorganic), municipal water or industrial water the later which includes waste water and post-treatment outflow waste water. Encompassed are both single pass (initially treated) aqueous solutions and re-cycled (captured, re-used and retreated) aqueous solutions.

Encompassed are both single pass (initially treated) fertigation water and re-cycled (captured, re-used and retreated) fertigation water to provide a safe source of fertigation water to ensure crop security. The methods and systems help to remove/degrade contaminants such as pesticides from the fertigation water and further helps to conserve water as the fertigation water is recycled for re-use as part of a water management system. It is within the scope of the invention to combine different systems in the re-treated fertigation water. One of skill in the art would understand from the teachings presented herein that the fertigation water could first be treated using DSA electrodes and then after treatment, use and collection, be subjected to a further treatment using BDD electrodes. This can be also done in the reverse order. Alternatively, any combination of treatment cycles may be utilized.

The methods of the invention are useful for removing/degrading undesired agrichemicals such as pesticides from fertigation water while substantially maintaining nutritional needs of any crop being irrigated with the treated fertigation water.

The methods are surprisingly effective for providing crop security against undesired agrichemicals, that is, treating the fertigation water to remove a pesticide. Concentrations of glyphosate and paclobutrazol as demonstrated herein were for example 170 and 60 times higher, respectively, than typical concentrations found in Canadian surface water and were effectively removed demonstrating the effectiveness of the methods and systems described herein. Further, nutrient levels of the treated fertigation water may remain substantially at levels required for plant health/growth.

In aspects, the method incorporates electrochemistry to continuously remove/degrade one or more undesired agrichemicals in the fertigation water to less than toxic levels for a crop.

In an aspect, chloride concentrations may remain stable during treatment of the fertigation water and thus effluent free chlorine concentrations remain below phytotoxic thresholds (e.g. about 2.5 mg/L). Nutrients contained in the fertigation water may be conserved. The loss of total nitrogen levels is limited and may be controlled by pH adjustment of the fertigation water during treatment.

In a further non-limiting embodiment of the invention, a continuously regenerated combination of reactive oxygen species (ROS) such as $O_2$, $O_3$, $H_2O_2$ and OH is employed to remove/degrade undesired agrichemicals. In this embodiment, the system incorporates the use of boron doped diamond electrodes (BDD) to continuously produce reactive oxygen species. In aspects, this is a regenerative in situ oxidant generating method for the control of oxidant-susceptible contaminants (agrichemicals, i.e. pesticides) in fertigation water in commercial CEA.

In this embodiment incorporating the use of BDD, the loss of total nitrogen levels is limited and may be controlled by pH adjustment of the fertigation water during treatment. The reduction/degradation of undesired agrichemicals using BDD may advantageously also degrade organic components of any fertilizer or other organic contaminants in the fertigation water releasing ammonium, nitrate, sulphate and calcium that enrich the fertigation water for improving the growth conditions for crops. As such in a further aspect, the invention incorporates electrochemistry to reduce/degrade a pesticide(s) and may advantageously increase nutrient availability within the fertigation water for crop growth. Electrochemical mineralization of the fertigation water degrades organic matter therein containing nitrogen, e.g., proteins and nucleic acids, to release ammonia/ammonium that is oxidized to nitrate ions essential for crop growth.

The in situ electrochemical methods of the invention can be used to effectively remove/degrade undesired agrichemicals used in agriculture. Undesired agrichemicals may generally include pesticides such as organophosphate pesticides and carbamate pesticides.

In aspects, the methods of the invention may be used to remove/degrade pesticides from fertigation water.

In aspects, the methods of the invention may be used to remove/degrade organophosphate pesticides and carbamate pesticides from fertigation water.

In aspects, the methods of the invention may be used to remove/degrade glyphosate and/or paclobutrazol from fertigation water.

In aspects, the methods of the invention may be used to remove/degrade aminomethylphosphonic acid (AMPA) from fertigation water.

Glyphosate (N-(phosphonomethyl)glycine) is a broad-spectrum systemic herbicide and crop desiccant. It is an organophosphorus compound, specifically a phosphonate, which acts by inhibiting the plant enzyme 5-enolpyruvyl-shikimate-3-phosphate synthase. It is used in commercial pesticide formulations such as for example Roundup™ and Glyfosm. Paclobutrazol is a plant growth regulator (PGR) and also a triazole fungicide that inhibits the top growth on a plant while encouraging root growth. It is a known antagonist of the plant hormone gibberellin. Commercial formulations include for example Bonzi™ (Syngenta), Downsize™ (Greenleaf Chemical), Paczol™ (OHP), Piccolo™ and Piccolo 10XC™ (Fine Americas).

While the pesticides glyphosate and paclobutrazol (and AMPA) are described herein, it is understood by one of skill in the art that the methods of the invention can be used for a variety of different pesticides such as one or more of those listed in Table 2.

In further aspects, the methods of the invention the contaminant is a further recalcitrant organic pollutant and the methods may be used to remove/degrade for example Bisphenol A (BPA), Naproxen, Ibuprofen, Estrogens, Antibiotics, and Insulin.

Fertigation water for treatment in accordance with the invention may comprise chlorine, inorganic and/or organic fertilizer. The fertigation water may be treated, then used to irrigate crops. Treated fertigation water used to irrigate crops may be collected (for example the run off collected) and pooled for retreatment and re-use. This can be done multiple times using combinations of treatment. Untreated fertigation water may also be mixed with treated fertigation water for treatment.

The removal/degradation of pesticides is achieved by using electrochemical treatment of the fertigation water and adjusting one or more of: current density, residence time (flow rate) and pH. In aspects of the invention, the pH of the fertigation water during pesticide treatment is at least about 5.4. In further aspects, the pH is between about 5.4 to about 8.5. In further aspects, the pH is about 5.5 to 6.5, this pH is favourable for chloride and nitrogen species therein. In any of these ranges, all integers are included. In aspects of the invention, the current density used in the methods is at least about 0.76 mA/cm$^2$. In further aspects the current density is about 0.76 mA/cm$^2$ to about 9.09 mA/cm$^2$. In further aspects, the current density is at least about 1.14 mA/cm$^2$, at least about 2.27 mA/cm$^2$, at least about 3.41 mA/cm$^2$, at least about 4.55 mA/cm$^2$, at least about 6.82 mA/cm$^2$ and at least about 9.09 mA/cm$^2$. The current density used in the methods is at about 2.27 mA/cm$^2$. One of skill in the art may recognize that in particular aspects, higher current densities may be applied for different periods of time or combinations of current densities may be used for different periods of time, or a gradual increase and/or decrease of current density over time may be used.

In aspects of the invention the residence time may be up to about 1 minute, up to about 2 minutes, up to about 3 minutes, up to about 4 minutes, up to about 5 minutes, up to about 6 minutes, up to about 7 minutes, up to about 8 minutes, up to about 9 minutes, up to about 10 minutes, up to about 15 minutes, up to about 20 minutes, up to about 25 minutes, up to about 30 minutes, or up to about 35 minutes or more. All time periods within these ranges is included. In certain aspects longer residence times may be desired.

In aspects of the invention the methods are conducted under ambient light at room temperatures. It is understood however, that lighting and temperatures may be further adjusted.

In aspects, the effective current density range for use in the method for treating fertigation water for degradation of contaminants varies with contact times. In non-limiting aspects it may be about 0.76 to about 2.27 mA/cm$^2$, or about 0.76 to about 9.09 mA/cm$^2$, or about 0.76 to about 1.14 mA/cm$^2$ inclusive of any subranges within these ranges as understood by one of skill in the art.

In accordance with an aspect of the invention is an in situ electrochemical method for the treatment of an aqueous solution comprising:
  flowing the aqueous solution through an electrochemical cell (EFC) comprising dimensionally stable anodes for a time effective to decrease the amount of a pesticide contained in the aqueous solution.

In accordance with another aspect of the invention is a method to remove/degrade a pesticide in fertigation water comprising:
  flowing fertigation water through an electrochemical cell (EFC) comprising dimensionally stable anodes under conditions that remove/degrade the pesticide present in the fertigation water. In aspects, the conditions comprise flow rate, pH and applied current.

In accordance with another aspect, is an in situ oxidant producing method for the treatment of fertigation water, comprising:
  flowing fertigation water through an electrochemical cell (EFC) comprising BDD electrodes under conditions to continuously regenerate oxidative species in an effective amount to remove/degrade a pesticide present in said fertigation water.

In aspects, the conditions comprise flow rate, pH and applied current.

According to a further aspect of the invention is the use of an electrochemical cell comprising DSA electrodes or BDD electrodes for the treatment of an aqueous solution to remove/degrade a pesticide therein.

According to a further aspect of the invention is the use of an electrochemical cell comprising DSA electrodes or BDD electrodes for the removal/degradation of a pesticide contained in fertigation water. In aspects, the pesticide is glyphosate, paclobutrazol and/or aminomethylphosphonic acid (AMPA).

According to a further aspect of the invention is the use of an electrochemical cell comprising BDD electrodes for the treatment of fertigation water to remove/degrade paclobutrazol.

According to a further aspect of the invention is the use of an electrochemical cell comprising DSA electrodes for the treatment of fertigation water to remove/degrade glyphosate.

According to a further aspect of the invention is the use of an electrochemical cell comprising DSA electrodes or BDD electrodes for the treatment of fertigation water contaminated by Roundup™, Glyfos™, Bonzi™, Downsize™, Paczol™, Piccolo™ and Piccolo 10XC™.

In the methods of the invention, fertigation water is pumped into the EFC, where it contacts and flows through the electrically charged DSAs and exits the EFC for collection. Pesticide removal/degradation is achieved by the contact with the electrodes.

In further aspects, methods of the invention to remove/degrade pesticides are achieved through the use of an electrochemical flow cell (EFC) that is outfitted with BDD anodes. In the methods, fertigation water is pumped into the EFC, where it contacts and flows through the electrically charged BDDs and exits the EFC for collection. Pesticide removal/degradation is achieved by regenerative mediated electrolysis, whereby oxidants are generated in situ (a combination of reactive oxygen species (ROS) such as $O_2$, $O_3$, $H_2O_2$ and OH) that degrade the pesticide.

Overall the electrochemical fertigation water treatment methods to remove/degrade pesticides, or other recalcitrant organic pollutants, that may be present in the fertigation water involve the capture and transfer of the fertigation water to an electrochemical treatment unit comprising one or more EFC. Further the fertigation water is pumped into and passes through the electrochemical flow cell. In this step, direct electrical current is applied and the rate of flow is adjusted to achieve a desired level of fertigation water treatment based on the concentration of the pesticides, or other recalcitrant organic pollutants, to be removed/degraded.

Hydraulic residence time within the electrochemical flow cell is in a range of at least about 15 seconds to about 30 minutes or more, depending on the concentration of the pesticides to be removed/degraded. The treated fertigation water effluent may optionally be passed through either a clarifier or filter for removal of any precipitated solid particles that may be present in the treated fertigation water. The treated fertigation water effluent may optionally be UV treated before or after any clarifier or filter treatment.

Broadly presented, systems of the invention include providing a flow-through EFC including a cathode and an anode, wherein the anode is selected from DSA or BDD. The systems further include a power source connected to the cathode and the anode, a pump for passing a fertigation water through the flow-through EFC, and withdrawing the treated fertigation water from the EFC. The fertigation water thus treated is used to irrigate crops in a CEA technology, the runoff collected, and recycled back into the flow-through EFC system.

In aspects is a method for the treatment of fertigation water to control levels of pesticides therein.

In aspects the electrochemically treated fertigation water also comprises stable chloride levels.

In aspects is electrochemically treated fertigation water comprising stable levels of oxidative species as to control levels of pesticides therein.

In aspects is electrochemically treated fertigation water comprises one or more of stable levels of oxidative species, stable levels of free chloride, safe chlorate species levels, negligible pesticide levels, safe levels of toxic pesticide breakdown by-products and any level for non-toxic products.

The methods and systems of the invention are flexible and scalable to desired system sizes. The removal/degradation of pesticide targets is achieved through the judicious selection of parameters (current density, flow rate/contact time, chloride concentration, electrode area (scaling factor)).

The methods and systems of the invention are versatile, technologically effective, and cost-effective for the in situ treatment of an aqueous solutions from a variety of sources using a flow-through EFC that utilizes DSA or BDD anodes under judiciously selected parameters of current, flow rate and pH. Treatment comprises one or more of: removal of contaminants, disinfection of pathogens, de-chlorination, and mineralization of organic components. Treatment may further include a step of UV treatment to the treated effluent. Treatment can be a continuous process as for example in an irrigation system or further when the system of the invention is incorporated as part of a conventional water treatment system or sewage treatment system. Treated aqueous solutions have more desirable properties for their intended use. For example, as part of a water treatment system the flow-through EFC of the invention and methods used therein improve the potability of drinking water or water used to make various beverages.

According to an aspect of the invention is an irrigation system comprising: one or more electrically-driven electrochemical flow cell (EFC) fluidly connected to a source of fertigation water to be treated; and an irrigation water distribution system fluidly connected to the one or more electrically-driven EFC.

According to an aspect of the invention is a system for removing recalcitrant organic pollutants from fertigation water, the system including at least one electrochemical flow cell comprising:
 a housing having an inlet for untreated fertigation water and an outlet for treated fertigation water that has been treated within the housing;
 an array of spaced apart electrodes within the housing;
 a source for applying direct current the electrodes to charge one portion of the array positively and another portion of the array negatively so as to create an electrical gradient between the portions of the array, the direct current being sufficient to oxidize and to neutralize small particle surface charges in an aqueous solution, and
 container structure adjacent the housing, the container structure having an inlet chamber and an outlet chamber, the inlet chamber accumulating untreated water and delivering the untreated water to the inlet of the housing, an outlet of the housing being connected to the outlet chamber of the container and an outlet line being connected to the outlet chamber to drain away the treated water.

According to an aspect of the invention is a system for industrial process water treatment, the system including at least one electrochemical flow cell comprising:
 a housing having an inlet for untreated industrial process water and an outlet for treated industrial process water that has been treated within the housing;
 an array of spaced apart electrodes within the housing;
 a source for applying direct current the electrodes to charge one portion of the array positively and another portion of the array negatively so as to create an electrical gradient between the portions of the array, the direct current being sufficient to oxidize and to neutralize small particle surface charges in the industrial process water, and
 container structure adjacent the housing, the container structure having an inlet chamber and an outlet chamber, the inlet chamber accumulating untreated industrial process water and delivering the untreated industrial process water to the inlet of the housing, an outlet of the housing being connected to the outlet chamber of the container and an outlet line being connected to the outlet chamber to drain away the effluent treated industrial process water. In aspects, the treatment parameters of the system for treating industrial process water are selected dependent on end use such as consumption, manufacturing, or even disposal. Treatment of industrial process water may include for example one or more of degradation of contaminants, disinfecting pathogens, mineralizing organics. this treatment may also include an optional step of UV treatment.

Operationally, the in situ electrochemical aqueous solution treatment methods of the invention involve the capture and transfer of the aqueous solution to an electrochemical treatment unit comprising one or more EFC. Further the aqueous solution is pumped into and passes through the electrochemical flow cell. In this step, direct electrical current is applied and the rate of flow is adjusted to achieve a desired level of aqueous solution treatment based on the concentration of the pathogen to be inactivated or contaminants to be removed. Hydraulic residence time within the electrochemical flow cell is in a range of at least about 15 seconds to about 10 minutes or more. The treated aqueous solution effluent may optionally be passed through either a clarifier or filter for removal of any precipitated solid particles that may be present in the treated fertigation water and further optionally UV treated.

Broadly presented, systems of the invention include providing a flow-through EFC including a cathode and an anode, wherein the anode is selected from DSA or BDD. The systems further include a power source connected to the cathode and the anode, a pump for passing a an aqueous solution through the flow-through EFC for treatment, and withdrawing the treated water (treated effluent) from the EFC. The treated effluent can optionally be UV treated and used as desired. The systems are flexible and scalable to desired system sizes as well as can be adapted to be incorporated as part of other treatment systems for water, wastewater and/or sewage. Targets are achieved through the manipulation of parameters (current density, flow rate/contact time, chloride concentration, electrode area (scaling factor)).

For example if the aqueous solution is a fertigation water, the treated effluent is used to irrigate crops in CEA, the runoff collected, and continuously recycled back into the flow-through EFC system.

In aspects is a method for the treatment of fertigation water to control plant pathogens, degrade recalcitrant organic contaminants and/or mineralize organics.

In aspects is electrochemically treated fertigation water comprising stable chloride levels and effective levels of free chlorine as a disinfectant to control plant pathogens and stable macronutrient levels.

The methods and systems of the invention are versatile, technologically effective, and cost-effective for the in situ electrochemical treatment of fertigation water using a flow-through EFC that utilizes DSA or BDD anodes.

According to an aspect of the invention is an irrigation system comprising:
 one or more electrically-driven electrochemical flow cell (EFC) fluidly connected to a source of fertigation water to be treated; and an irrigation water distribution system fluidly connected to the one or more electrically-driven EFC.

According to an aspect of the invention is a system for removing contaminants from fertigation water, the system including at least one electrochemical flow cell comprising:
 a housing having an inlet for untreated fertigation water and an outlet for treated fertigation water that has been treated within the housing;
 an array of spaced apart electrodes within the housing;
 a source for applying direct current the electrodes to charge one portion of the array positively and another portion of the array negatively so as to create an electrical gradient between the portions of the array, the direct current being sufficient to oxidize and to neutralize small particle surface charges in an aqueous solution, and container structure adjacent the housing, the container structure having an inlet chamber and an outlet chamber, the inlet chamber accumulating untreated water and delivering the untreated water to the inlet of the housing, an outlet of the housing being connected to the outlet chamber of the container and an outlet line being connected to the outlet chamber to drain away the treated water.

Aspects of the invention comprise:

An in situ electrochemical method for the treatment of an aqueous solution, comprising:
flowing the aqueous solution through an electrochemical cell comprising at least one anode and at least one complementary cathode while simultaneously adjusting one or more of current density, flow rate and pH,
wherein said flowing aqueous solution contacts the anode and cathode causing one or more of: degradation of a recalcitrant organic contaminant in said aqueous solution, mineralization and solubilization of an organic present in said aqueous solution, forming a disinfection agent against a pathogen, and maintaining nutrient levels in said aqueous solution; and collecting treated effluent.

In certain aspects, the at least one anode is a dimensionally stable anode or a boron doped diamond (BDD) electrode.

In certain aspects, the dimensionally stable anode is ruthenium dioxide.

In certain aspects, the at least one anode is a boron doped diamond (BDD) electrode.

In certain aspects, the BDD continuously produces reactive oxygen species selected from $O_2$, $O_3$, $H_2O_2$ and OH.

In certain aspects, said aqueous solution is a nutrient solution, a municipal water source, an industrial water source.

In certain aspects, said aqueous solution is a nutrient solution for use in agriculture.

In certain aspects, the nutrient solution does not contain ammonium ions.

In certain aspects, the nutrient solution is nitrate based.

In certain aspects, said effluent nutrient solution comprises free chlorine concentrations remain below phytotoxic thresholds of about 2.5 mg/L.

chloride concentrations remain stable throughout the treatment of the nutrient solution.

In certain aspects, the disinfection agent is not accumulated in said effluent treated nutrient solution to toxic levels for a crop.

In certain aspects, the macronutrient content of the aqueous solution remains substantially unaltered during treatment.

In certain aspects, said aqueous solution is a municipal water source or an industrial water source.

In certain aspects, said aqueous solution is a waste water of the municipal water source or the industrial water source.

In certain aspects, said treatment degrades a recalcitrant organic contaminant in said waste water such that effluent treated waste water is contaminant free.

In certain aspects, said aqueous solution is an organic fertilizer solution.

In certain aspects, said treatment mineralizes and solubilizes any organic present in said organic fertilizer solution increasing nutrient levels in the treated effluent.

In certain aspects, said treated effluent is suitable for hydroponic systems.

In certain aspects, the current density is at least about 0.76 mA/cm$^2$ to about 9.09 mA/cm$^2$.

In certain aspects, the current density is about 1.14 mA/cm$^2$, about 2.27 mA/cm$^2$, about 3.41 mA/cm$^2$, about 4.55 mA/cm$^2$, about 6.82 mA/cm$^2$ or about 9.09 mA/cm$^2$.

In certain aspects, the pH of the aqueous solution during treatment is at least about 5.4, about 5.4 to about 8.5, about 5.5 to 6.5, or favourable for chloride and nitrogen species in said solution.

In certain aspects, the flow rate is selected to provide a residence time of treatment of up to about 10 minutes, of up to about 20 minutes, of up to about 30 minutes or of up to about 40 minutes.

In certain aspects, the method is conducted at about room temperature.

In certain aspects, the method is conducted under ambient light.

In certain aspects, the pathogen is a chloride sensitive pathogen.

In certain aspects, the method optionally comprising UV treatment of the treated effluent.

A regenerative in situ oxidant generating method for the treatment of fertigation water, comprising:
flowing fertigation water containing organic species through an electrochemical cell to effect regenerative mediate electrolysis, the electrochemical cell comprising at least one anode and at least one complementary cathode while simultaneously adjusting one or more of current density, flow rate and pH,
wherein said flowing of said fertigation water continuously regenerates a disinfection agent in an effective amount to control an oxidant-susceptible pathogen in said fertigation water; and
collecting effluent treated fertigation water, wherein the disinfection agent is not accumulated in said effluent treated fertigation water to toxic levels for a crop.

In certain aspects, the at least one anode is a boron doped diamond (BDD) electrode.

In certain aspects, the BDD continuously produces reactive oxygen species selected from $O_2$, $O_3$, $H_2O_2$ and OH.

In certain aspects, any chlorate species formed in said fertigation water is below acceptable levels of below about 2 mg/L in said effluent treated fertigation water.

In certain aspects, macronutrient content of the fertigation water remains substantially unaltered.

In certain aspects, the current density is at least about 0.76 mA/cm$^2$ to about 9.09 mA/cm$^2$.

In certain aspects, the current density is about 1.14 mA/cm$^2$, about 2.27 mA/cm$^2$, about 3.41 mA/cm$^2$, about 4.55 mA/cm$^2$, about 6.82 mA/cm$^2$ or about 9.09 mA/cm$^2$.

In certain aspects, the pH of the fertigation water during treatment is at least about 5.4, about 5.4 to about 8.5 or about 5.5 to 6.5.

In certain aspects, the pH is selected to be favourable for chloride and nitrogen species in said fertigation water.

In certain aspects, the flow rate is selected to provide a residence time during treatment of up to about 10 minutes, up to about 20 minutes or up to about 30 minutes.

In certain aspects, the method is conducted at about room temperature.

In certain aspects, the method is conducted under ambient light.

In certain aspects, the oxidant-susceptible pathogen is selected from fungi, bacteria, viruses, oocymetes, and mycoplasmas.

In certain aspects, the oxidant-susceptible pathogen is a fungi from the genus Rhizoctonia or Fusarium.

In certain aspects, the oxidant-susceptible pathogen is Fusarium oxysporum or Rhizoctonia solani.

In certain aspects, chloride is regenerated without a build-up of free chlorine while maintaining acceptable low chloride effluent levels in the treated fertigation water.

In certain aspects, amounts of ammonium, nitrate and sulphate ions are increased in said treated fertigation water.

A controlled environment agricultural system employing any of the above methods.

A method for conserving and recycling nutrient rich water in controlled environment agriculture, the method comprising using and recycling treated fertigation water made by the above mentioned methods.

A method to increase nutrient availability within organic fertigation water for crop growth while simultaneously inactivating chloride-susceptible and/or oxidant-susceptible crop pathogens, the method comprising in situ electrochemical mineralization of the organic fertigation water to degrade nitrogen containing organic matter to release ammonia ions and nitrate ions for crop growth, and regenerative mediated electrolysis to continuously regenerate reactive oxygen species in an effective amount to control an oxidant-susceptible pathogen in said fertigation water.

An in situ oxidant producing method for the treatment of fertigation water, comprising:
  flowing fertigation water containing organic matter through an electrochemical cell to effect regenerative mediate electrolysis, the electrochemical cell comprising a boron doped diamond (BDD) anode and at least one complementary stainless steel cathode while simultaneously adjusting one or more of current density, flow rate and pH,
  continuously regenerating oxidative species in an effective amount to control a pathogen in said fertigation water; and optionally
  biodegrading nitrogen containing matter in said fertigation water to release ammonium ions and nitrate ions.

An in situ electrochemical method for making sustainable nutrient solutions for agricultural use, the method comprising:
  flowing waste water containing organic matter through an electrochemical cell to effect regenerative mediate electrolysis, the electrochemical cell comprising a boron doped diamond (BDD) anode and at least one complementary stainless steel cathode while simultaneously adjusting one or more of current density, flow rate and pH,
  continuously regenerating oxidative species in an effective amount to degrade the organic matter in said waste water releasing soluble ion nutrients; and
  collecting the treated effluent.

Use of the sustainable nutrient solution in an agriculture irrigation system.

In certain aspects, the agricultural irrigation system is a hydroponic system.

An irrigation system for a crop comprising:
  one or more electrically-driven electrochemical flow cells (EFC) comprising at least one anode and at least one complementary cathode, each of the EFC fluidly connected to a source of recycling fertigation water being treated under set pH, current density and flow rate; and
  an irrigation water distribution system fluidly connected to the one or more electrically-driven EFC.

In certain aspects, the at least one anode is a dimensionally stable anode or a boron doped diamond (BDD) electrode.

In certain aspects, the dimensionally stable anode is ruthenium dioxide.

In certain aspects, the at least one anode is a boron doped diamond (BDD) electrode.

In certain aspects, the BDD continuously produces reactive oxygen species selected from $O_2$, $O_3$, $H_2O_2$ and OH.

In certain aspects, said fertigation water is a nutrient solution derived from a municipal water source or an industrial water source.

In certain aspects, the macronutrient content of the fertigation water remains substantially unaltered during treatment and irrigation.

In certain aspects, said treatment degrades a recalcitrant organic contaminant in said fertigation water.

In certain aspects, said fertigation water is an organic nutrient solution.

In certain aspects, said treatment mineralizes and solubilizes organic present in said organic nutrient solution increasing nutrient levels in the treated solution.

In certain aspects, said irrigation system is a hydroponic system.

In certain aspects, the current density is at least about 0.76 $mA/cm^2$ to about 9.09 $mA/cm^2$.

In certain aspects, the current density is about 1.14 $mA/cm^2$, about 2.27 $mA/cm^2$, about 3.41 $mA/cm^2$, about 4.55 $mA/cm^2$, about 6.82 $mA/cm^2$ or about 9.09 $mA/cm^2$.

In certain aspects, the pH of the aqueous solution during treatment is at least about 5.4, about 5.4 to about 8.5, about 5.5 to 6.5, or favourable for chloride and nitrogen species in said solution.

In certain aspects, the flow rate is selected to provide a residence time of treatment of up to about 10 minutes.

In certain aspects, the treatment is conducted at about room temperature.

In certain aspects, the treatment is conducted under ambient light.

Electrochemically treated fertigation water comprising stable levels of oxidative species as a disinfectant to control plant pathogens, stable nutrient levels, mineralized organics and/or safe chlorate species levels.

An electrochemical method for the treatment of a nutrient aqueous solution, comprising:
  flowing nutrient aqueous solution through an electrochemical cell comprising at least one anode and at least one complementary cathode while simultaneously adjusting one or more of current density, flow rate and pH,
  wherein said flowing of said nutrient aqueous solution contacting the anode and cathode degrades a pesticide in said nutrient aqueous solution; and
  collecting treated effluent.

In certain aspects, the at least one anode is a dimensionally stable anode.

In certain aspects, the dimensionally stable anode is ruthenium dioxide.

In certain aspects, the free chlorine concentrations remain below phytotoxic thresholds of about 2.5 mg/L in said treated effluent.

In certain aspects, the chloride concentrations remain stable throughout the treatment of the nutrient aqueous solution.

In certain aspects, the current density is at least about 0.76 mA/cm$^2$ to about 9.09 mA/cm$^2$.

In certain aspects, the current density is about 1.14 mA/cm$^2$, about 2.27 mA/cm$^2$, about 3.41 mA/cm$^2$, about 4.55 mA/cm$^2$, about 6.82 mA/cm$^2$ or about 9.09 mA/cm$^2$.

In certain aspects, the pH pf the nutrient aqueous solution during treatment is between about 5.4 to about 8.5.

In certain aspects, the pH is about 5.5 to 6.5.

In certain aspects, the flow rate is selected to provide a treatment residence time of up to about 30 minutes.

In certain aspects, conducted at about room temperature.

In certain aspects, the method is conducted under ambient light.

In certain aspects, the pesticide is an organophosphate pesticide or a carbamate pesticide.

In certain aspects, the pesticide is glyphosate.

In certain aspects, the pesticide is paclobutrazol.

In certain aspects, the pesticide is a breakdown product of the pesticide.

In certain aspects, the breakdown product is aminomethylphosphonic acid (AMPA).

In certain aspects, the nutrient aqueous solution is contaminated with one or more of Roundup™, Glyfos™, Bonzi™ Downsize™, Paczol™, Piccolo™ and Piccolo 10XC™

In certain aspects, loss of total nitrogen levels in said nutrient aqueous solution is limited during treatment.

In certain aspects, said nutrient aqueous solution is derived from electrochemically treated organic waste solution.

A controlled environment agricultural system employing the above methods.

A regenerative in situ oxidant generating method for the treatment of fertigation water, comprising:
flowing fertigation water containing organic species through an electrochemical cell to effect regenerative mediate electrolysis, the electrochemical cell comprising at least one anode and at least one complementary cathode while simultaneously adjusting one or more of current density, flow rate and pH,
wherein said flowing of said fertigation water continuously regenerates an oxidative species in an effective amount to degrade a pesticide in said fertigation water; and collecting treated effluent.

In certain aspects, the at least one anode is a boron doped diamond (BDD) electrode.

In certain aspects, the BDD continuously produces reactive oxygen species selected from $O_2$, $O_3$, $H_2O_2$ and OH.

In certain aspects, any chlorate species formed in said nutrient aqueous solution is below acceptable levels of below about 2 mg/L in said treated effluent.

In certain aspects, the current density is at least about 0.76 mA/cm$^2$ to about 9.09 mA/cm$^2$.

In certain aspects, the current density is about 1.14 mA/cm$^2$, about 2.27 mA/cm$^2$, about 3.41 mA/cm$^2$, about 4.55 mA/cm$^2$, about 6.82 mA/cm$^2$ or about 9.09 mA/cm$^2$.

In certain aspects, the pH of the nutrient aqueous solution during treatment is at least about 5.4 to about 8.5 or about 5.5 to about 6.5.

In certain aspects, the flow rate is selected to provide a treatment residence time of up to about 30 minutes, up to about 20 minutes or up to about 10 minutes.

In certain aspects, the method is conducted at about room temperature.

In certain aspects, the method is conducted under ambient light.

In certain aspects, the pesticide is an organophosphate pesticide or a carbamate pesticide.

In certain aspects, the pesticide is glyphosate.

In certain aspects, the pesticide is paclobutrazol.

In certain aspects, the pesticide is a breakdown product of the pesticide.

In certain aspects, the breakdown product is aminomethylphosphonic acid (AMPA).

In certain aspects, the fertigation water is contaminated with one or more of Roundup™, Glyfos™, Bonzi™, Downsize™, Paczol™, Piccolo™ and Piccolo 10XC™

A controlled environment agricultural system employing the above mentioned nethods.

A method for conserving and recycling nutrient aqueous solution in controlled environment agriculture, the method comprising using and re-using treated nutrient aqueous solution made by the above methods.

A method for the treatment of an organic waste material solution to make a stable organic nutrient solution for use in agriculture, comprising:
flowing the organic waste material solution through an electrochemical cell comprising a boron doped diamond (BDD) anode and at least one complementary stainless steel cathode while simultaneously adjusting one or more of current density, flow rate and pH, for a time sufficient to mineralize the organic waste material and solubilize nutrients; and
collecting treated effluent.

In certain aspects, the organic waste material solution comprises compost, guano, sewage, manure, bone meal, soya meal, kelp extract, plant leaves, plant roots, wood debris and combinations thereof.

An in situ oxidant producing method for the treatment of fertigation water, comprising:
flowing fertigation water through an electrochemical cell comprising a boron doped diamond (BDD) anode and at least one complementary stainless steel cathode for a time effective to degrade placlobutrazol while simultaneously adjusting one or more of current density, flow rate and pH; and
collecting effluent treated fertigation water.

Use of the fertigation water to provide pesticide crop security in controlled environment agriculture systems.

An in situ electrochemically treated aqueous solution that is pesticide crop secure.

An in situ electrochemical industrial process water treatment system comprising one or more electrically-driven electrochemical flow cells (EFC) comprising at least one anode and at least one complementary cathode, each of the EFC fluidly connected to a source of recycling industrial process water being treated under set pH, current density and flow rate; and a collection means fluidly connected to the one or more electrically-driven EFC for collecting treated effluent industrial process water.

In certain aspects, the at least one anode is a dimensionally stable anode or a boron doped diamond (BDD) electrode.

In certain aspects, the dimensionally stable anode is ruthenium dioxide.

In certain aspects, the at least one anode is a boron doped diamond (BDD) electrode.

In certain aspects, the BDD continuously produces reactive oxygen species selected from $O_2$, $O_3$, $H_2O_2$ and OH.

In certain aspects, the treatment comprises degradation of contaminants, disinfection of a pathogen and/or mineralization of an organic into solution.

BRIEF DESCRIPTION OF THE DRAWINGS

The above and other aspects, advantages, and features of this disclosure will become more apparent by describing in further detail exemplary embodiments thereof with reference to the accompanying drawings, in which:

FIG. 444: (A) Inactivation of *Rhizoctonia solani* as a function of current density and contact time with 20 mg/L of chloride in solution with no fertilizer present.

FIG. 20A shows experimental design in the greenhouse depicting top view of the randomized complete block design with 4 growth tables and randomized troughs for each respective treatment type. FIG. 20B shows direction of flow was from reservoir 1 to treatment and enters the second reservoir, following by the distribution to each ornamental crop. Each treatment had its own irrigation setup that would distribute the fertigation solution to all 4 growth tables.

FIG. 21: Photograph of plants during week 1 with inserted spikes which provided the irrigation solution to the soil. The irrigation water is drained through the soil and captured in troughs, which returned to each respective reservoir for further treatment.

FIG. 32A shows measured plant parameters were number of leaves, FIG. 32B shows leaf area, FIG. 32C shows leaf fresh weight, FIG. 32D shows biomass (leaf and root dry weights) and FIG. 32E shoot/root ratio. Error bars are ±SEM, n=3.

FIG. 49B shows the dry weights of plants in relation to the contact time each treatment. The electrochemical systems were configured to the EFC with only the presence of 20 mg/L Cl⁻ in solution. Error bars are ±SEM, n=3;

DETAILED DESCRIPTION

Figure 1:
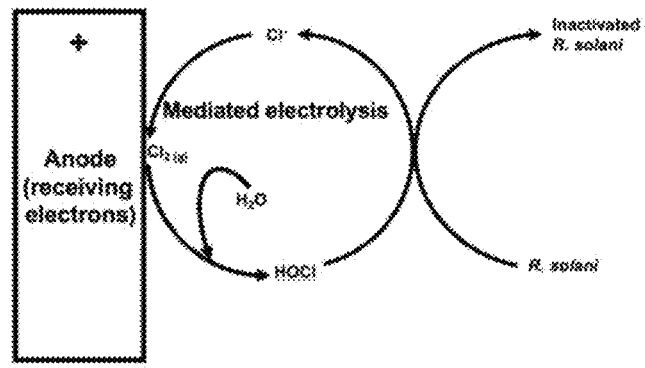
FIG. 1 is a schematic showing proposed mechanisms of pathogen inactivation with an emphasis on the cycle of reactions constituting regenerative in situ electrochemical hypochlorination (mediated electrolysis).

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

As used herein, the terms "invention" or "present invention" are non-limiting terms and not intended to refer to any single aspect of the particular invention but encompass all possible aspects as described in the specification and the claims.

All publications, patent applications, patents, and other references mentioned herein are incorporated by reference in their entirety. The publications and applications discussed herein are provided solely for their disclosure prior to the filing date of the present application. Nothing herein is to be construed as an admission that the present invention is not entitled to antedate such publication by virtue of prior invention. In addition, the materials, methods, and examples are illustrative only and are not intended to be limiting.

In the case of conflict, the present specification, including definitions, will control.

Unless defined otherwise, all technical and scientific terms used herein have the same meaning as is commonly understood by one of skill in the art to which the subject matter herein belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, the following definitions are supplied in order to facilitate the understanding of the present invention.

As used herein, the articles "a" and "an" preceding an element or component are intended to be non-restrictive regarding the number of instances (i.e. occurrences) of the element or component. Therefore, "a" or "an" should be read to include one or at least one, and the singular word form of the element or component also includes the plural unless the number is obviously meant to be singular.

It will be further understood that the terms "comprises" and/or "comprising," or "includes", "including" and/or "having" and their inflections and conjugates denote when used in this specification, specify the presence of stated features, regions, integers, steps, operations, elements, and/or components, but do not preclude the presence or addition of one or more other features, regions, integers, steps, operations, elements, components, and/or groups thereof.

It will be understood that any component defined herein as being included may be explicitly excluded from the claimed invention by way of proviso or negative limitation.

As used herein, the term "about" refers to variation in the numerical quantity. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

Should a range of values be recited, it is merely for convenience or brevity and includes all the possible sub-ranges as well as individual numerical values within and about the boundary of that range. Any numeric value, unless otherwise specified, includes also practical close values and integral values do not exclude fractional values. Sub-range values and practically close values should be considered as specifically disclosed values.

As used herein the term 'may' denotes an option or an effect which is either or not included and/or used and/or implemented and/or occurs, yet the option constitutes at least a part of some embodiments of the invention or consequence thereof, without limiting the scope of the invention.

The phrase "and/or," as used herein in the specification and in the claims, should be understood to mean "either or both" of the elements so conjoined, e.g., elements that are conjunctively present in some cases and disjunctively present in other cases. Other elements may optionally be present other than the elements specifically identified by the "and/or" clause, whether related or unrelated to those elements specifically identified unless clearly indicated to the contrary.

As used herein, expressions such as "at least one of," when preceding a list of elements, modify the entire list of elements and do not modify the individual elements of the list.

"About," "approximately," or "substantially" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about," "approximately," or "substantially" can mean within one or more standard deviations, or within +30%, 20%, 10%, 5% of the stated value.

"Controlled-environment agriculture" (CEA), as used herein, includes technologies where all environmental factors can be controlled. Factors may include artificial control of light, environmental control (e.g. humidity, temperature, gases) and fertigation. CEA may include for example greenhouse, hydroponics, aquaculture, and aquaponics. CEA may also incorporate aspects of urban agriculture for plant growth such as raised beds, vertical gardening, container gardening and "growth chamber" production.

"Fertigation", as used herein, is combining fertilizer and irrigation, a common industry term used to denote the delivery of fertilizer via the irrigation solution (i.e.) irrigation water. Such water is referred to as fertigation water or fertigation solution (the terms are used synonymously herein). Fertigation water is essentially nutrient feed water as it contains the essential elements required for healthy plant growth. It consists of various proportions of fertilizers dissolved in water or a blend of fertilizer solutions to provide the nutrient complement required for healthy plant growth.

Captured fertigation water is leached nutrient feed water, that is, the fertigation water that has been captured after passing though the growing substrate. It may or may not be recycled. It can also be referred to as leachate or leach.

"Fertilizer water/solution" as used herein is a stock solution consisting of a single fertilizer, or several compatible fertilizers, dissolved in water (aqueous solution) containing the essential nutrients for plant growth. Fertilizers may be inorganic (chemical, wholly or partially synthetic origin and exclude carbon-containing materials) or organic (derived from the remains or byproducts of natural organisms such as animal excreta (manure), human excreta, and vegetable matter (e.g. compost and crop residues). Naturally occurring organic fertilizers include animal wastes from meat processing, peat, manure, slurry, and guano. Inorganic fertilizers may be classified according to whether they provide a single nutrient (e.g., K, P, or N), in which case they are classified as "straight fertilizers." "Multinutrient fertilizers" (or "complex fertilizers") provide two or more nutrients, for example N and P. Nitrogen-based straight fertilizers include ammonia and its solutions, ammonium nitrate ($NH_4NO_3$) and urea. The main straight phosphate fertilizers are the superphosphates. The main potassium-based straight fertilizer is Muriate of Potash (MOP).

"Hydroponic" as used herein is a method of growing plants without soil but instead use a mineral nutrient solution in a water solvent. Other non-soil substrates can be used to help with physical support of plant/roots during growth.

"Organic hydroponics" as used herein is a hydroponic culture system utilizing organic fertilizer. "Bioponics" as used herein is the soilless system components such as the media beds, troughs, structural supports such as rafts and so forth.

"Biomass" as used herein is a total mass of a plant (living matter) in a given area or volume. Biomass may also refer to a renewable resource of waste such as crop waste, wood, manure, types of garbage and the like.

Crop, as used herein, is a cultivated plant grown on a large scale commercially. The crop is understood not to be limited as understood by one of skill in the art. A crop may be edible or ornamental. "Plant" may be used interchangeably for "crop" herein. Within the scope of present invention, crops/plants to be protected typically comprise perennial and annual crops, such as but not limited in any manner to berry plants for example blackberries, blueberries, cranberries, raspberries and strawberries; cereals for example barley, maize (corn), millet, oats, rice, rye, sorghum triticale and wheat; fibre plants for example cotton, flax, hemp, jute and sisal; field crops for example sugar and fodder beet, coffee, hops, mustard, oilseed rape (canola), poppy, sugar cane, sunflower, tea and tobacco; fruit trees for example apple, apricot, avocado, banana, cherry, citrus, nectarine, peach, pear and plum; grasses for example Bermuda grass, blue-grass, bentgrass, centipede grass, fescue, ryegrass, St. Augustine grass and *Zoysia* grass; herbs such as basil, borage, chives, coriander, lavender, lovage, mint, oregano, parsley, rosemary, sage and thyme; legumes for example beans, lentils, peas and soya beans; nuts for example almond, cashew, ground nut, hazelnut, peanut, pecan, pistachio and walnut; palms for example oil palm; ornamentals for example flowers (floriculture), shrubs and trees; other trees, for example cacao, coconut, olive and rubber; vegetables for example asparagus, aubergine, broccoli, cabbage, carrot, cucumber, garlic, lettuce, marrow, melon, okra, onion, pepper, potato, pumpkin, rhubarb, spinach and tomato; vines for example grapes; and *Cannabis* for example, *Cannabis sativa, Cannabis indica* and *Cannabis ruderalis*.

The useful plants and/or target crops in accordance with the invention include conventional as well as genetically enhanced or engineered varieties.

Crop security, as used herein, is being free from danger or threat from pathogens, phytotoxic chemical contaminants, and/or nutrient imbalances.

The term "remove" as used herein is used meant to substantially eliminate to an undetectable level or a level safe for a living organism and/or crop.

The term "degrade" as used herein means to transform into a benign substance that is environmentally compatible.

The term "agrichemical" as used herein is a chemical used in agriculture, such as a pesticide or a fertilizer.

As used herein the term "pesticide" is a composite term that includes all chemicals that are used to kill or control pests. Pesticides are used to protect crops against insects, weeds, fungi, and other pests and play a significant role in food production by protecting or increasing yields, and the number of times per year a crop can be grown on the same land. In agriculture pesticides include herbicides (weeds), insecticides (insects), fungicides (fungi), nematocides (nematodes), and rodenticides (vertebrate poisons).

Pesticides include organophosphate pesticides and carbamate pesticides such as glyphosate (IUPAC name: N-(phosphonomethyl)glycine) and AMPA (aminomethylphosphonic acid, a toxic break down product of glyphosate) and paclobutrazol.

The acronym EFC, as used herein, is an electrochemical flow cell.

Disinfect, disinfecting, inactivate, are each used synonymously herein, as meaning to destroy and/or inhibit growth of a pathogen, to render a pathogen inert and not harmful to crops/plants. A "susceptible" pathogen is likely or liable to be influenced or harmed by the regenerated disinfectant as described herein.

The term "effective amount" means the quantity of disinfectant that is capable of producing an effect on the growth of pathogen. Controlling or modifying effects include all deviation from natural development, such as killing, retardation and the like, and prevention includes barrier or other defensive formation in or on a plant to prevent infection.

The acronym DSA, as used herein, is a dimensionally stable anode. Dimensionally stable anodes are basically a titanium skeleton covered with electrocatalytically active mixtures of oxides. These anodes consist of mainly ruthenium oxide deposited on titanium along with other metallic oxides like platinum, iridium, palladium, rodium and titanium. Dimensionally stable anodes preserve their shape and voltage characteristics even under severe conditions of anodic attack. They exhibit dimensional stability, longer life and function effectively at higher current densities.

Regenerative mediated electrolysis, as used herein, is a process in which chloride ions are transformed to free chlorine forms (e.g., hypochlorous acid) which neutralizes pathogens and in this process releases chloride ions back to the solution. The chloride ions migrate back to the anode through electrostatic migration where once again they can be transformed to free chlorine forms leading to further pathogen inactivation.

A general non-limiting overview of the invention and practising the invention is presented below. The overview outlines exemplary practice of embodiments/aspects of the invention, providing a constructive basis for variant and/or alternative and/or divergent aspects/embodiments, some of which are subsequently described.

In situ electrochemical methods and systems are herein developed for the treatment of aqueous solutions for use in a variety of agricultural, municipal and industrial applications. In CEA operations treatment of recycling fertigation water is desired in order to decrease pathogens, provide stabile nutrients to the growing plants, degrade contaminants such as pesticides; degrade recalcitrant organic contaminants; and/or degrade organic fertilizers to provide nutrient ions for plant growth. Solutions of organic waste can be treated to degrade and solubilize plant nutrients, and thus be transformed into a source of organic fertigation water for use in CEA such as in hydroponics. Municipal and industrial used water (waste water) can be subjected to the in situ electrochemical methods of the invention to degrade organic and non-organic contaminants and destroy pathogens. The in situ electrochemical treatment systems of the invention can also be incorporated within a wastewater treatment plant.

In one non-limiting embodiment, in situ electrochemical methods, and systems incorporating the methods, are herein developed for the treatment of fertigation water that is used primarily in CEA operations where recycling of fertigation water is desired.

This demonstrates many benefits and substantiates the process which can be implemented in Controlled Environment Agriculture. The electrochemical process for in situ treatment of a recirculating nutrient can be used successfully for commercial floriculture production with plants propagated in soil. The technology is effective for pathogen removal without posing phytotoxic effects to crops. The technology is also demonstrated that it can be utilized in conventional hydroponic systems. With fertilizers containing $NH_4^+$, the system can be used successfully with lower current densities, which do not release chloramines at concentrations higher than the phytotoxic threshold (0.2 mg/L $NH_4Cl$). If higher current densities are needed for operations, tertiary treatment methods such as UV light may be used to produce crops without negative impacts on growth. Furthermore, $NO_3$ based fertilizers without the presence of $NH_4^+$ presents the best option for growers and provides crop yields in which are equivalent or enhanced in comparison to conventional hydroponic methods without water treatment.

The electrochemical process with BDD electrodes can be successfully used for mineralizing organic materials and solubilize nutrients in which can be used for hydroponics or conventional irrigation systems. This allows for a variety of organic waste materials to be used in hydroponic and other irrigation systems decreasing reliance on synthetic fertilizers. The electrochemical processes are also effective to remove/degrade undesired agrichemicals such as pesticides from the fertigation water.

An electrochemical flow cell (EFC) system is employed with each cell comprising a plurality of dimensionally stable anodes (DSA) and complementary cathodes (collectively an electrode array) supported within a casing/housing that may be any suitable material such as but not limited to acrylic. In one embodiment, the DSA may be $RuO_2$ and the complementary cathode stainless steel. The EFC may comprise a set of six $RuO_2$ DSA and a set of five complementary stainless steel cathodes spaced apart therefrom. In one embodiment, each cathode is spaced about 2 mm apart from each of its complementary anode. Generally, the closer the electrodes, the better the electron transfer is, and the less conductivity the influent fertigation water needs to have. However, the electrodes may be further apart and still be effective. The electrodes should not be in direct contact with each other.

Fertigation water to be treated is pumped via a variable speed peristaltic pump into the bottom entry port of the EFC housing and upwards through the electrodes, exiting the cell at an outflow port at the top of the housing. A power supply is connected to both anode and cathode of the flow cell. Multimeters are provided with direct connection to the anode and cathode of the cell for measuring the applied voltage. It is understood by one of skill in the art, that the electrochemical flow cell (EFC) system employed may be scaled to a desired size and volume of fertigation water, used in series, and further connected to an irrigation system to deliver the treated fertigation water to the crop and collect run off for pooling and recirculation. It is also understood that the scaled system may further comprise a variety of sensors and so forth for operation. A pre-filter may be added in the influent fertigation water stream or a post-filter may be added in the effluent treated fertigation stream to catch particles. The EFC may have any practically useful shape that may be utilized for fertigation water purification purposes. The shape of the EFC cell is not limited.

The EFC according to any embodiment, may further include an oxidation-reduction potential sensor, a pH sensor, a chlorine sensor, a conductivity sensor, a flow rate sensor, a temperature sensor, or a combination thereof.

In another embodiment, EFC may include two or more sequentially connected individual flow-through cells. The treated fertigation water may be delivered to the next flow-through cell, where a purification process is repeated.

In an embodiment, the electrodes used are BDD. In this aspect, advantageously the fertigation water is nutrient enhanced during treatment thereof by releasing ammonium into solution that is converted to nitrates thus being bioavailable to the crop(s) irrigated with the treated fertigation solution. Thus the recycling of fertigation water within the system in accordance with the methods described herein functions to enrich the treated fertigation water (with ammonium, nitrate, sulphate and calcium) and encourage crop growth. In this embodiment using BDD as the anodes, chloride may further be added to enhance inactivation of pathogens as is understood by one of skill in the art.

Electrochemical methods, and systems incorporating the methods, are now developed for the treatment of fertigation water that is used primarily in CEA operations where recycling of fertigation water is desired. The methods are effective to remove/degrade undesired agrichemicals such as pesticides from the fertigation water. It is desired to remove harmful pesticides such as for example glyphosate and paclobutrazol from the fertigation water in order not to be harmful to the crop to which the fertigation water is used. Further, pesticides can be absorbed by plants through the leaves and roots and can translocate to other parts of the plant. Crops irrigated with pesticide contaminated fertigation water are undesirable for human health.

In an embodiment, electrochemical treatment of fertigation water, as used in controlled environment agriculture, is used to remove/degrade pesticides to safe/safer levels for both the irrigated crop as well as for humans when the crop is consumed. The method and system are useful in recirculating irrigation systems employing fertigation water.

It is surprisingly demonstrated that electrochemical treatment of irrigation water, fertigation water, using either or both DSA and BDD effectively removes/degrades glyphosate and paclobutrazol therein. The DSA electrodes were demonstrated to degrade glyphosate more effectively than paclobutrazol. BDD electrodes were demonstrated to degrade paclobutrazol more effectively than glyphosate. Both DSA and BDD can however, be used effectively to degrade both glyphosate and paclobutrazol. Both of these electrochemical systems may incorporate chlorination monitored with respect to plant growth. The water treatment methods (DSA and BDD) were demonstrated effective at removing glyphosate from solution to levels that would remediate plant health. BDD electrodes had shown to also increase plant growth following treatment with glyphosate in comparison to the control sample. All of the water treatment methods were also shown to remove paclobutrazol in solution but at lower efficiency to that of glyphosate. Using BDD electrodes with longer contact times increased the efficiency of paclobutrazol removal thus improving water quality and plant growth.

The electrochemical methods used herein demonstrated the ability to remove pesticides such that they could be used in crop production systems using fertigation water.

An electrochemical flow cell (EFC) system is employed with each cell comprising a plurality of dimensionally stable anodes (DSA) and complementary cathodes (collectively an electrode array) supported within a casing/housing that may be any suitable material such as but not limited to acrylic. In one embodiment, the DSA may be $RuO_2$ and the complementary cathode stainless steel. The EFC may comprise a set of six $RuO_2$ DSA and a set of five complementary stainless steel cathodes spaced apart therefrom. In one embodiment, each cathode is spaced about 2 mm apart from each of its complementary anode. Generally, the closer the electrodes, the better the electron transfer is, and the less conductivity the influent fertigation water needs to have. However, the electrodes may be further apart and still be effective. The electrodes should not be in direct contact with each other.

Fertigation water to be treated is pumped via a variable speed peristaltic pump into the bottom entry port of the EFC housing and upwards through the electrodes, exiting the cell at an outflow port at the top of the housing. A power supply is connected to both anode and cathode of the flow cell. Multimeters are provided with direct connection to the anode and cathode of the cell for measuring the applied voltage. It is understood by one of skill in the art, that the electrochemical flow cell (EFC) system employed may be scaled to a desired size and volume of fertigation water, used in series, and further connected to an irrigation system to deliver the treated fertigation water to the crop and collect run off for pooling and recirculation. It is also understood that the scaled system may further comprise a variety of sensors and so forth for operation. A pre-filter may be added in the influent fertigation water stream or a post-filter may be added in the effluent treated fertigation stream to catch particles. The EFC may have any practically useful shape that may be utilized for fertigation water purification purposes. The shape of the EFC cell is not limited.

The EFC according to any embodiment, may further include an oxidation-reduction potential sensor, a pH sensor, a chlorine sensor, a conductivity sensor, a flow rate sensor, a temperature sensor, or a combination thereof.

In another embodiment, EFC may include two or more sequentially connected individual flow-through cells. The treated fertigation water may be delivered to the next flow-through cell, where the purification process is repeated.

Using this electrochemical cell system, the removal/degradation of a pesticide (for example, glyphosate and/or paclobutrazol) is achieved through the manipulation, in isolation or in combination, of the applied current, contact time.

In a further embodiment, the electrodes used are BDD to continuously produce reactive oxygen species (ROS) to remove/degrade a pesticide (for example, glyphosate and/or paclobutrazol). In this aspect, advantageously the fertigation water is nutrient enhanced during treatment thereof by releasing ammonium into solution that is converted to nitrates thus being bioavailable to the crop(s) irrigated with the treated fertigation solution. Thus the recycling of fertigation water within the system in accordance with the methods described herein functions to enrich the treated fertigation water (with ammonium, nitrate, sulphate and calcium) and encourage crop growth.

The methods and systems described herein are suitable for use for any fertigation water that comprises either inorganic or organic fertilizer and even mixtures thereof. In aspects, organic fertilizer water is employed with an EFC incorporating BDD.

The methods and systems may be employed in any fertigation irrigation system for any type of CEA employing recycling of their fertigation water.

The methods and systems described herein are suitable for the treatment of any fertigation water used for any desired crop, edible or ornamental. In aspects, the methods and systems are beneficial for growing *cannabis* such as for example in greenhouses and further hydroponically utilizing treated fertigation water of the invention and recycled treated fertigation water.

The methods and systems described herein are suitable for use for any fertigation water that comprises either inorganic or organic fertilizer and even mixtures thereof. In aspects, organic fertilizer water is employed with an EFC incorporating BDD.

The methods and systems may be employed in any fertigation irrigation system for any type of CEA employing recycling of their fertigation water.

The methods and systems described herein are suitable for use for any desired crop, edible or ornamental. In aspects, the methods and systems are beneficial for growing *cannabis* such as for example in greenhouses and further hydroponically utilizing treated fertigation water of the invention and recycled treated fertigation water.

To summarize, in situ electrochemical systems and methods are now developed for the treatment of aqueous solutions for a variety of applications. Aqueous solutions, such as fertigation water, can be continuously treated in agricultural irrigation systems to degrade undesired contaminants and destroy pathogens—both of which are harmful to crops/plants. It has also been surprisingly found that the systems and methods maintain sustainable nutrient solutions for the growing plants without toxic built up of chloramine or chloride. As such, the systems and methods can be continuously used in agriculture for a crop for weeks and months as desired. The systems and methods are not only for treatment of the fertigation water (inorganic and organic fertigation water) but also used in a preventative manner in order that pathogens do not invade the fertigation water or if any amounts of contaminant such as an pesticide finds its way into the fertigation water, it will be degraded. The systems and methods of the invention can also be used to treat organic waste solutions and in this manner, make them suitable for use as an organic fertigation water.

The systems and methods of the invention also have use in industrial process water treatment. The systems and EFC cells can be incorporated into conventional water treatment systems for prevention of contamination by pathogens and recalcitrant organic contaminants and further, treatment of a water source can make it more potable for drinking and other uses. UV can be further used on treated effluent water.

The descriptions of the various embodiments and/or examples of the present invention have been presented for purposes of illustration but are not intended to be exhaustive or limited to the embodiments and/or examples disclosed. Many modifications and variations will be apparent to those of ordinary skill in the art without departing from the scope and spirit of the described embodiments. The terminology used herein was chosen to best explain the principles of the embodiments, the practical application, or to enable further understanding of the embodiments disclosed herein.

EXAMPLES

Example 1 Inactivation of Rhizoctonia solani in Fertigation Water Using Regenerative In Situ Electrochemical Hypochlorination with Ruthenium Oxide DSA

Materials and Methods

Pathogen Cultures

A pure culture of Rhizoctonia solani was provided courtesy of Dr. Allen Xue from the Plant Pathology Ottawa Research and Development Centre, Agriculture and Agri-Food Canada. Mycelia were inoculated onto potato dextrose agar (PDA) (B213400, Fisher Scientific, Canada) containing 0.1 g/L of streptomycin sulfate (BP910-50, Fisher Scientific, Canada) and 0.05 g/L of ampicillin sodium salt (BP1760-25, Fisher Scientific, Canada). The plates were then incubated on the laboratory bench inside a clear plastic container at room temperature (~23° C.) and ambient light levels. After incubation for seven days the plates were fully covered with mycelia, at which point five 1 $cm^2$ sections of the mycelia mat were excised from the outer edge of the petri dish and placed into 250 mL Erlenmeyer flasks, each containing 100 ml Potato Dextrose Broth (PDB) (B254920, Fisher Scientific, Canada). The suspension was then placed in an incubator (Innova 4340, New Brunswick Scientific, USA) for 8 days at 30° C. under a 12 hr photoperiod. The cultured mycelia were then transferred to a blender (HH-362, E.F. Appliances Canada LTD.) and blended for 30 seconds. A pipette (4642110, Thermo Scientific, USA) was used to inoculate 10 ml of the suspension into new Erlenmeyer flasks with 250 mL of PDB and further incubated for another 8 days under the same conditions previously described.

Test Solution Preparation

Rhizoctonia solani cultures were vacuum filtered through a 1.5 μm filter disk (Whatman 934-AH) to separate the mycelia from the liquid broth. The mycelia were rinsed off the filter disk with deionized (DI) water and deposited in a 500 mL sterile beaker and filled to 300 mL with DI water. The suspension was then transferred to a blender and blended for 1 minute. The blended suspension was then added to a 60-litre reservoir containing 30 litres of DI water. This solution was then subjected to the electrochemical treatment.

The fertilizer solutions with added chloride, in the form of potassium chloride ((P330-500), Fisher Scientific, Canada), were prepared by weighing out (TE 124S, Sartorius, Germany) appropriate amounts of stock material (20-8-20 Plant Prod, 10561, Master Plant-Prod Inc., Canada; ammonium sulphate (A702-3) and potassium chloride) to bring the final solution volume to the targeted concentrations for each experiment (Table 1). The Plant Prod fertilizer consisted of Nitrate (4.3 mmol/L), Phosphate (0.55 mmol/L), Ammonium (2.64 mmol/L) and Potassium (2.80 mmol/L) at 0.5 grams per liter of solution. Other ions in trace amounts are Sulphate (40 μmol/L), Sodium (150 μmol/L), Magnesium (60 μmol/L), Calcium (30 μmol/L) and Nitrite was not initially present. Individual macronutrient ions from a 0.5 g/L solution were measured with a Shimadzu HPLC system consisting of a DGU-20A3 degasser, a SIL-10AP autosampler, two LC-20AT pumps, two CDD-10A VP conductivity detectors, CTO-20AC column oven, and CBM-20A system controller. Total Nitrogen was measured using a Shimadzu TNM-1 unit (Shimadzu Scientific Instruments, USA).

TABLE 1

Fertigation solution composition summary for each experiment presented. Solution compositions are cross referenced with their respective figures for clarity.

Figure 3:
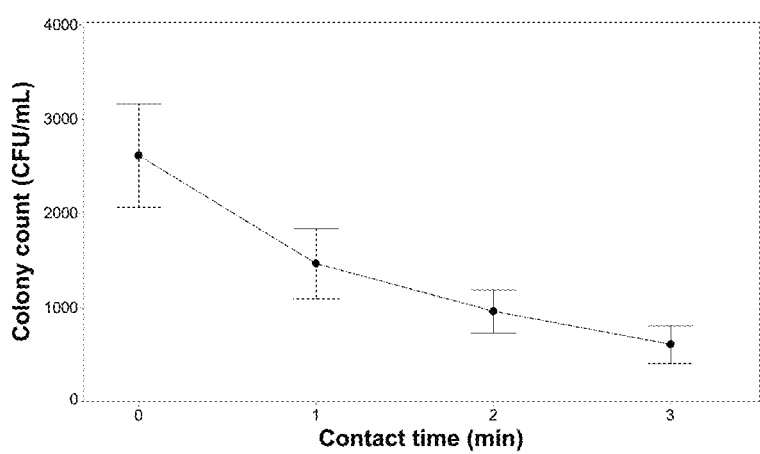
FIG. 3: Inactivation of *Rhizoctonia solani* (*R. solani*) as a function of contact time, while maintaining a constant current density of 0.76 $mA/cm^2$. The test solution only contained deionized water with free floating mycelia and did not contain fertilizer or chloride salts for the experiment. Without the presence of a supporting electrolyte in solution gave an operating voltage for this specific experiment ~ 32 volts. Error bars are ±SEM, N=3, n=3.
Figure 4A:
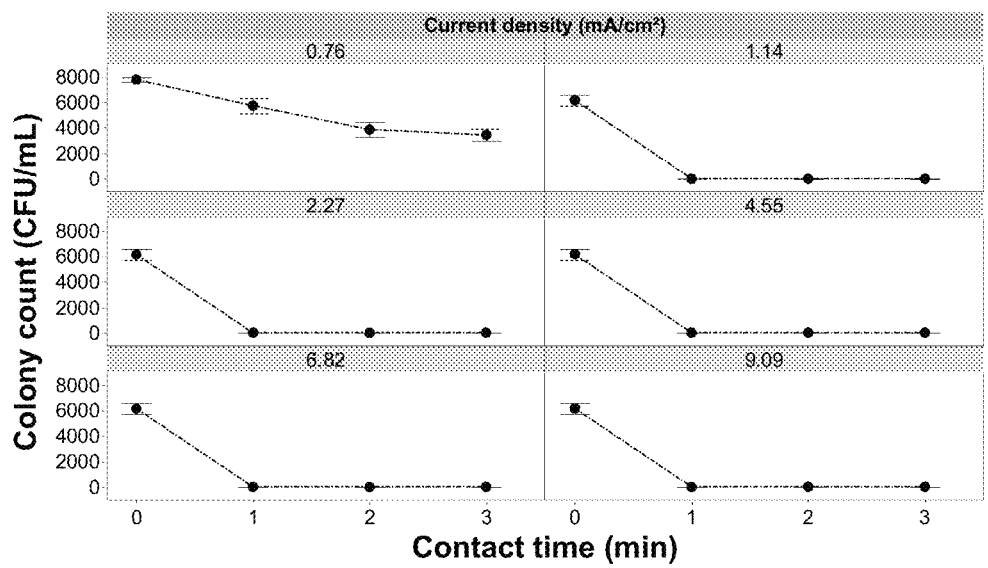
FIG. 4B depicts effluent free chlorine concentration from the EFC after treatment of *Rhizoctonia solani* with 20 mg/L of chloride with no fertilizer present. Error bars are ±SEM, N=3, n=3.
Figure 4B:
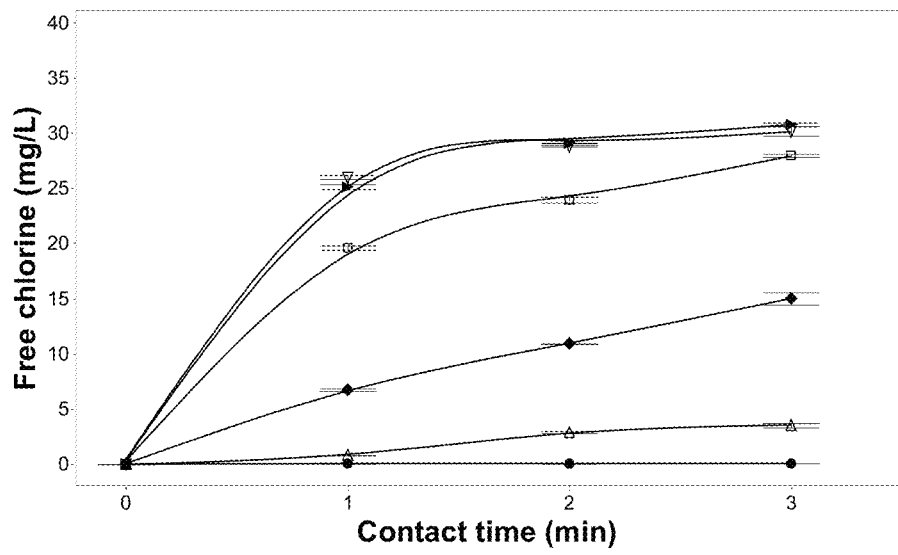
Figure 5:
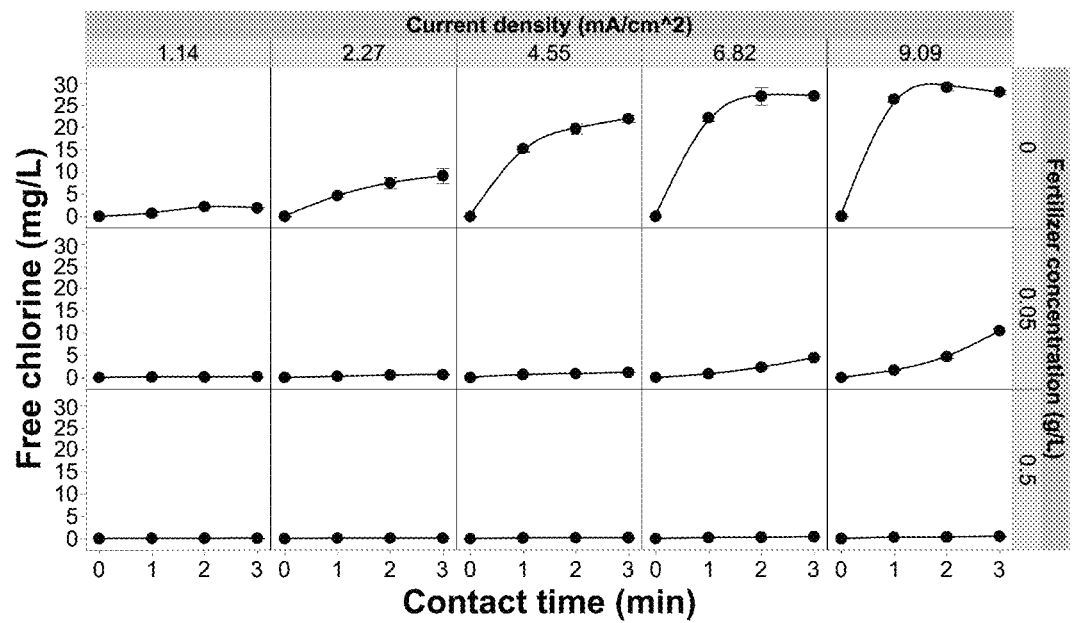
FIG. 5: Effluent free chlorine measured from the EFC as a function of current density, contact time, as well as varying the concentration of fertilizer in solution. All of these experiments were conducted with a chloride concentration of 20 mg/L. Error bars are ±SEM, N=3, n=3. Where error bars are not shown they are too small to be visible behind the symbol.
Figure 6A:
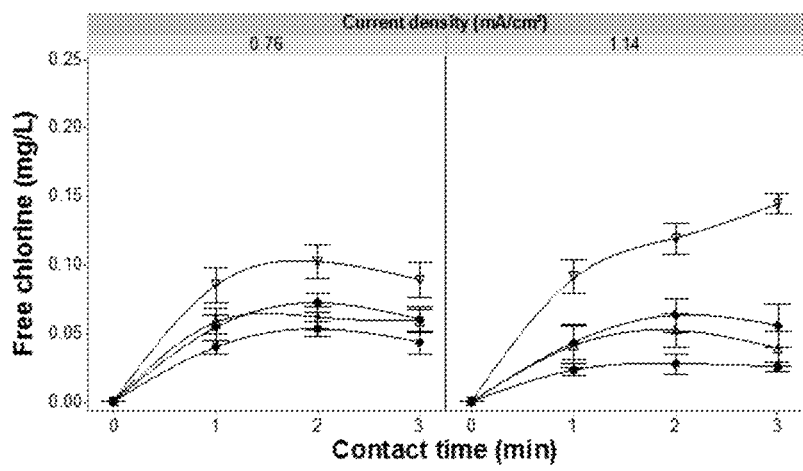
FIG. 6A Inactivation of *Rhizoctonia solani* as a function of current density with a fertilizer concentration of 0.5 g/L and increasing chloride concentration.
Figure 6B:
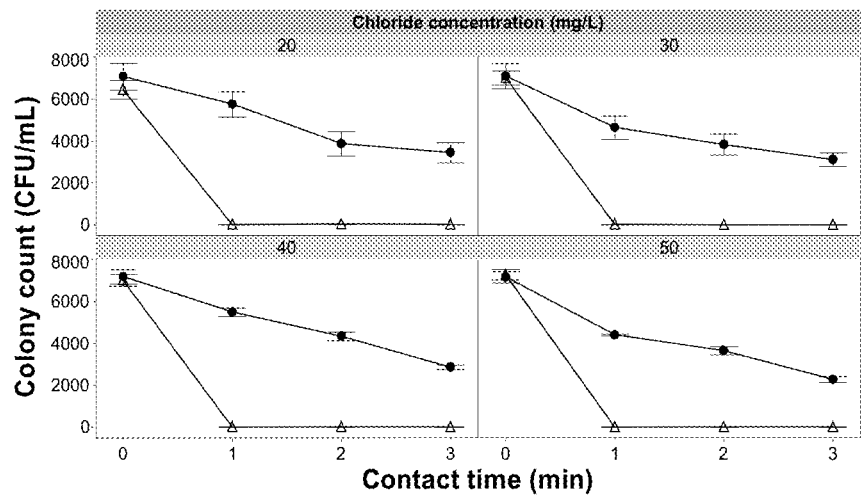
FIG. 6B depicts effluent free chlorine concentrations observed under the same parameters while increasing the concentration of chloride. Error bars are ±SEM, N=3, n=3.
Figure 7A:
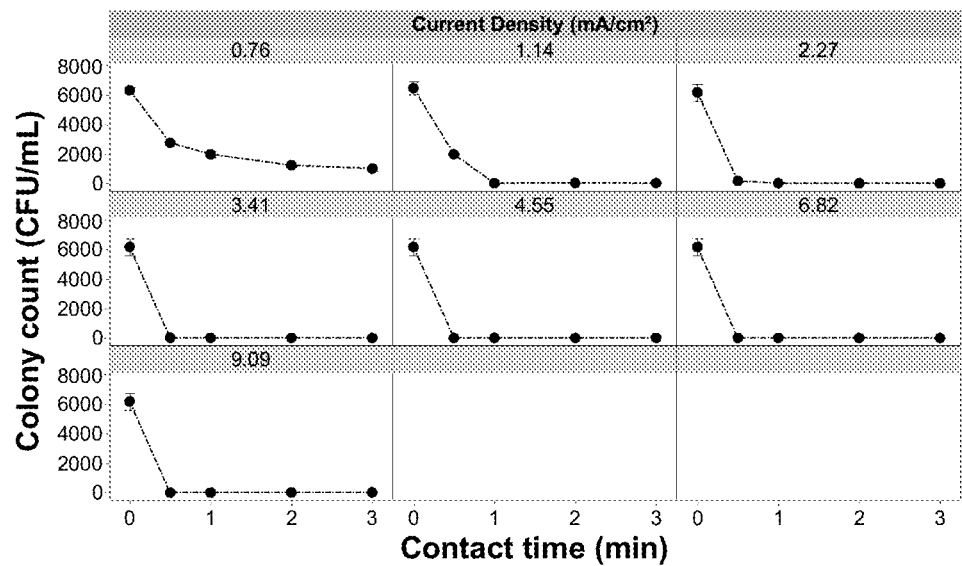
FIG. 7A *Rhizoctonia solani* inactivation as a function of current density and contact time with 20 mg/L of chloride and 0.5 g/L of fertilizer in solution, and FIG. 7B effluent free chlorine from the EFC with applying variable current densities and contact times with the same test solution. Error bars are ±SEM, N=3, n=3.
Figure 7B:
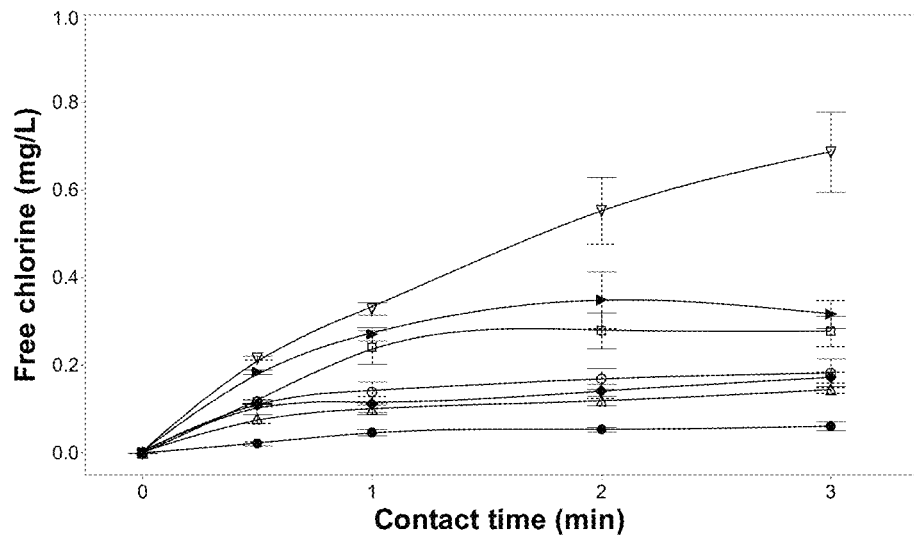
Figure 8A:
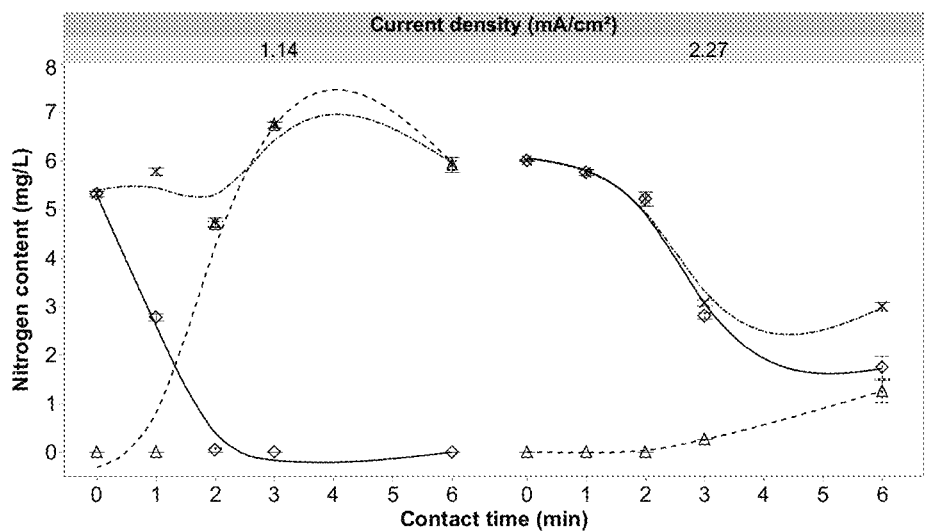
FIG. 8A Nitrogen dynamics as a function of current density (1.14 & 2.27 $mA/cm^2$) and contact time of the solution containing $(NH_4)_2SO_4$ as the supporting electrolyte (relative to 0.05 g/L of 20-8-20 Plant Prod fertilizer) and 20 mg/L of chloride.
Figure 8B:
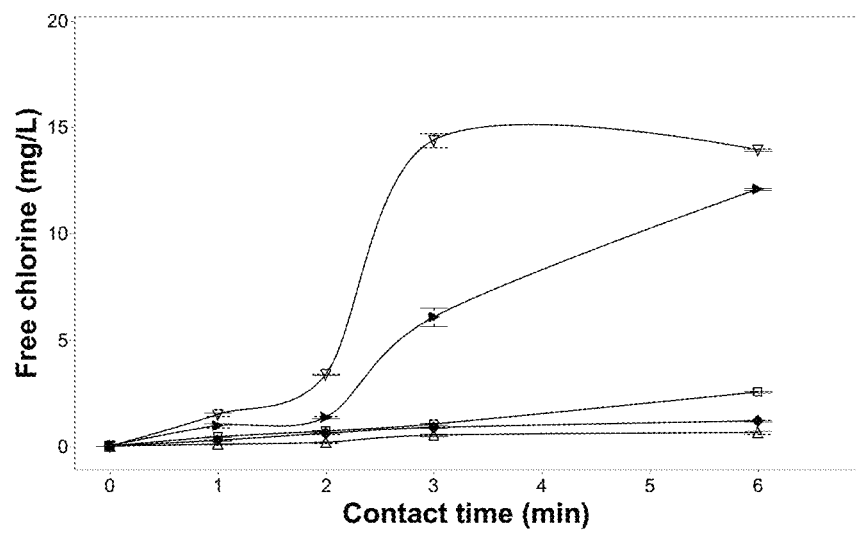
FIG. 8B shows effluent free chlorine concentration as a function of current density and contact time. Error bars are ±SEM, N=3, n=3.

| Figure | Chloride (Cl⁻) concentration (mg/L) | Fertilizer type | Fertilizer concentration (g/L) |
|---|---|---|---|
| FIG. 3 | 0 | N/A | 0 |
| FIG. 4a & 4b | 20 | N/A | 0 |
| FIGS. 5 | 20 | Plant Prod (20-8-20) | 0-0.5 |
| FIGS. 6a & 6b | 20-50 | Plant Prod (20-8-20) | 0.5 |
| FIGS. 7a & 7b | 20 | Plant Prod (20-8-20) | 0.5 |
| FIG. 8a & 8b | 20 | $(NH_4)_2SO_4$ | 0.02 |

Electrochemical Flow Cell and Operation Procedures

Figure 2A:
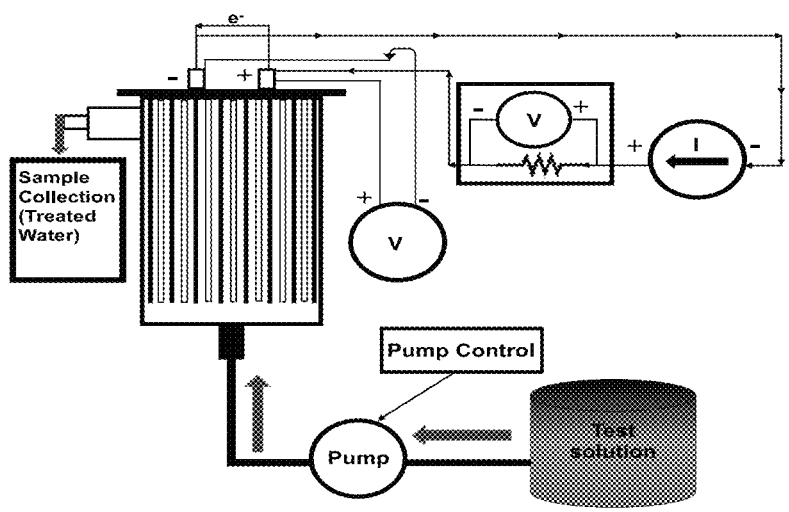
FIG. 2A depicts an Electrochemical Flow Cell (EFC) testbed schematic showing the principle components and the direction of the electrical current depicted by arrows used for the experimental setup and FIG. 2B the EFC with red arrows depicting the flow path and FIG. 2C is monitoring and controlling components for flow rate (F), current (A), voltage (V), and the use of the power supply (P).
Figure 2B:
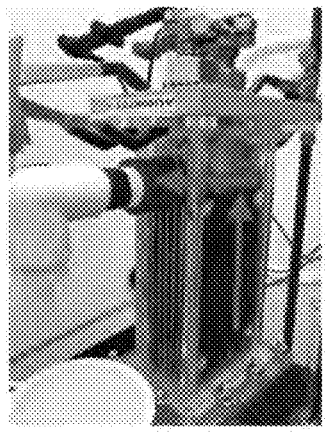
Figure 2C:
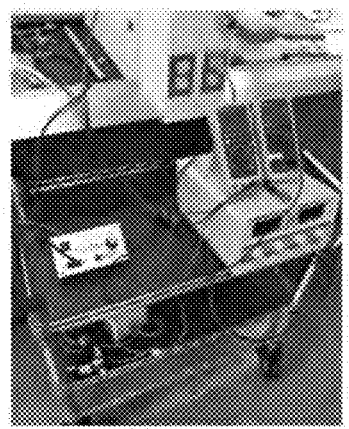

The electrochemical flow cell (EFC) system used consisted of a set of six $RuO_2$ dimensionally stable anodes (DSA) (De Nora Tech, Concord, USA) and a complementary set of five stainless steel cathodes, spaced 2 mm apart, in an acrylic casing. The total area of the anodes was 1320 $cm^2$. Solutions entered the cell from the bottom, passed upwards through the electrodes, and exited the cell at an outflow port at the top of the housing (FIGS. 2A & 2B). A power supply (DF1730SC 20A DC power supply, Gold Source, China) was connected to the anode and cathode of the flow cell. The applied current value was derived from the voltage drop measured across a precision current resistor (RS-50-100, RIEDON, Alhambra, CA) using a multimeter (Fluke 189, Fluke Corporation, Canada). A second multimeter (Fluke 87, Fluke Corporation, Canada) connected directly to the anode and cathode of the cell measured the applied voltage (FIG. 2C). A second multimeter is connected directly to the terminals of the anode and cathode array to measure the applied voltage. A variable speed peristaltic pump (Cole-Parmer 1-100 RPM) drew water from the test solution reservoir to the entry port located at the base of the flow cell.

The total free volume of the EFC, the internal volume of the housing less the volume of the electrode assembly, was 380 mL. The targeted contact times were achieved by adjusting the flow rates through the cell such that a given volume of solution would remain in contact with the electrodes for the desired time interval.

Untreated samples were collected from the main reservoir at the start, middle, and end of each experiment. Colony counts from each time point were averaged and used as the control or starting value for each test condition examined in a given experiment. Three effluent samples were collected from the outlet of the EFC for each treatment combination. The first sample was collected after three cell volumes (1140 ml) had passed through the flow cell, while samples two and three were collected after one and two additional flow cell volumes had passed through the system. Samples were collected in 40 ml clear plastic HDPE vials (20120121, Richard's Plastics, Canada). The pH (542, Corning, USA) and free chlorine concentration, for solutions containing chloride, were measured prior to microbial enumeration. Free chlorine from the bulk solution was measured according to the manufacturer's methods using DPD Test 'N Tube cuvette with free chlorine reagent set (2105545, Hach Company, USA) and a DR/850 portable colorimeter (4845000, Hach Company, USA). The samples were then serially diluted ($10^1$, $10^2$, $10^3$ and $10^4$) in glass test tubes and a 100 µL aliquot from each was spread onto plates with PDA and antibiotics under a laminar flow hood. Plates were inverted and incubated at 30° C. under 12-hr photoperiod at 100 µmol·$m^{-2}$·$s^{-1}$ photosynthetically active radiation light for 2 days. Total colony forming units per milliliter (CFU/ml) were counted after the incubation period elapsed.

Statistical Analysis

Statistical analyses were performed using JMP version 14.0 (SAS Institute Inc, Cary, NC). The residuals between data points and predicted values were tested for normality using the Shapiro-Wilk test. Data that did not pass were transformed and the analysis was conducted on the transformed data. Simple and multiple linear regression was performed on individual experiment sets. Summary of fit from linear regression models used the adjusted R squared values and significance was determined using $\alpha=0.05$. Linear regression analysis was conducted to determine any effects on [individual] nutrient composition.

Control Experiments—Zero Current Control

A control experiment was conducted at several contact times with solutions containing *R. solani*, fertilizer (0.5 g/L Plant Prod), and 20 mg/L of chloride but without any applied current. There was no reduction in pathogen counts, indicating that there was no physical mechanism (e.g., a filtering effect) that may have been acting to reduce pathogen counts.

Pathogen Inactivation without the Presence of Fertilizer or Chloride

FIG. 3 shows the inactivation of *Rhizoctonia solani* when applying a current density of 0.76 mA/$cm^2$ without the presence of fertilizer and chloride. When the soluble fertilizer and chloride are absent and a low current density (0.76 mA/$cm^2$) is applied there is a detectable inactivation of *Rhizoctonia solani*. Pathogen inactivation increased with increasing contact time (FIG. 3), with a 77% reduction after a 3-minute exposure. The pH of the solution also remained stable at ~5.5 throughout all contact times that were tested.

The observed inactivation under these conditions (operating voltage for this experiment was ~32V) may be due to the acidic environment in the immediate vicinity of the anodes as low pH levels causing non-enzymatic proteolysis on the mycelial sheath of *Rhizoctonia solani*, ultimately leading to cell death; the higher applied potential could also induce electroporation, a process by which the cell membrane becomes increasingly permeable (increasing the porosity of the cell envelope leads to leakage of cellular material) ultimately leading to loss of function and cell death; direct oxidation of polysaccharides at the anode; protein extraction (cleavage of disulfide and/or peptide bonds due to the discharge of water and dissolved oxygen molecules) at the cathode; or reductive hydrogen peroxide production at the cathode.

Inactivation of *Rhizoctonia solani* in a Solution Containing Chloride

In the absence of fertilizer salts, the EFC achieved complete pathogen inactivation at all but the lowest current densities (0.76 & 1.14 mA/$cm^2$) for the 1-min contact time when chloride (20 mg/L) was present in the solution (FIG. 4A). The 20 mg/L chloride concentration was chosen as it was well below the reported phytotoxic thresholds of most crops (species specific) (Ibrahim et al., 2015) and showed efficacy in preliminary testing (data not shown). At a current density of 0.76 mA/$cm^2$ pathogen inactivation was greatly enhanced in comparison to the previous experiment in which there was no chloride or fertilizer present (FIGS. 3 & 4A). Although, when considered in combination with the results shown in FIG. 4, it appears that a current density of 0.76 mA/$cm^2$ while effective, may not provide the required energy to generate a sufficient amount of free chlorine to completely control pathogens. A free chlorine residual was measured and complete inactivation was achieved at a current density of 1.14 mA/$cm^2$ after a 2-min contact time, indicating that the critical current density threshold lies somewhere between 0.76 and 1.14 mA/$cm^2$. This result shows the EFC's ability to achieve complete inactivation with a lower contact time of 2-minutes and releasing an even lower free chlorine concentration (~2.88 mg/L). Beyond a current density of 1.14 mA/$cm^2$, complete inactivation was achieved by the 1-min contact time (FIG. 4A), which is expected given the relatively high free chlorine levels achieved at these current densities (FIG. 4B).

Regression analysis was used to characterize the production of free chlorine as a function of contact time and current density. Results indicate that there is a significant relationship ($R^2=0.60$; $p<0.0001$) between contact time and current density. The pH was shown to respond proportionally to contact time, with pH increasing from 5.5 to as high as 8.5 at the longest contact times (data not shown).

The free chlorine residuals observed (FIG. 4B) are well beyond reported phytotoxic thresholds with a residual of ~25 mg/L for 6.82 mA/$cm^2$ at the 1-minute contact time. Under these solution conditions (e.g., raw irrigation water with trace chloride levels) there would be a need to include a free chlorine stripping step prior to crop application. This said, under these conditions the system could be used to generate sufficient free chlorine residuals to provide system-wide disinfection between crop cycles.

Free Chlorine Evolution with Increasing Fertilizer and Current Density

Pathogen inactivation efficacy was demonstrated in the presence of a representative commercial fertilizer. Effluent free chlorine levels at three different concentrations of commercial fertilizer were evaluated at a fixed chloride concentration of 20 mg/L in the absence of *Rhizoctonia solani* (FIG. 5). This chloride concentration is compatible with crop production but still provides sufficient chloride to generate phytotoxic levels of free chlorine in the absence of a free chlorine stripping step (FIG. 4B). FIG. 5 shows a positive correlation between the production of free chlorine and the contact time of the solution with the electrodes. Further, when increasing the current density there is a large increase in the amount of free chlorine produced in bulk solution when fertilizer levels are low (0 and 0.05 g/L). Although the free chlorine levels rose quickly they reach a plateau at about the 2-min contact for current densities of 6.82 and 9.09 mA/cm² when fertilizer was not present. The data presented in FIG. 5 indicates that the concentration of effluent chlorine at lower current densities is current limited, while at higher current densities the system becomes mass transport limited. Mass transport limitation was due to depletion of chloride ions at the anode-solution interface as local supplies of chloride were transformed to free chlorine. At higher current densities the conversion of chloride to free chlorine was greater than the replenishment rate of chloride, which lead to the observed plateau (FIG. 4B; FIG. 5). When fertilizer was introduced into the test solution, even in small amounts (i.e., 0.05 g/L), the free chlorine residuals decreased by as much as two orders of magnitude (FIG. 5, middle row panels). At an application rate of 0.5 g/L, the free chlorine dropped to <1 mg/L; well below reported phytotoxic thresholds (~2.5 mg/L).

The introduction of fertilizer clearly reduced the residual free chlorine concentrations in the test solutions (FIG. 5). Given the significant drop in free chlorine levels, even at modest fertilizer concentrations, fertility regimes should be considered when determining contact times and current densities in these types of systems. The dramatic reduction in effluent free chlorine in the presence of fertilizer indicated that there was a competing sink (in the fertilizer) for free chlorine. If the competing sink is more effective at consuming free chlorine than the pathogen inactivation mechanisms then the system would not be effective for pathogen control in typical greenhouse production systems. Conversely, the pathogen inactivation mechanisms predominated making it possible to control pathogens while taking advantage of the secondary sink present in the fertilizer to reduce the free chlorine levels below reported phytotoxic thresholds.

*Rhizoctonia solani* Inactivation Experiments—Pathogen Inactivation in the Presence of Fertilizer In order to determine the influence of the competing free chlorine sinks on pathogen inactivation efficacy, *Rhizoctonia solani* inactivation was determined in the presence of fertilizer while increasing both chloride concentrations (FIG. 6) and current densities (FIG. 7).

When chloride concentrations were increased from 20 to 50 mg/L under the lowest current density (0.76 mA/cm²), there was a modest increase (17%) in pathogen inactivation but not sufficient to result in complete inactivation even at the 3-min contact time (FIG. 6A). Increasing the current density to 1.14 mA/cm² resulted in complete inactivation at chloride levels 30, 40 & 50 mg/L beyond a 2-min contact time (FIG. 6A). Once again, at both current densities, the free chlorine residuals in the outflow were well below phototoxic thresholds (FIG. 6B). When increasing the concentration of reactants (chloride) at the anode surface, free chlorine concentrations in the bulk solution will increase concomitantly due to mass transport mechanisms that move the free chlorine away from the anode and into the bulk solution. Increased bulk solution free chlorine concentrations likely lead to the increased inactivation rates as more pathogen propagules would come into contact with free chlorine in the bulk solution relative to the limited anode surface area.

Free chlorine generation was monitored while maintaining constant current densities (0.76 mA/cm² and 1.14 mA/cm²) over increasing chloride concentrations (20 mg/L to 50 mg/L) (FIG. 6B). In this scenario there was a marginal increase in free chlorine leaving the EFC. However, this increase in free chlorine generation was minimal given the 2.5-fold increase in chloride concentration (FIG. 6A). It is clear that under the conditions tested, the manipulation of other process control mechanisms (e.g., current density and contact time) are more influential in achieving pathogen inactivation.

Inactivation of *Rhizoctonia solani* as a Function of Current Density

Increasing the current density while maintaining a constant chloride concentration (20 mg/L) increased pathogen inactivation efficacy (FIG. 7A). As current density increased more electrons became available [at the anode surface] to participate in the reactions leading to the formation of free chlorine. As this charge transfer increased, the amount of free chlorine produced was no longer current limited; rather, it became governed by the mass transfer efficiency of the system (FIG. 4B; FIG. 5). The increased free chlorine concentration at the anode supports a greater flux to the bulk solution where it is available to further react with free-floating pathogen cells. The EFC achieved higher inactivation rates of *Rhizoctonia solani* after a 1-min contact time, with the exception of the lowest current density (0.76 mA/cm²) (FIGS. 4A, 6A, 7A). When increasing the current density to 1.14 mA/cm², there was a 2.80 log reduction for the 1-minute contact time and beyond. When increasing the current to 2.27 or 3.41 mA/cm², a 3.75 log reduction was achieved at the 1-minute contact time. A current density of 4.55 mA/cm² achieved similar log reductions to lower current densities but inactivation was achieved in half the time (30 seconds). The highest current densities (6.82 and 9.09 mA/cm²) resulted in complete inactivation at all contact times tested.

When fertilizer is present in the test solution the effluent free chlorine residuals were consistently and considerably lower (<0.8 mg/L free chlorine) (FIG. 7B) than solutions that did not contain fertilizer (FIG. 4B) regardless of the current density applied. One of the main concerns with using free chlorine to treat irrigation water is phytotoxicity, which can occur at effluent concentrations as low at ~2.5 mg/L. Presently, the addition of fertilizer salts, at concentrations consistent with commercial recipes, reduced effluent free chlorine to levels compatible with crop production (Cayanan et al., 2009; Ibrahim et al., 2015); yet, the addition had negligible impacts on pathogen inactivation efficacy. Even at the highest current densities and contact times achievable with the current system, the effluent free chlorine residuals still remained well below reported phytotoxic thresholds (FIG. 5). The ability to apply these high currents and/or long contact times, without the threat of exposing the crop to phytotoxic levels of free chlorine, demonstrate that even recalcitrant pathogens could be controlled through the manipulation of contact time and/or current density.

Nitrogen Dynamics in the EFC System

The reduction in free chlorine residuals in the presence of fertilizer containing ammonium (FIG. 5) suggests that breakpoint chlorination occurred during treatment. Ammonium sulphate was used as a supporting electrolyte at a concentration of 0.02 g/L, which corresponds to the total nitrogen in the 0.05 g/L fertilizer solutions used in the other experiments presented (FIG. 5). At a current density of 1.14 mA/cm², the concentration of ammonium was inversely proportional to the contact time. However, the concentration of nitrate, which was not initially present, was also shown to be proportional to the contact time. The result was no net change in total nitrogen (FIG. 8A). At lower current densities, the conversion favoured nitrification (FIG. 8A). At higher current densities (e.g., 2.27 mA/cm²) nitrification also occurred; however, denitrification also became part of the overall process ultimately leading to a small net loss of total nitrogen from the solution. The amount of nitrogen lost from the solution increased modestly with increasing current densities (4.55-9.09 mA/cm$^2$; data not shown).

Free chlorine was shown to variably increase between the current densities and the contact times applied to the solution when containing ammonium sulphate (FIG. 8B). However, these levels of effluent free chlorine are smaller than the amount leaving the EFC in bulk solution when no fertilizer was present (FIG. 4B). The suspected cause for this decreased effluent free chlorine with the presence of fertilizer is due to the consumption by ammonium and transformations to other nitrogenous species due to direct oxidation by the anode and indirect oxidation from free chlorine. Maintaining the pH between 5.5 and 6.5, which is compatible with crop requirements, limits the amount of nitrogen lost from the system. The surface of the anodic working electrode for $RuO_2$ produces portions of $N_2$, $NO_2^-$ and $NO_3^-$, which are increasingly formed with higher pH and current densities. The conversion rates of these products are limited in undivided electrochemical cells, such as the one presented herein, in comparison to divided cells. Thus, the loss of total nitrogen will be limited due to the characteristics of the fertigation solution being treated and the use of an undivided cell.

At higher current densities, breakpoint chlorination has been demonstrated as the most likely mechanism for the consumption of free chlorine, while lower current densities favoured the formation of secondary reactions such as nitrate generation. Breakpoint chlorination is likely the predominant secondary sink for free chlorine in the present methods, however, the consumption of excess (beyond pathogen inactivation demand) free chlorine cannot be solely relied upon as only being caused by breakpoint chlorination. Other components in fertilizer also contribute to the consumption of free chlorine, such as ethylenediaminetetraacetic acid (EDTA), $Fe^{2+}$ and $Mn^{2+}$, Nutrient Stability Individual macronutrient ions from the 0.5 g/L fertilizer solution treated at a current density of 4.55 mA/cm$^2$ were measured. This current density was more than sufficient to inactivate pathogens under all test conditions, yet maintained residual free chlorine levels below phytotoxic levels in the presence of fertilizer (FIG. 4A, 5, 7A). The effluent concentration of chloride was shown to decrease in proportion to the amount of free chlorine leaving the EFC, which is consistent with the expected chlorine mass balance. Less transient chloride reductions could be due to degassing ($Cl_{2(g)}$), chloramination or free chlorine reacting inside pathogen cells and becoming bound. Nonetheless, the concentration of chloride in the effluent was found to be stable, demonstrating that in situ electrochemical hypochlorination continues to regenerate free chlorine while conserving chloride. All other measured nutrients were stable under the test conditions (data not shown) as determined by slope analysis (all slopes=0 at p<0.05), which demonstrated that nutrients can be conserved in this system under prescribed operational conditions.

Higher current densities and longer contact times were also tested and found to have only minor effects on select nutrient ions ($NO_3^-$, $K^+$ & $SO_4^{2-}$) (data not shown). pH in the solution is regulated to control increase nitrogen loss from the fertigation solution and chloramine formation. This said, pH is routinely adjusted in production systems and at typical fertigation solution pH levels (i.e., 5.4-6.5) nitrogen should be stable. Only minor effects on macronutrient ions were noted.

Direct Operational Costs

The electrolytic power cost was considered for the 2.27 mA/cm$^2$ current density profile (i.e., costs of ancillary equipment not included in calculations). This current density resulted in a high pathogen inactivation rate within a 1-min contact time or a flow rate of 380 mL/min (FIG. 7A), which is sufficient to accommodate a bench-scale crop production trial with a fertigation reservoir of 200 L. Under continuous operation, the current EFC configuration would use 0.447 kWh for treating 1000 L of solution. At an energy price of $0.12/kWh this translates to a treatment cost of $0.05/m$^3$. However, the time needed for treating this volume of irrigation solution is 43.86 hours. If using a current density of 4.55 mA/cm$^2$ at nearly double the flow rate (720 mL/min), the cost remains the same but the treatment time is reduced to 23.15 hours. These calculations are basic and do not account for additional energy and hardware costs, nor do they represent a reasonable treatment cycle.

Example 2—Boron Doped Diamond (BDD) Electrodes and Organic Fertilizer in the Electrochemical Cell System An organic fertilizer was added into solution and treated with Dimensionally Stable Anodes (DSA) and Boron Doped Diamond electrodes. The solutions were measured for TOC (total organic carbon), TN (total nitrogen) and individual ions in solution noting the differences prior and after treatment using both technologies.

The source of ammonium and nitrate in fertigation solution containing organic fertilizer was determined and revealed possible mechanisms for the inactivation of fungi. Further it was determined that BDD electrodes can be used with an organic fertilizer. Organic fertilizers contain proteins and the degradation products ($NH_4^+$ and $NO_3^-$) are not readily bioavailable for plant growth. The proteins need to be converted to other forms through bacterial degradation, which can be problematic for various reasons. Electrochemical mineralization of these organics and releasing these ions is demonstrated herein to be a reliable resource for providing these essential ions for crop growth in the fertigation solution.

Figure 9:
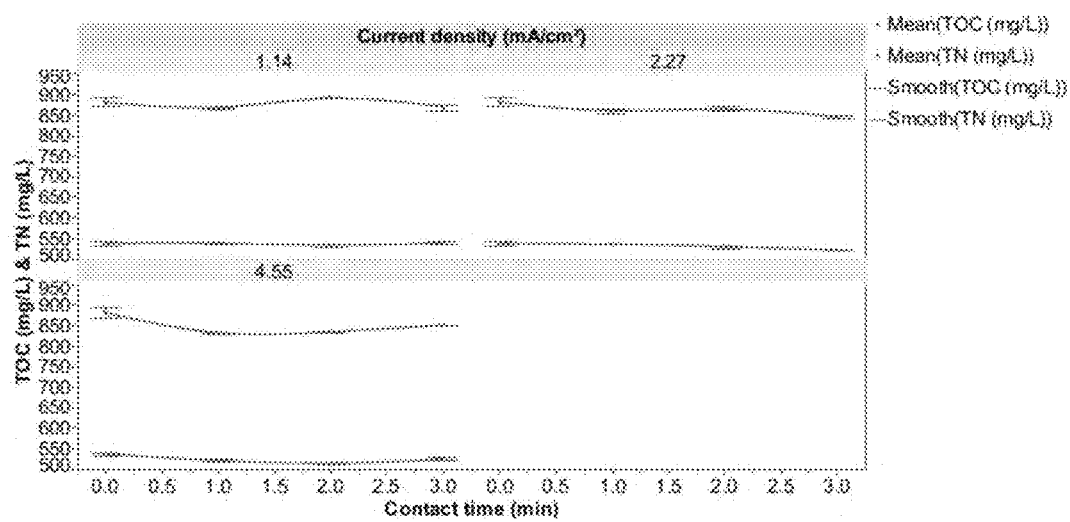
FIG. 9: TOC and TN of the organic fertilizer solution when treated with DSA's.
Figure 10A:
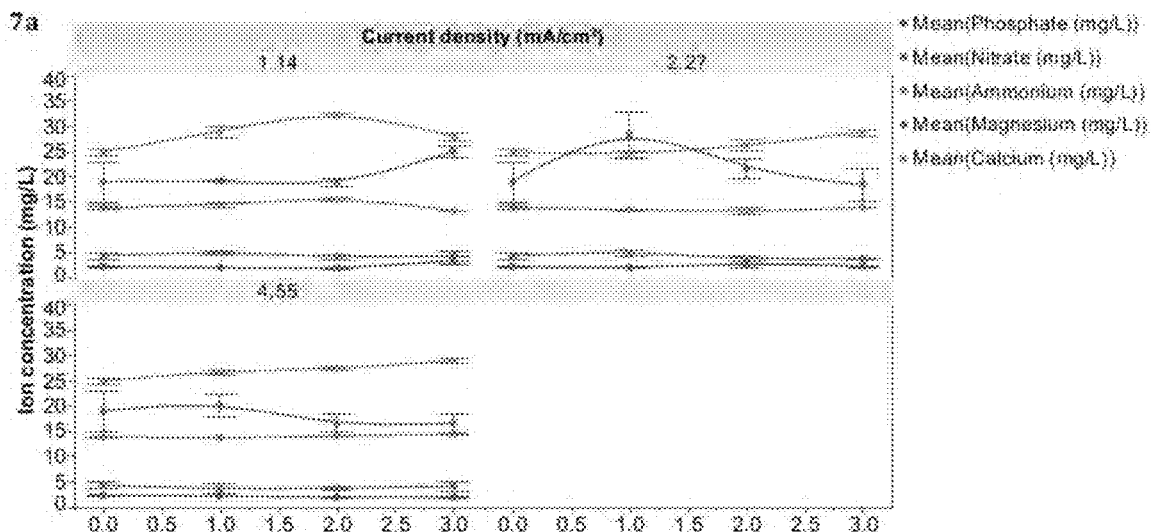
FIG. 10A shows concentration of different ions from the organic fertilizer solution when treated with DSA's.
Figure 10B:
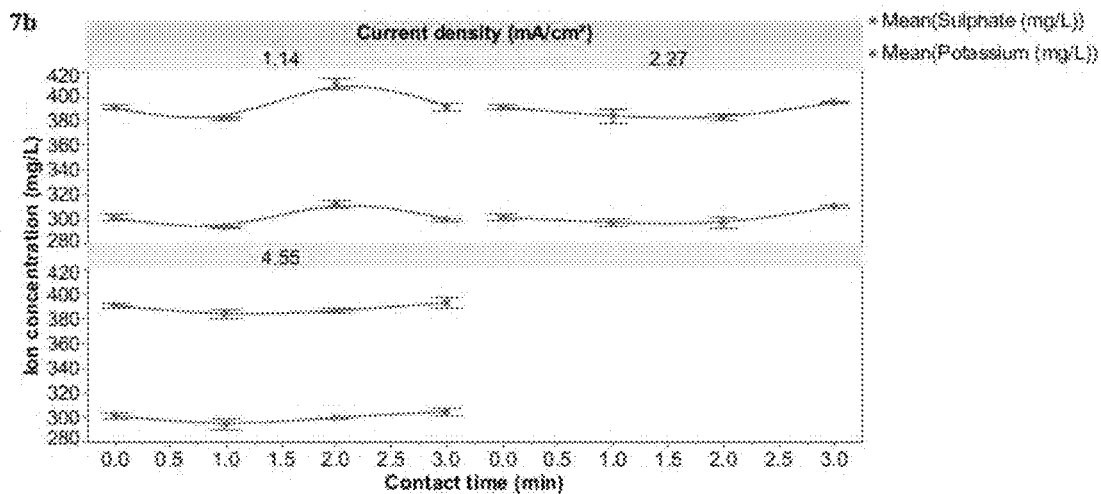
FIG. 10B shows concentration of different ions from the organic fertilizer solution when ted with DSA's.
Figure 11A:
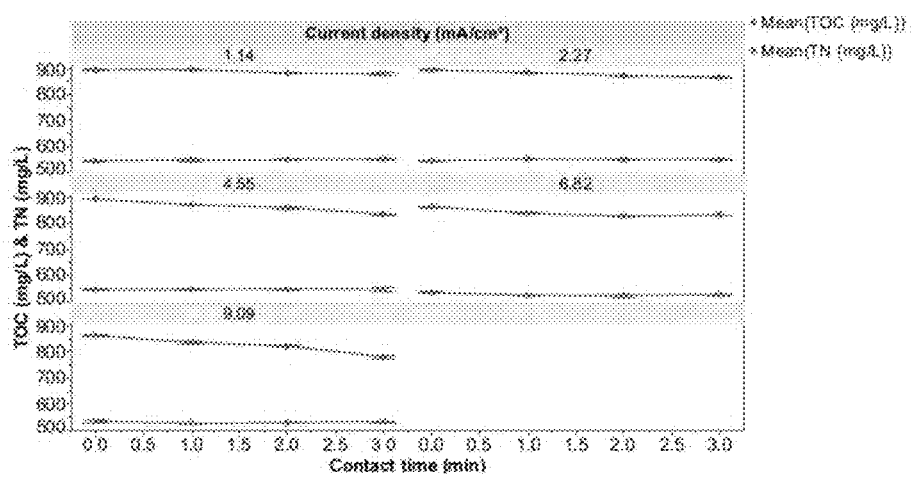
FIGS. 11A, 11B, and 11C TOC (total organic carbon) and TN (total nitrogen) of the organic fertilizer solution when treated with BDD electrodes.
Figure 11B:
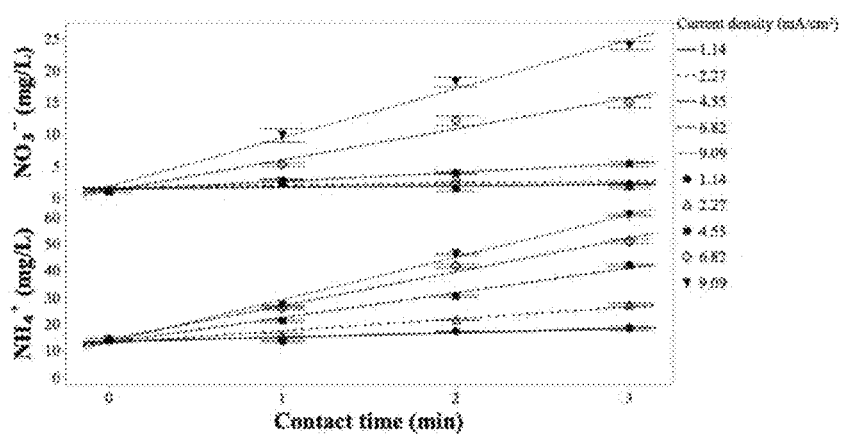
Figure 11C:
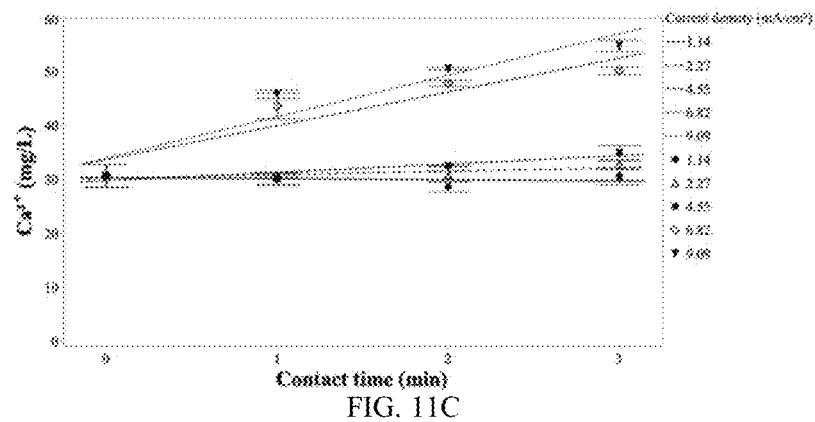

Using Dimensionally Stable Anodes there was no significant decrease for TOC and TN with the current density of 1.14 mA/cm$^2$ for all contact times (FIG. 9). However, when increasing the current density to 2.27 and 4.55 mA/cm$^2$, there were significant decreases with TOC and TN. The DSA's showed significant increases in calcium with current density and the contact time for all but the current density of 1.14 mA/cm$^2$ at the 3-minute contact time (FIG. 10A). Furthermore, the analysis showed increases and decreases in phosphate and sulphate for random parameters, however none of these were found to be significant (FIG. 10A/B). However, there was a significant increase in potassium for the current density of 2.27 mA/cm$^2$ with a 3-minute contact time and 1.14 mA/cm$^2$ for the 2-minute contact time (FIG. 10B). No significant increases in ammonium and nitrate were found for all parameters, however, there was a significant decrease for the current density of 1.14 mA/cm$^2$ with the 3-minute contact time (FIG. 10A). With higher current densities, there is denitrifying occurring, however, the rate of ammonium released and nitrification is counteracting the denitrification process. Although, there is still a loss of TN from the solution, ions will be released from the organics and replenish the ions that are being lost by denitrification.

With the use of BDD electrodes, there were significant decreases in TOC for every parameter, except for the current density of 1.14 mA/cm$^2$ and a contact time of 1-minute (FIG.

11). There were no significant differences in the total nitrogen of the solution, indicating that denitrification is not active like the previous experiments conducted with DSA's.

Figure 12A:
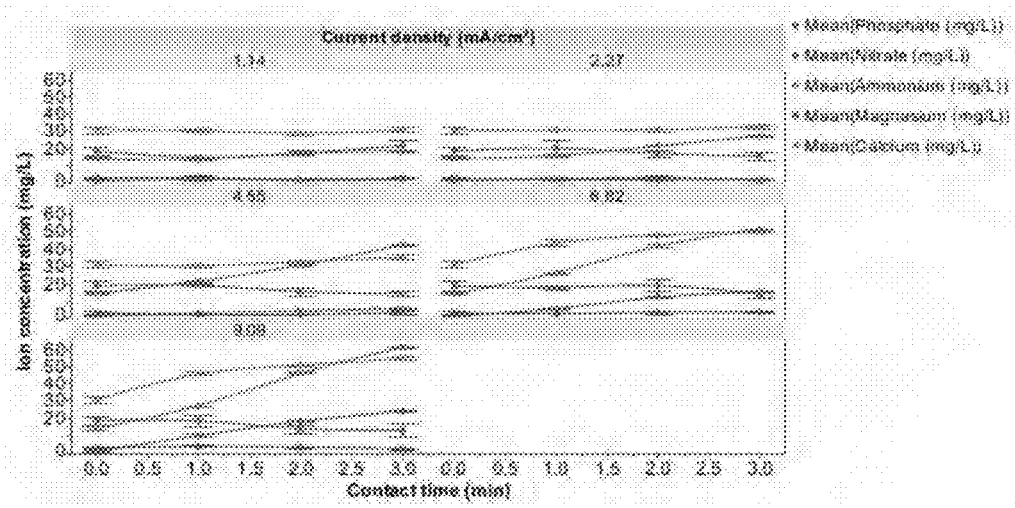
FIGS. 12A and 12B shows Concentration of different ions from the organic fertilizer solution when treated with DSA's.
Figure 12B:
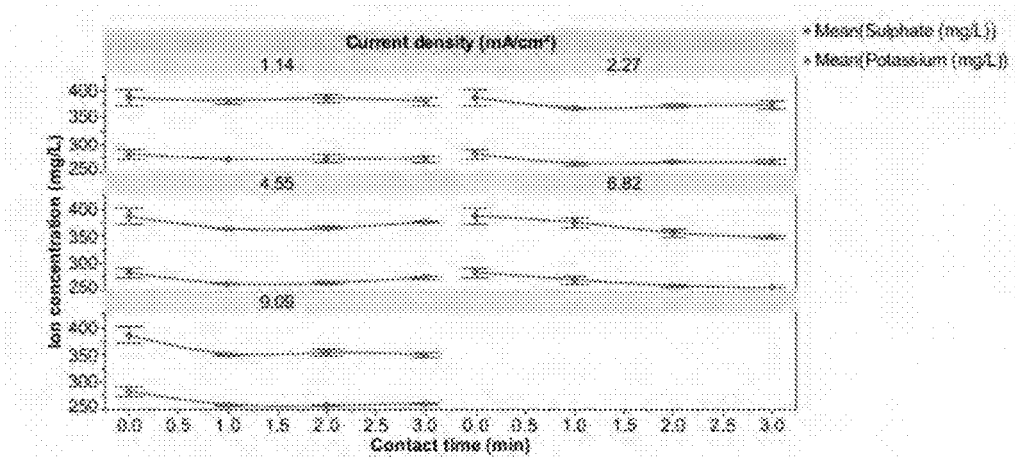
Figure 13A:
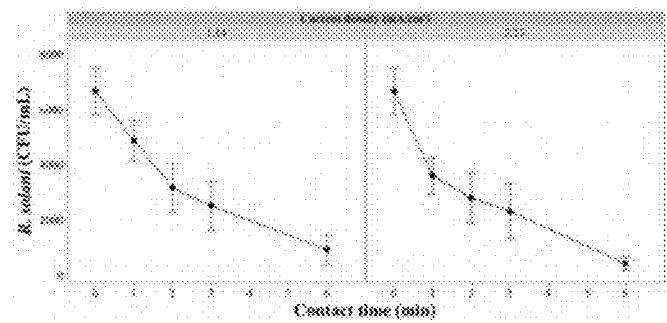
FIG. 13A shows inactivation of *R. solani* in the absence of both fertilizer or chloride (only pathogen and deionized water present). The solution was passed through the EFC at variable contact times and applied the current densities of 1.14 and 2.27 $mA/cm^2$. Error bars are ±SEM, n=3.
Figure 13B:
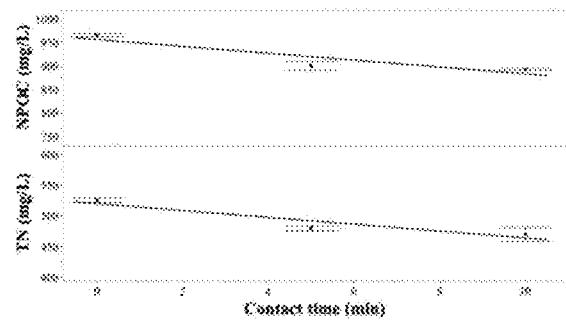
FIGS. 13B, 13C, and 13D show levels of TN, nitrate, ammonium, sulphate and calcium with varying contact times.
Figure 13C:
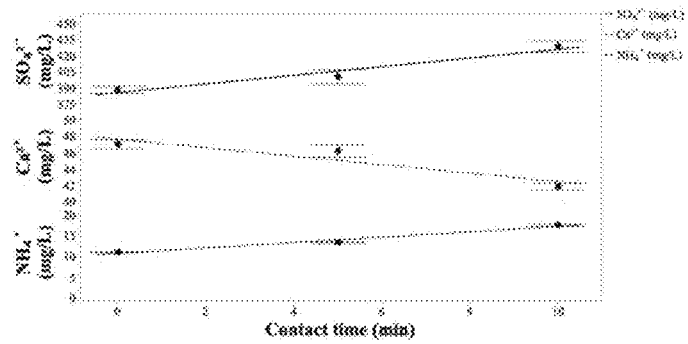
Figure 13D:
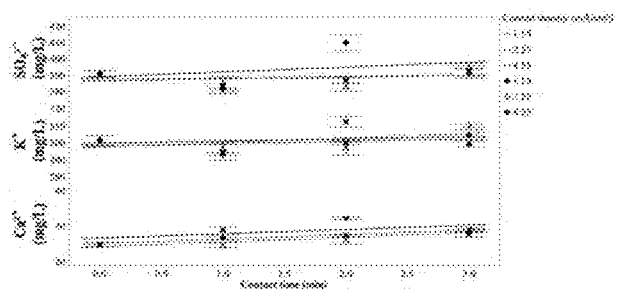

With analyzing the ions in solution using the BDD electrodes, there were clear trends by increasing nutrients within the irrigation solution. There were significant increases in calcium, nitrate, ammonium (FIG. 12A). There were some changes in the mean for phosphate throughout the treatments. There were significant decreases in potassium for current densities with treatment (FIG. 12B). Increases by 46.55 mg/L in ammonium were found with the current density of 9.09 mA/cm$^2$ with a 3-minute contact time (FIG. 12A). Furthermore, increases by 22.75 mg/L in nitrate were found with the same current density and contact time.

The BDD system shows compatibility with the use of organic fertilizers, as well as an 'enhancement' of the fertilizer.

Example 3—Boron Doped Diamond (BDD)-Based Electrochemical Advanced Oxidation Process (EAOP) and *Rhizoctonia solani* Inactivation in Fertigation Solutions It was demonstrated that a BDD-based electrochemical advanced oxidation process could achieve sufficient *Rhizoctonia solani* inactivation rates in fertigation solutions. Further, the effects of the process on solution fertilizer composition was determined and the phytotoxic potential of the treated solution in terms of residual disinfection products (e.g., free chlorine) was established.

Materials and Methods

Pathogen Culturing

A pure culture of *R. solani* (AG-8) isolated from wheat was provided courtesy of Dr. Allen Xue at the Plant Pathology Ottawa Research and Development Centre (Agriculture and Agri-Food Canada).

Test Solution Preparation

The *R. solani* culture was vacuum filtered through 1.5 μm filter paper (Whatman 934-AH). The retained material was rinsed with deionized water to remove any residual broth remaining on the mycelia. The mycelia were weighed (TE 124S, Sartorius d=0.1 mg, Germany) to obtain the total mass of mycelia added to the solution. A concentration of 0.2 g/L of mycelia was aimed for the test solution of each experiment conducted. Mycelia were transferred to a blender (HH-362, E.F. Appliances Canada LTD, China) with 300 mL of DI water and blended for 1 minute. The suspension was then transferred to a polypropylene tank containing the irrigation test solution with fertilizer and potassium chloride added. Potassium chloride was added for selective experiments to perform electrochemical chlorination. The composition of the test solution varied between each experiment and for known test solutions is in table 1:

TABLE 1

Composition of irrigation solution for electrochemical treatment using the Boron-Doped Diamond electrodes

Figure 14:
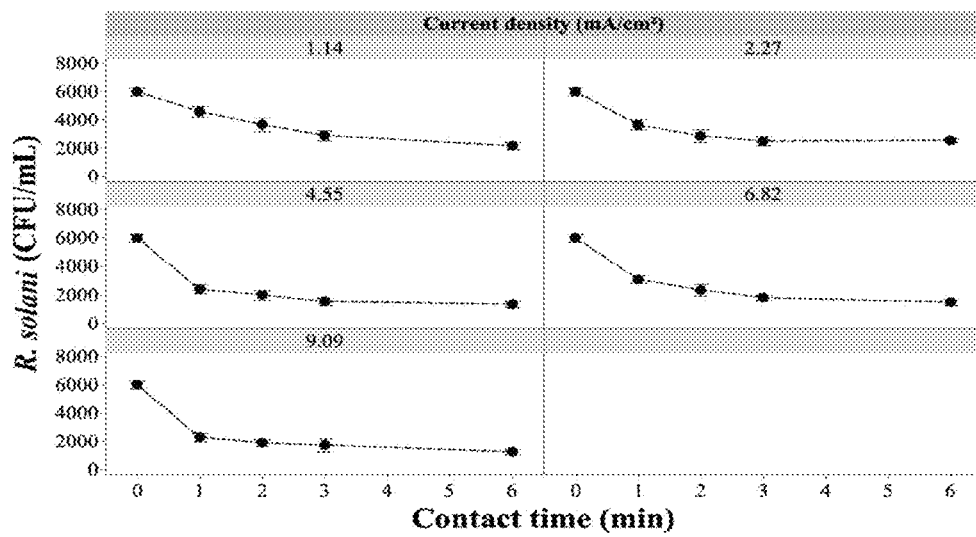
FIG. 14: Inactivation of *R. solani* with the presence of fertilizer but without the presence of chloride in solution. The solution was passed through the EFC with applying various current densities and contact times to treat the fertigation solution. Error bars are ±SEM, n=3.
Figure 15:
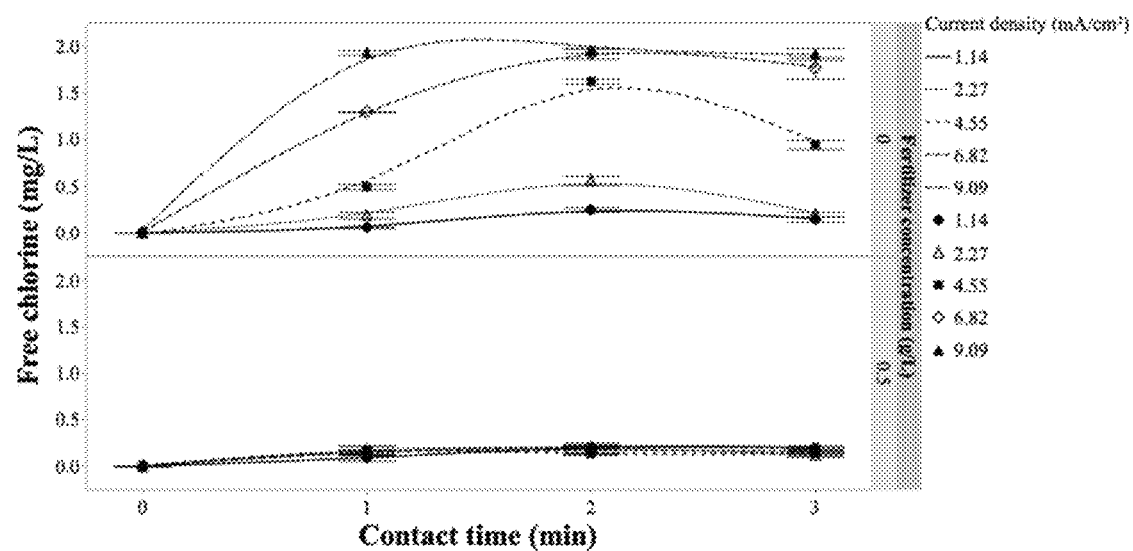
FIG. 15: Effluent-free chlorine concentrations produced by BDD electrodes with and without the presence of fertilizer in solution. The legend in the top right corner depicts the current densities applied to the solution over various contact times. Error bars are ±SEM, n=3.
Figure 16:
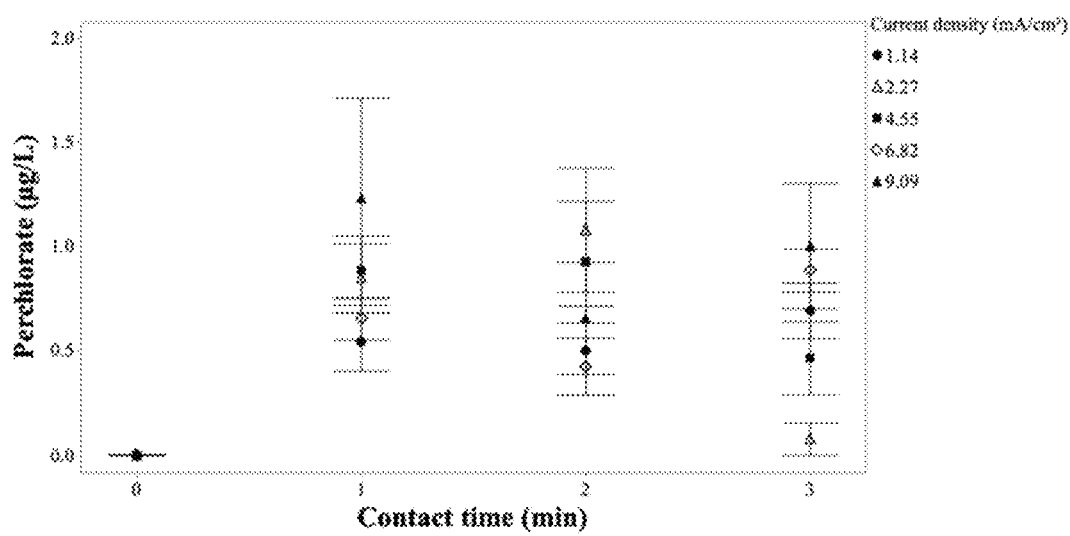
FIG. 16: Perchlorate analysis by spectrophotometric methods with samples collected from the EFC with BDD electrodes. The solution only contained chloride and applied various current densities and contact times of the solution with the electrodes. Error bars are ±SEM, n=3.
Figure 17A:
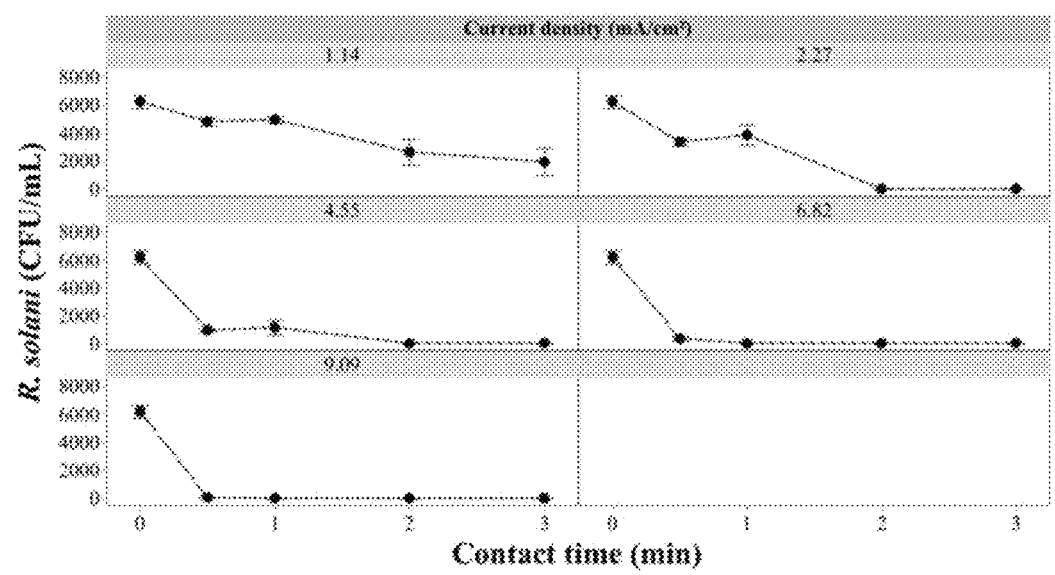
FIG. 17A shows the solution contained 20 mg/L of chloride and 0.5 g/L of fertilizer and monitored for the inactivation of *R. solani
Figure 17B:
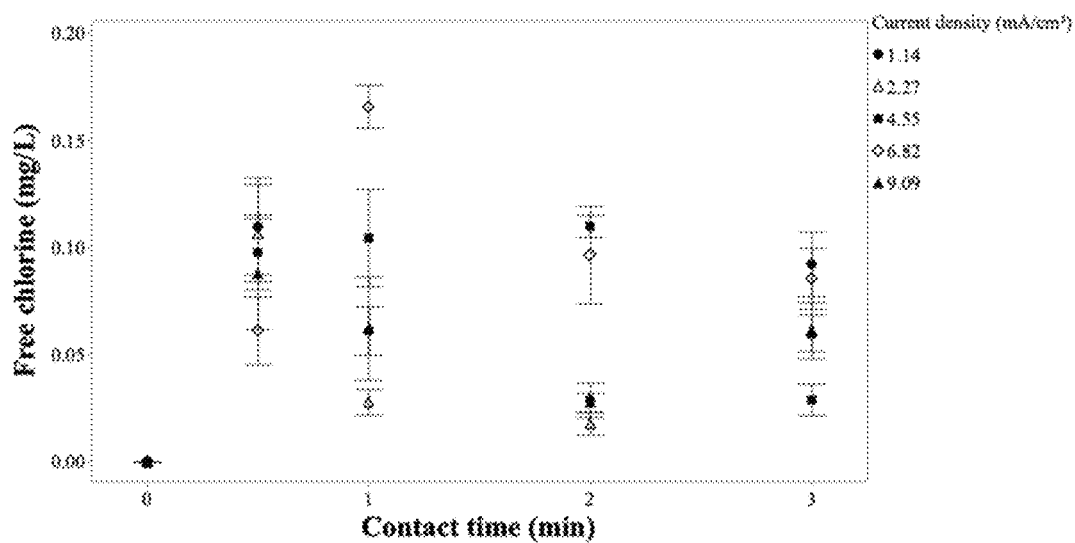
* and FIG. 17B shows the free chlorine produced as a function of contact time and current density. Error bars are ±SEM, n=3.
Figure 18:
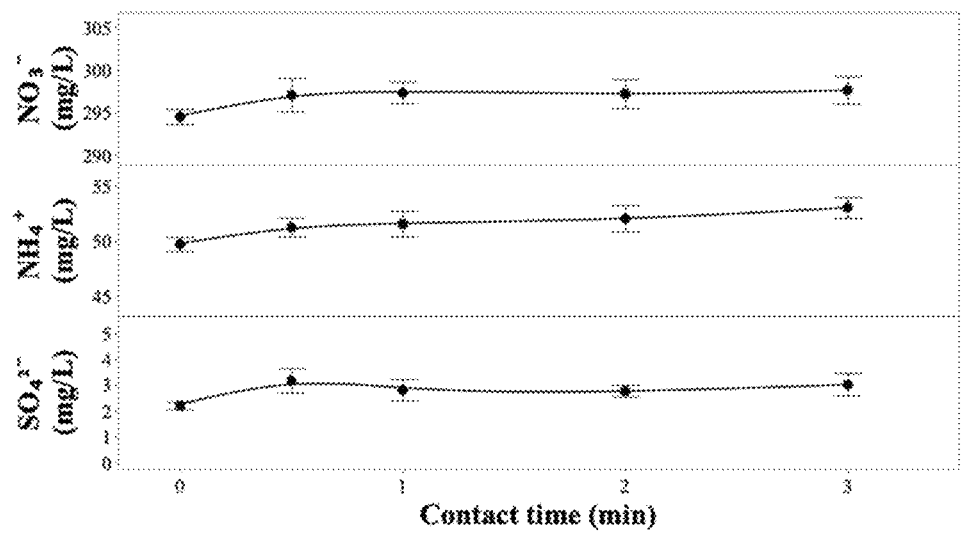
FIG. 18: Concentrations of nitrate, ammonium and sulphate when applying a current density of 9.09 $mA/cm^2$ to the solution with varying contact times. The solution contained both fertilizer and chloride during treatment. Error bars are ±SEM, n=3.

|  | Chloride Concentration (mg/L) | Fertilizer type | Fertilizer concentration (g/L) |
|---|---|---|---|
| FIG. 14 | 0 | Plant Prod Water Soluble Fertilizer (20-8-20) | 0.5 |
| FIG. 15 | 20 | Plant Prod Water Soluble Fertilizer | 0-0.5 |
| FIG. 17 | 20 | Plant Prod Water Soluble Fertilizer | 0.5 |
| FIG. 18 | 20 | Plant Prod Water Soluble Fertilizer | 0.5 |

Flow Cell

The electrochemical flow cell (EFC) utilized here was described previously (Lévesque et al., 2018). In the current study, the ruthenium dioxide anodes were replaced with Boron-Doped Diamond (BDD) anodes, while the stainless-steel cathodes remained. The cell volume between the electrodes was 380 mL and the flow rates 720, 380, 190 and 127 mL./min were used for experiments. The reported contact times (in minutes) approximate the time, as a function of flow rate, that the irrigation solution is in direct contact with, or in the immediate vicinity of, the surface of the electrodes during each electrochemical treatment.

A power supply (DF1730SC 20A DC power supply, Gold Source, China) was connected to the anode and cathode terminals. Throughout each experiment the applied current and voltage were monitored. Effluent samples were collected at pre-defined times and immediately analyzed to determine pH (542, Corning, USA), and free chlorine concentration (DPD Test 'N Tube cuvette with free chlorine reagent set kit; DR/850 portable colourimeter, Hach Company, USA). Untreated samples were collected from the polypropylene tank at the start, middle and end of each experiment for fungal enumeration. This allowed for a representative estimation (mean) for the initial concentration of pathogens and nutrients that enter the system before applying a treatment. All samples were collected in 40 mL clear plastic high-density polyethylene (HDPE) vials (20120121, Richard's Plastics, Canada).

Samples were serially diluted ($10^1$, $10^2$, $10^3$ and $10^4$) into glass test tubes using 500 μl of the sample from the original concentration. The samples (100 μL/plate) were then inoculated onto PDA plates with antibiotics (0.1 g/L of streptomycin and 0.05 g/L of ampicillin) and spread across the plate with a sterile metal hockey stick. The plates were placed in an incubator (Innova 4340, New Brunswick Scientific, USA) at 30° C. for 48 hours under 58 μmol/m$^2$ of light on a 12 h photoperiod. Colonies were counted after the incubation period to determine the survival rate of pathogens following the electrochemical treatment.

Nutrient and Perchlorate Analysis

Individual macronutrient ions from the fertilizer solution were measured with a Shimadzu HPLC system equipped with a DGU-20A3 degasser, a SIL-10AP autosampler, two LC-20AT pumps, two CDD-10A VP conductivity detectors, CTO-20AC column oven, and CBM-20A system controller. Total nitrogen was measured using a Shimadzu TOC analyzer with a total nitrogen component attachment (TNM-1, Shimadzu Scientific Instruments, USA). Perchlorate was analyzed following according to Uchikawa (1967). Samples containing fertilizer could not analyzed for perchlorate due to interference with nitrate (Uchikawa, 1967).

Statistical Analysis

Statistical analyses were performed using JMP version 14.0 (SAS Institute Inc, Cary, NC). Data was tested for normality using the Shapiro-Wilk test. Data sets failing the Shapiro-Wilk test were transformed and the analysis was conducted on the transformed data. Summary of fit from linear regression models used the adjusted R squared values and significance was determined using a=0.05. Linear regression analysis was conducted to determine any effects on [individual] nutrient composition.

Pathogen Inactivation in the Absence of Fertilizer or Chloride Salts

When only $R.$ $solani$ is present in deionized water, a low current density of 1.14 mA/cm$^2$ resulted in a moderate decrease in culturable $R.$ $solani$ (FIG. 13). When the contact time of the solution was increased to 6-minutes, there was a log reduction of 3.65 in $R.$ $solani$ from an initial concentration of 6666±850 CFU/mL. Increasing the current density to 2.27 mA/cm$^2$ resulted in a log reduction of 3.80 at the same six-minute contact time. The major factor contributing to the inactivation of pathogens is by indirect oxidation by ROS ($H_2O_2$, $O_3$, $O2^-$) in the bulk solution. The most powerful ROS (OH) is a major factor for disinfection.

The combination of all ROS causes damage to the cell membrane, which ruptures and releases cell constituents leading to inactivation. This combination of ROS that are contributing to inactivation rates offers explanation for the efficacy of electrochemical disinfection in removing the majority of pathogens. Although, there are some additional factors that should be considered with electrochemical disinfection. Reductions can also be explained by the acidity at the vicinity of the anodes causing structural changes to the mycelial sheath, which can cause cleavage of essential proteins. There is also the possibility of increased permeability of the mycelial membrane due to electroporation, which leads to leakage of intracellular contents into solution. It must be noted that although the current densities used for the experiment were low, the voltages where found to be high due to the absence of a supporting electrolyte. The voltage was found to vary ~15 V with 1.14 mA/cm$^2$ and 32 V with a current density of 2.27 mA/cm$^2$.

Pathogen Inactivation in the Presence of Fertilizer Salts

Pathogen inactivation efficacy was evaluated in solutions containing fertilizer salts but no added chloride. In comparison to the results shown in FIG. 13, when applying 1.14 mA/cm$^2$ for a contact time of 6-minutes the inactivation of $R.$ $solani$ is partially inhibited by the presence of fertilizer in solution, which reached a log reduction of 3.58 CFU/mL. There was a reduction in inactivation rates by 22% (with 1.14 mA/cm$^2$) when fertilizer was present in solution in comparison to when fertilizer was absent (FIGS. 13 and 14). This result consistently follows with the same contact time (6-minutes) but increasing the current density to 2.27 mA/cm$^2$ by achieving a log reduction of 3.54. This decrease in log reduction equates to a reduction in inactivation rates by 33% with the presence of fertilizer in solution. When increasing the current density to 4.55 mA/cm$^2$, inactivation rates increase to a log reduction of 3.67 CFU/mL for the 6-minute contact time. Further increasing the current density to 6.82 and 9.09 mA/cm$^2$ reached log reductions of 3.66 CFU/mL for the former and 3.68 CFU/mL for the latter between 0 and 6-minute contact times. The rate of $R.$ $solani$ inactivation is likely caused by competing reactions with components present in the fertilizer. The fertilizer can act as a sink for produced disinfectants in solution and fertilizer components can compete with reactions for inactivating $R.$ $solani$ by hydroxyl radicals and other ROS. Nonetheless, the presence of a commercial fertilizer reduced the inactivation rates of $R.$ $solani$, it did not completely inhibit the system from inactivating pathogens (inactivated 64% of pathogens). Additional oxidants, such as free chlorine, may be added to achieve the complete inactivation of $R.$ $solani$.

Chloride Addition Experiments:Free Chlorine and Perchlorate Evolution

Free chlorine in the flow cell effluent was monitored while treating solutions containing 20 mg/L of chloride, added as potassium chloride (KCl), over a range of current densities, contact times and fertilizer concentrations (FIG. 15; Table 1). Without fertilizer present, the concentration of free chlorine tended to increase with contact time and current density (FIG. 15). The concentration of free chlorine increased with current density but plateaued at about 2 mg/L beyond a contact time of 2-minutes for current densities of 6.82 and 9.09 mA/cm$^2$. The saturation point for these current densities and contact times suggests the process reached a physical or electrochemical limit; a limit most likely mass transport related. The efficiency of BDD electrodes for producing hydroxyl radicals and further oxidizing chlorinated products (e.g. ClO$^-$) can lead to the formation of chlorates and perchlorates (Sirés et al., 2014). The comparatively (i.e., relative to DSAs designed for free chlorine production) low concentration free chlorine from the EFC may be in part due to the formation of chlorate species, which are not measured via the DPD free chlorine method used. When fertilizer is present in solution, the effluent-free chlorine concentration decreased to <0.25 mg/L for all current densities and contact times (FIG. 15).

The EFC system outfitted with BDD electrodes has the potential to form chlorate species. Perchlorates are particularly harmful to human health and this compound can be assimilated by crops which is species specific, but may pose a risk for consumers such that perchlorate should be monitored while only permitting concentrations under regulatory standards. Analysis of perchlorates (fertilizer free solutions only) showed that perchlorate remained below 2 μg/L (FIG. 4), which is below safe drinking water limits in all jurisdictions examined (e.g., United States EPA limit 24.5 μg/L). Perchlorate was the only chlorate species examined in the current study. Additional chlorate species may be examined. The formation of chlorate and perchlorate requires the production of hypochlorite as an intermediate species. Thus, if the pH of the solution is maintained at more acidic conditions with low current densities, this will limit the formation of chlorates. Also, the presence of fertilizer can act as an inhibiting factor to the formation of chlorates and perchlorate due to more competing reactions at the surface of the anodes. This process for competing reactions is similar to preventing the formation of chlorates by increasing the concentration of chloride. There are also additional electrochemical mechanisms that can remove chlorates by reduction reactions, which returns chlorates back to chloride and oxygen. These operational methods can all be used to prevent or remove chlorates in solution as precautionary measures with the EFC if desired.

Adding chloride to the fertigation solution further increased the inactivation rate of $R.$ $solani$ (FIG. 17A). When applying a current density of 1.14 mA/cm$^2$ with a contact time of 3-minutes, there was a 69% reduction of $R.$ $solani$ (CFU/mL). When increasing the current density to 2.27 mA/cm$^2$ with the 2-minute contact time, there was a decrease by 99.95% of pathogens in solution. For the same current density, but with the increased contact time of 3-minutes, $R.$ $solani$ was completely inactivated. When applying 4.45 mA/cm$^2$, an inactivation rate of 99.98% was achieved for the 2-minute contact time. Increasing the current density to 6.82 mA/cm$^2$, gave the same inactivation in half the time (1-min CT). The highest current density tested (9.09 mA/cm$^2$) gave an inactivation of 98.95% at a 0.5-minute contact time and complete inactivation at a 1-minute contact time. Inactivation efficiency improved considerably when 20 mg/L of chloride was introduced, as KCl, to the fertigation solution (FIG. 17A). However, in comparison to previous research with DSA electrodes, the required current density is higher (9.09 mA/cm$^2$ for BDD vs 6.82 mA/cm$^2$ for DSA) and the contact time is twice that required for RuO$_2$ DSA (1-minute for BDD vs 30 seconds for RuO$_2$ DSA).

The free chlorine evolution from BDD electrodes was also monitored to ensure that the system would not release a concentration of free chlorine above the phytotoxic threshold for most major crops (2.5 mg/L) (FIG. 17B). The effluent free-chlorine concentration does not follow a consistent trend with increasing the contact time and current density of the system. However, the main aspect is that all measured values are considerably lower than the phytotoxic threshold.

Plant Nutrient Dynamics

Figure 19A:
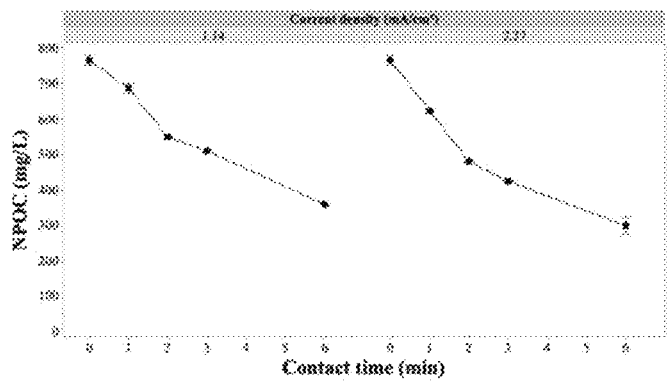
FIG. 19A shows the degradation of NPOC by applying two different current densities over variable contact times of the solution passing through the EFC. The solution only contained the pathogen and deionized water in solution and showing that NPOC is directly related to dissolved components originating from the pathogen. Error bars are ±SEM, n=3.
Figure 19B:
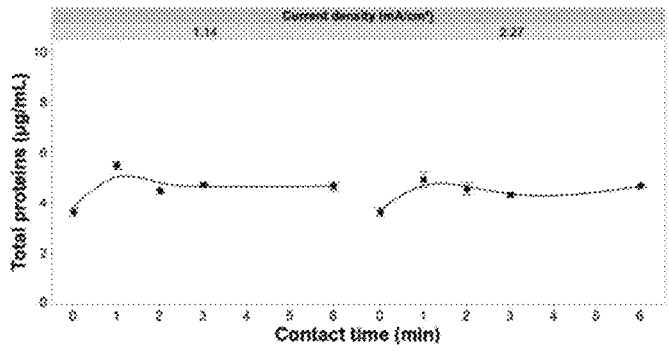
FIGS. 19B and 19C each show total protein and ion concentrations with different contact times.
Figure 19C:
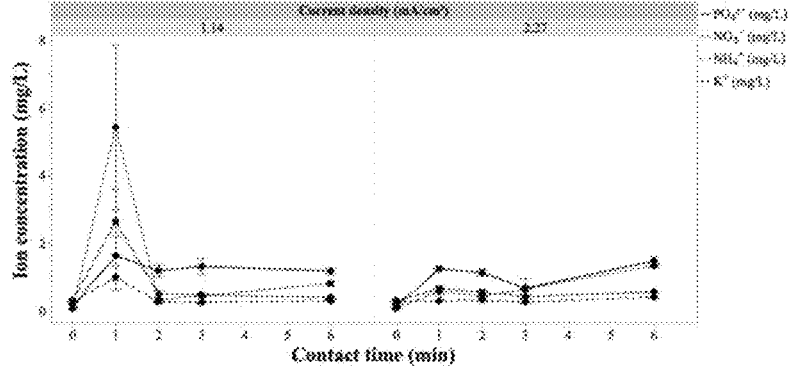
Figure 22:
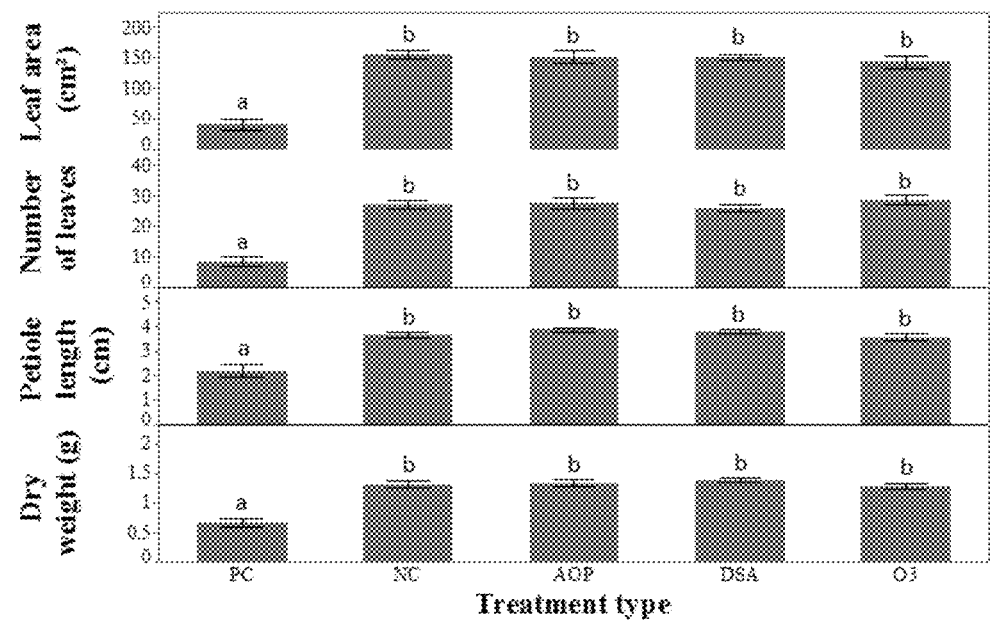
FIG. 22: Measured parameters in plant health following 6 weeks of growth following different water treatment types. Plants were measured for the number of leaves, leaf area, average petiole length and weight of plants. Error bars are ±SEM, n=3.
Figure 23:
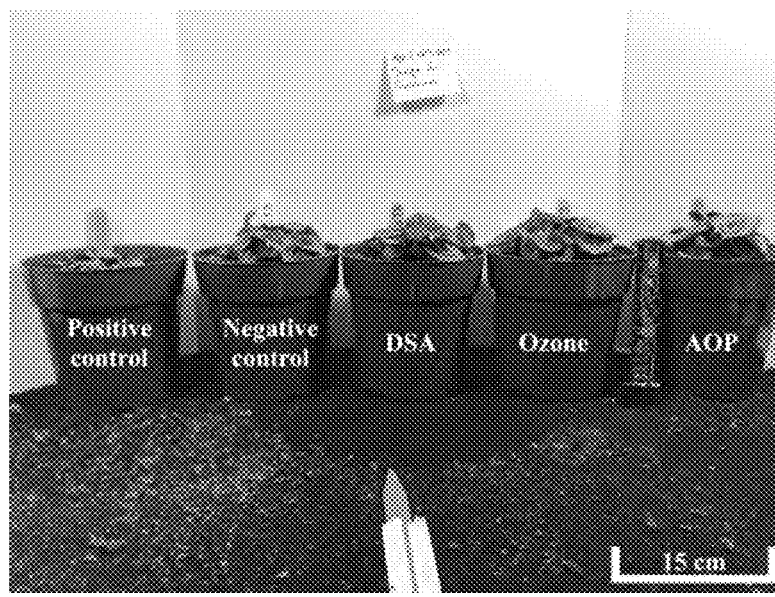
FIG. 23: Photo providing the visual differences between treatments following 6 weeks of growth in the greenhouse. The positive control was shown to have critical damage to the ornamental crop, while all other treatments were determined to be healthy. No differences could be found for all water treatment technologies in comparison to the negative control.
Figure 24:
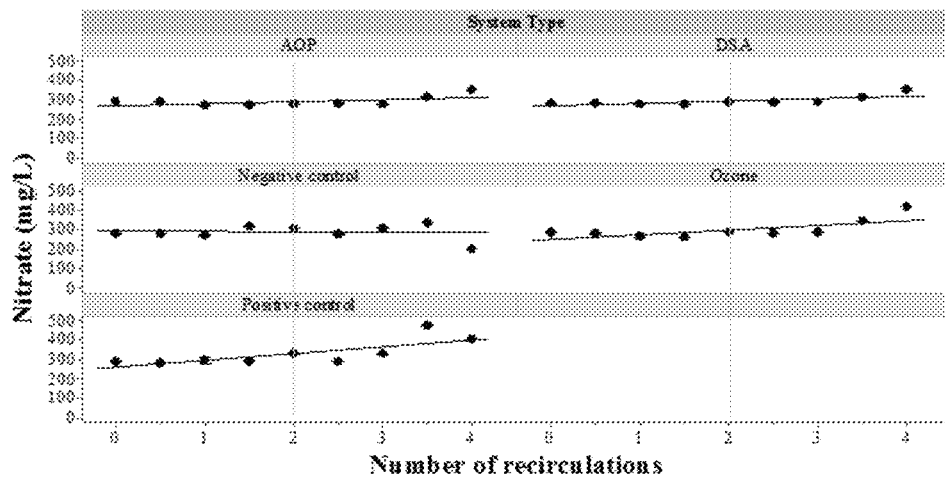
FIG. 24: Nutrient dynamics of nitrate following each treatment over the number of recirculations. Yellow line depicts the time when the recirculated solution was supplied with an additional solution (0.5 g/L of 20-8-20 water soluble fertilizer). Error bars are ±SEM, n=3.
Figure 25:
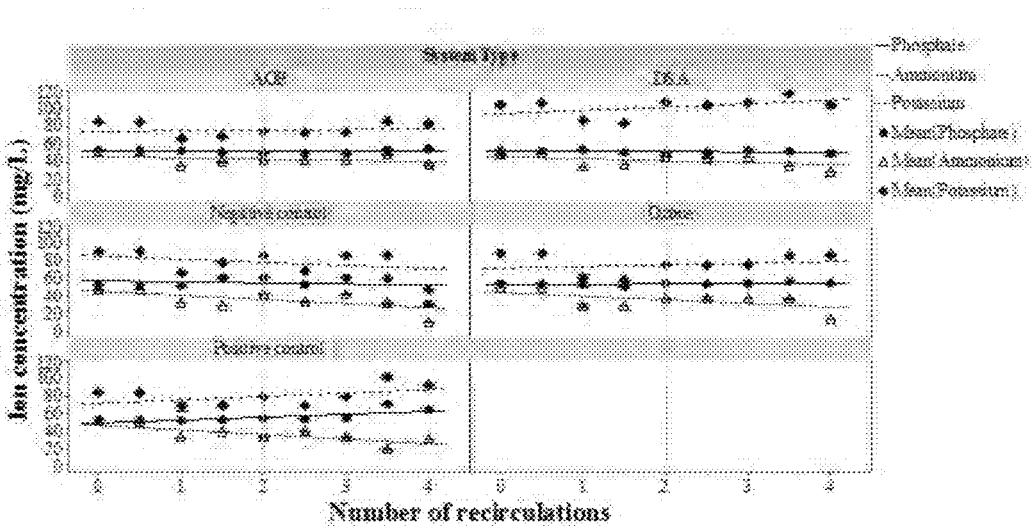
FIG. 25: Nutrient dynamics of phosphate, ammonium and potassium following each treatment over the number of recirculations. Yellow line depicts the time when the recirculated solution was supplied with an additional solution (0.5 g/L of 20-8-20 water soluble fertilizer). Error bars are ±SEM, n=3.
Figure 26:
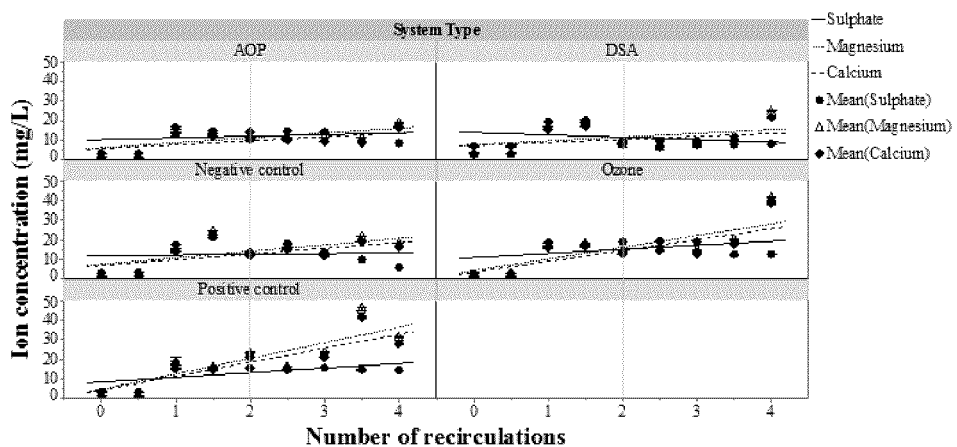
FIG. 26: Nutrient dynamics of sulphate, magnesium and calcium following each treatment over the number of recirculations. Yellow line depicts the time when the recirculated solution was supplied with an additional solution (0.5 g/L of 20-8-20 water soluble fertilizer). Error bars are ±SEM, n=3.
Figure 27:
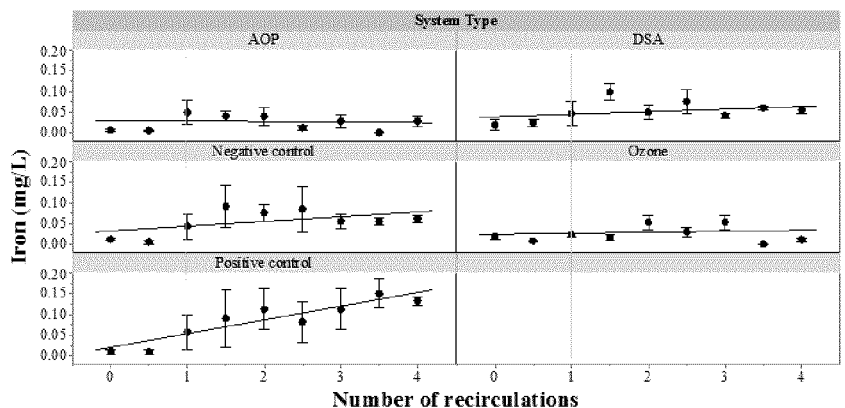
FIG. 27: Nutrient dynamics of iron following each treatment over the number of recirculations. Yellow line depicts the time when the recirculated solution was supplied with an additional solution (0.5 g/L of 20-8-20 water soluble fertilizer). Error bars are ±SEM, n=3.

The individual ions comprising the fertilizer solution were monitored pre- and post-treatment at a current density of 9.09 mA/cm$^2$ (FIG. 18). No differences were detected for phosphate, sodium, potassium, magnesium, and calcium. Chloride showed a significant decrease with contact time, which is consistent with the pseudo-first-order kinetics governing the formation of free chlorine species. Chloride had decreased by 2.99±0.16 mg/L with a current density of 9.09 mA/cm$^2$ and a contact time of 1-minute and decreased by 7.69±0.13 mg/L for 3-minutes. Several ions increased slightly after a 3-minute treatment. There were significant increases between the 0 and 3-minute contact times in nitrate by 6.35±0.28 mg/L (p=0.0078), ammonium by 5.32±0.63 mg/L (p=<0.0001), and sulphate by 1.72±0.43 mg/L (p=<0.0001) (FIGS. 18A-B). The increase in nitrate may be due to the direct and/or indirect oxidation of ammonium (Benito et al., 2017). The increases in sulphate could be attributed to the oxidation of trace amounts of sulphide or sulphur containing amino acids such as cysteine and methionine). An alternative source of these ions could be from the degradation of proteins and subsequent deamination of amino acids. The deamination of amino acids has been known to occur in the presence of radical species. The reactions are catalyzed by copper ions, which were present in trace amounts in the fertilizer used in the experiment. The increase in nitrate, ammonium and sulphate is supported by the decrease of non-purgeable organic carbon (NPOC) when only the pathogen and deionized water are present in solution (FIG. 19A). The decrease in NPOC indicates that dissolved components in solution that originated from the pathogen are being mineralized. When mineralization occurs, this will release CO$_2$ as well as other ions that were shown to increase with EAOP due to the action of OH$^-$. These increases in essential ions were statistically significant (FIGS. 19B-C).

Applying a low current density (2.27 mA/cm$^2$) without the presence of fertilizer or chloride in solution can inactivate 95% of R. solani. Complete inactivation was achieved with the presence of fertilizer and 20 mg/L of chloride in solution. Complete inactivation of R. solani can be achieved electrochemically using BDD anodes and stainless-steel cathodes at a current density of 2.27 mA/cm$^2$ and contact time of 3-minutes. However, the contact time required for complete inactivation can be reduced through a concomitant increase in current density, with 9.09 mA/cm$^2$ achieving complete inactivation after 1-minute when fertilizer and chloride are present. The complete inactivation of R. solani was achieved while maintaining acceptable nutrient balances and without a build-up of free chlorine beyond reported phytotoxic thresholds. Perchlorate generation was a concern; however, the concentration remained below accepted drinking water quality standards in the absence fertilizer. Many essential nutrients for plant growth were shown to remain constant with reaching complete inactivation (9.09 mA/cm$^2$+fertilizer+chloride). Increases in these nutrients were shown for the ions ammonium, nitrate and sulphate. The decrease in NPOC when only the pathogen is present in solution suggests the mineralization of dissolved components are releasing these nutrients.

Example 4—Greenhouse Floriculture Production of Cyclamen persicum in the Presence of Fusarium oxysporum. Using Treated and Recirculated Nutrient Solution A randomized complete block design was arranged with 5 treatment levels (troughs) on each grow bench (both controls set up in front of one grow bench) (FIG. 20A, 20B). Each grow bench was nested with all five treatments having a positive control, negative control, ozone, AOP, and DSA. The negative control was not inoculated with *F. oxysporum* in solution, while the positive control, ozone, AOP and DSA treatments did contain the inoculum. A water-soluble fertilizer (20-8-20, Master Plant Prod Inc., Canada) was added for each treatment at a concentration of 0.5 g/L in each reservoir. The irrigation system was arranged by drip irrigation with spikes inserted in the soil and the solution was recirculated back towards reservoirs during the whole production cycle (FIG. 21). Each water treatment system was evaluated for pathogen inactivation and quality of plants after 6 weeks of growth.

Pathogen Inactivation

Pathogen inactivation was monitored for all treatments within the first pass from reservoir 1 towards reservoir 2. *F. oxysporum* was found to be relatively unchanged from passing between reservoirs for the positive control. Indicating that stable colonies are passing through the irrigation system and reaching ornamental crops. The negative control treatment did not detect external fungal pathogens in the fertigation water, which determines that effects on crop growth was solely caused by the inoculated pathogen. All water treatment technologies used for disinfection was shown to achieve the complete inactivation of pathogens in fertigation solutions.

Plant Health

After 6 weeks of growth, all treatments exhibited significant differences in comparison to the positive control for leaf area, number of leaves, petiole length and dry weights of *C. persicum* (FIG. 22). In comparison to the negative control, all water treatment technologies were not found to have significant differences in plant growth. Furthermore, no visual differences were observed between water treatment technologies, though, clear differences in the health of plants was discerned with the positive control due to pathogenicity (FIG. 23).

Nutrients

Following treatment with DSA's, nutrients were shown to remain relatively stable with respect to plant uptake over time (FIGS. 24-26). The only nutrient that was shown to decrease was iron, which is expected due to the oxidation of the chelating agent EDTA (FIG. 27). Precipitation of iron from solution is a known effect following oxidation methods and it was experienced by all treatment systems. DSA's have been known to destroy EDTA with preferential conditions ($pH>7$, high $[Cl^-]$), although, a long contact time of ~50 minutes is needed to fully destroy EDTA using a low current density. In cases, there was no EDTA that was removed in solution when the pH of the solution is less than 7. DSA's was shown that iron will be depleted over time, though, it may remain stable in solution for longer periods in comparison to ozonation and AOP treatments.

Example 5 Fertigation Water Treatment with Deep Water Culture (DWC) Lettuce

Figure 28A:
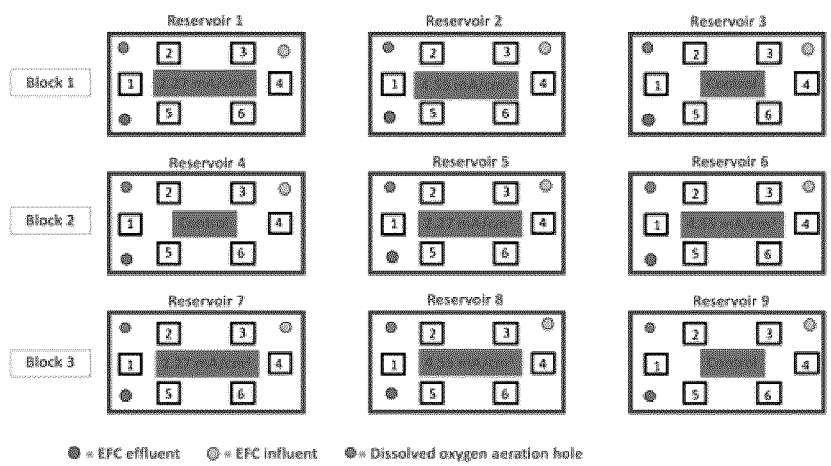
FIG. 28A shows a schematic of randomized complete block design showing the location of all treatments and holes where tubing, as well as plants are located.
Figure 28B:
FIG. 28B shows a photo of the randomized complete block design from the perspective of the experimenter.

Three experiments were performed, each experiment was conducted over a total period of 2 weeks with consecutive treatments being applied 5 times per week (Monday-Friday). A schematic of the randomized block design is shown in FIG. 28A while a photograph is shown in FIG. 28B. Experiment 1 (DSA+$NH_4^+$) used a soluble fertilizer mix at 0.5 g/L (10561, 20-8-20 Master Plant-Prod Inc., CA), 42 mg/L $Ca^{2+}$ ($Ca(NO_3)_2$) and 20 mg/L of $Cl^-$ (KCl) in solution. The solution was passed through the EFC system and returned to each reservoir following treatment, including the control group. Experiment 2 (DSA+$NH_4^+$+UV) used the same fertigation solution and EFC treatment methods, although a UV disinfection system (GAUV-6SM, Greenway Water Technology, CA) was added at the effluent of the EFC. The volume of the UV chamber was 1.5 litres, which provided the solution with a 10-minute photolysis period with using the same flow rate of 720 mL/min. The control group was not subjected to electrochemical treatment but was treated using UV disinfection. Experiment 3 (DSA+$NO_3^-$) followed the same treatment procedures as Experiment 1 however, the fertilizer solution was replicated using chemical standards (Thermo Fisher Scientific, CA) only replacing $NH_4^+$ with $NO_3^-$ in solution. The three different experiments were conducted because conventional hypochlorination has been shown to have negative impacts on plant growth when HOCl reacts with ammonium ($NH_4^+$), which forms phytotoxic molecules called chloramines ($NH_2Cl$, $NHCl_2$ & $NCl_3$) or also called combined chlorine (CC). Tertiary treatment techniques such as UV disinfection provides an approach for diminishing the concentration of chloramines through photodecomposition. Another alternative approach such as using a nitrate ($NO_3^-$) based fertilizer, without the presence of $NH_4^+$, entirely prevents the formation of chloramines in solution.

Microbial Inactivation

Figure 29:
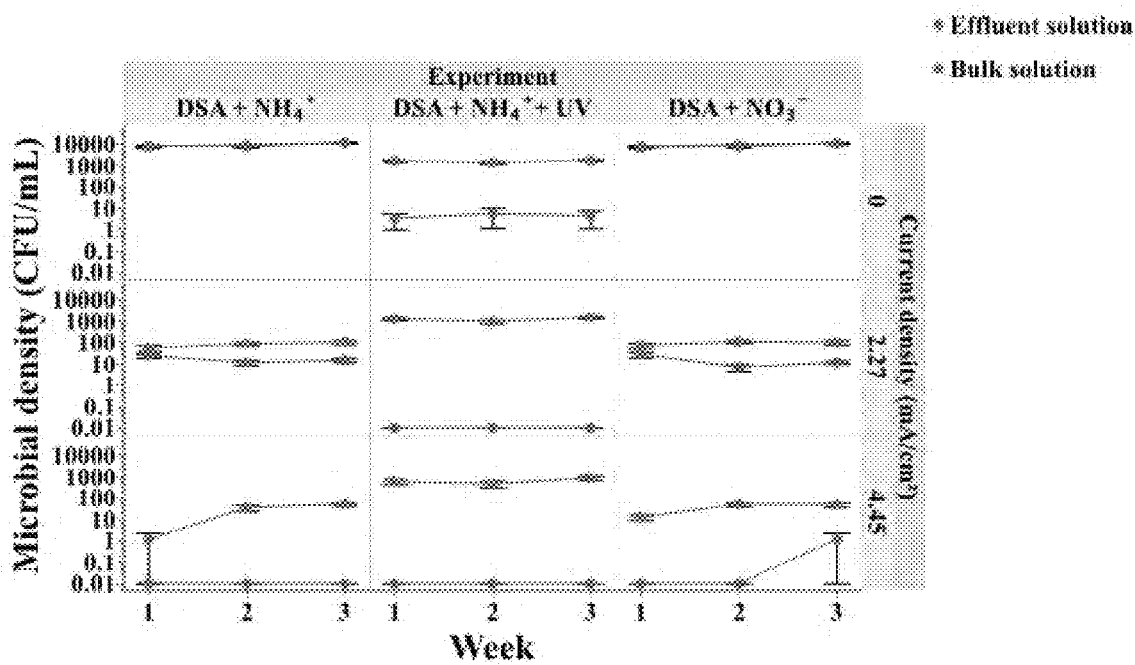
FIG. 29: Pathogen inactivation rates through different experiments in the effluent (blue) and bulk (red) of the fertigation solution, while using various current densities. Error bars are ±SEM, n=3.
Figure 30:
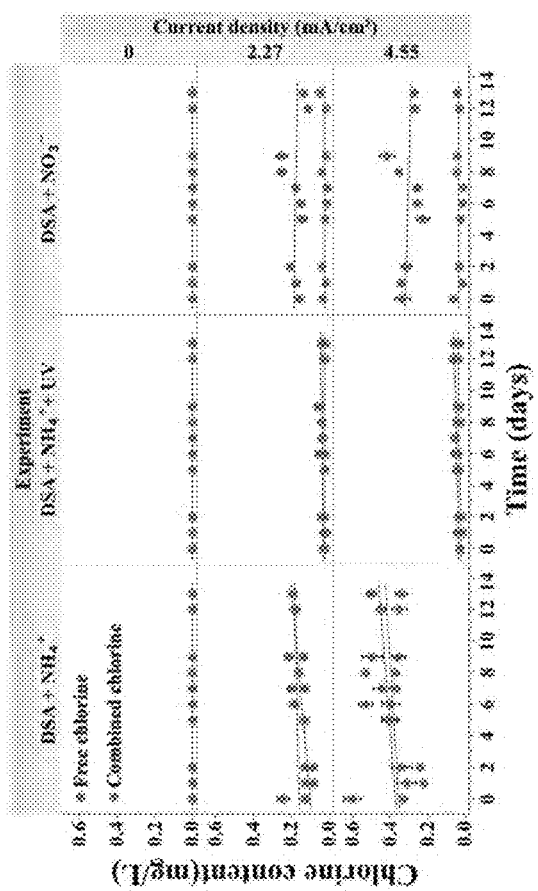
FIG. 30: Concentration of free chlorine (blue) and combined chlorine (red) across different experiments with varying current densities applied to solution over time. Error bars are ±SEM, n=3.

Microbes were not inactivated in the control treatment for experiments conducted with a fertilizer containing ammonium and/or nitrate, though, some microbes were inactivated following UV treatment (FIG. 29). When applying a current to the solution, microbes were inactivated in large part of the effluent solution with the current density of 2.27 and completely inactivated with using 4.45 mA/$cm^2$. The bulk solution contained more microbes but were reduced at least 100-fold with treatment of the fertilizer solution without UV. The number of microbes in bulk solution was higher with the UV treatment because the added treatment degraded the produced disinfectants (FIG. 30). Without the release of residual disinfectants, the microbes were able to survive in solution.

Plant Production Quality

Figure 31A:
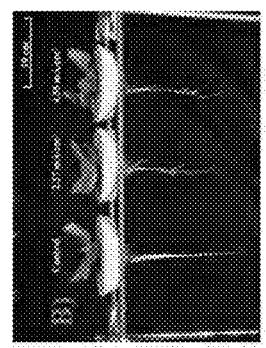
FIG. 31A shows a photograph of plants following 14 days of growth after transplant and being treated with the EFC system under fertilizer containing $NH_4^+$.
Figure 31B:
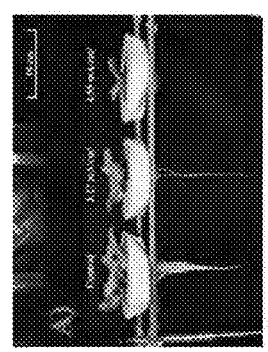
FIG. 31B shows fertilizer with ammonium but with added UV light and FIG. 31C shows fertilizer which only contains $NO_3^-$ and is treated with the EFC system.
Figure 31C:
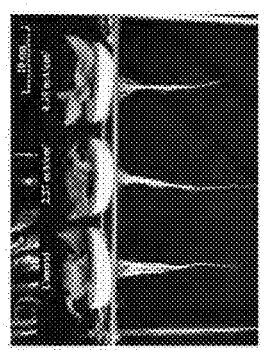

Electrochemical treatment of the fertigation solution in Experiment 1 was shown to cause phytotoxic effects to lettuce grown in DWC (FIG. 31A). A decrease in root biomass and root browning was apparent when treated with 2.27 mA/$cm^2$, while the roots in 4.55 mA/$cm^2$ were scarce and nearly un-present. The overhead biomass was also notably smaller with increasing current density. With the addition of UV disinfection in Experiment 2, the root and shoot biomass were more comparable between treatments in comparison to plants in Experiment 1 (FIG. 31B). Nonetheless, EFC treatments did experience morphological changes with higher amounts of lateral branching of seminal roots in comparison to the control group. Experiment 3 demonstrated little to no visual differences between treatment groups for both the shoot and root biomass (FIG. 31C). These observations are also reflected in the provided data which measured the growth parameters (FIGS. 32A-32E). Remarkably, the treatment 2.27 mA/$cm^2$ had a 13% increase in overhead biomass in comparison to the control.

Example 6 Organic Fertilizer Decomposition and Nutrient Solubilization Solution Preparation The test solution was prepared in a 60-litre polyethylene container by adding 0.5 g/L of a powdered organic fertilizer (9-1.5-7 EZ-GRO, Canada) (Table 1) to deionized water. Experiments conducted with the electrochemical flow cell (EFC) using DSA anodes also received 10 mg/L of chloride ($Cl^-$) by adding potassium chloride (KCl). No additional chloride was added for ozonation, AOP and electrochemical treatment with BDD anodes. The solution was constantly mixed using a magnetic stirrer to ensure homogeneity of the fertilizer. The solution was treated by all four technologies at various contact times and analyzed for changes in solution chemistry and nutrient availability for plant growth.

Nutrient Solution Analysis

Figure 33:
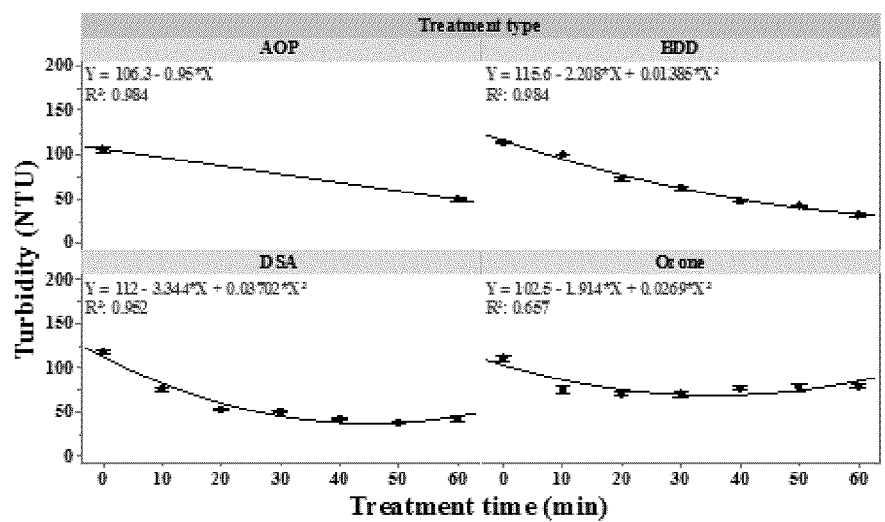
FIG. 33: Solution turbidity following treatment from AOP, BDD, DSA and ozone with treatment time. Error bars are ±SEM, n=3.
Figures 34A, 34B:
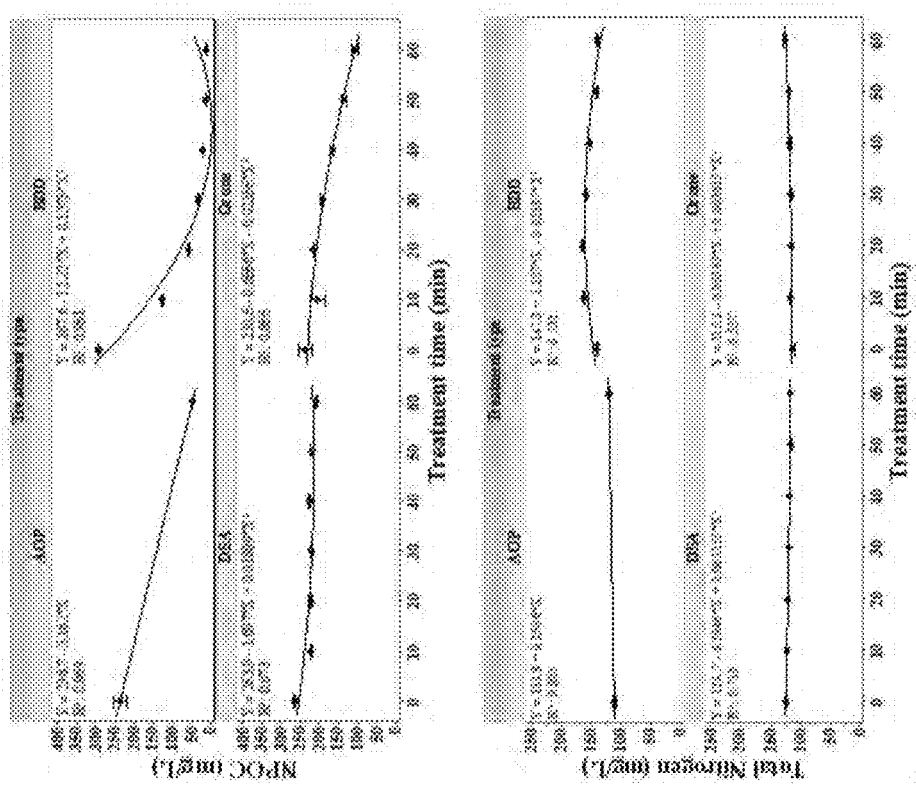
FIG. 34A concentration of NPOC and FIG. 34B shows TN in solution following treatment by AOP, BDD, DSA and ozone at various treatment time intervals. Error bars are ±SEM, n=3.

The solution's turbidity had decreased by 82 NTU following the treatment time of 60 minutes with BDD electrodes, while DSA's decreased by 76 NTU (FIG. 33). This is also reflected by the decreases in Non-Purgeable Organic Carbon (NPOC), which decreased by 282 mg/L following treatment with BDD and only 56 mg/L with DSA (FIG. 34A). This shows that organic components are being mineralized and releasing ions which become solubilized in solution. Furthermore, the total nitrogen (TN) of the solution also increased by 23 mg/L following treatment with BDD electrodes at the 20-minute treatment time (FIG. 34B). Electrochemical treatment with DSA's exhibited decreases over treatment time, which results from breakpoint chlorination reactions in denitrifying the solution.

Figure 35:
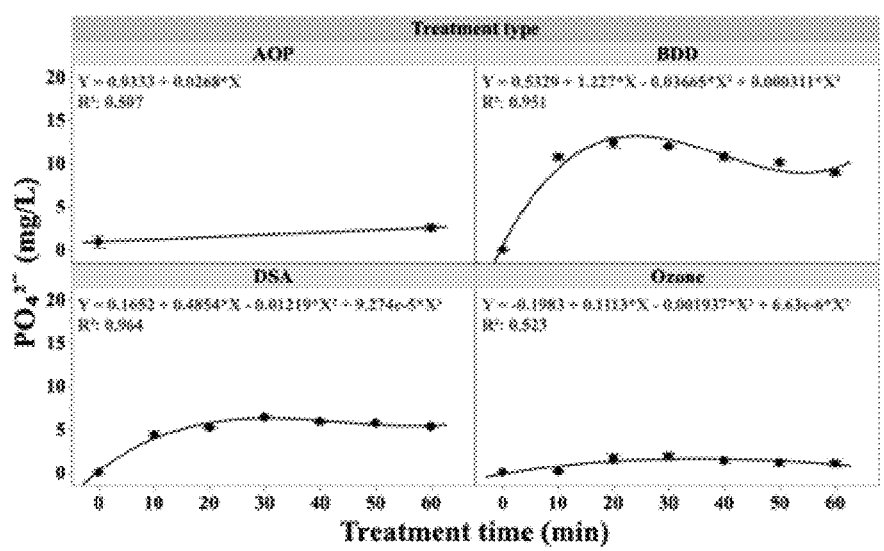
FIG. 35: Phosphate concentration in solution following treatment by AOP, BDD, DSA and ozone at various treatment time intervals. Error bars are ±SEM, n=3.
Figure 36A:
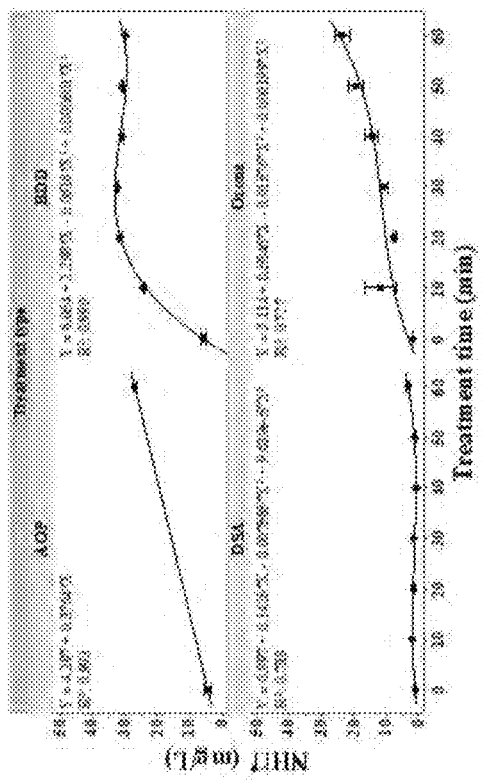
FIG. 36A shows measured concentrations of ammonium and FIG. 36B shows nitrate in solution following treatment by AOP, BDD, DSA and ozone at various treatment time intervals. Error bars are ±SEM, n=3.
Figure 36B:
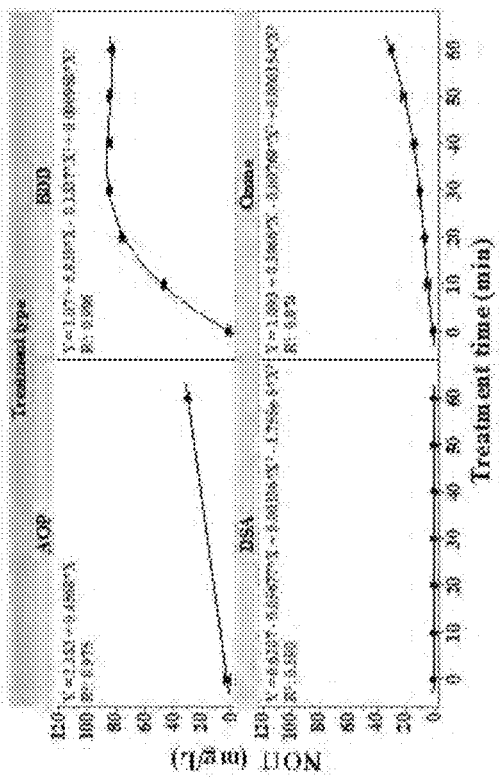
Figure 37:
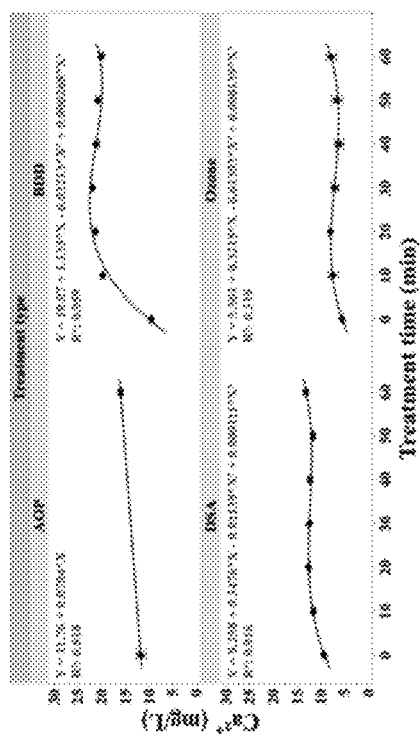
FIG. 37: Calcium concentrations in solution following treatment by AOP, BDD, DSA and ozone at various treatment time intervals. Error bars are ±SEM, n=3.

The electrochemical treatment with BDD electrodes was shown to have the highest release of nutrients compared with all other systems. The degradation of organic components following treatment with BDD released phosphate (12 mg/L), ammonium (26 mg/L), nitrate (81 mg/L), and calcium (12 mg/L) (FIGS. 35-37). Other nutrients were shown to remain stable in solution following treatment. DSA's release ions to a considerably smaller extent for phosphate (6 mg/L) and calcium (4 mg/L). Furthermore, DSA's were not shown to release significant amounts of ammonium and nitrate following treatment, which is due to denitrification reactions that negate the release of nitrogen species in solution.

Example 7 Electrochemical Treatment of Fertigation Water to Break Down Contaminants Culturing *Lemna minor*

A sterile culture of *Lemna minor* was obtained from the laboratory of Dr. Ryan Prosser (University of Guelph, School of Environmental Science). The culture was transferred to a 1 L Erlenmeyer flask containing a ½ strength Hoagland solution. The cultures were transferred to a growth chamber and were left for a growing period of 7 days. After the growth period, the Erlenmeyer flasks were brought to the lab to use the healthy plants for bioassay and water treatment experiments.

Growth Chamber Conditions

Figure 38C:
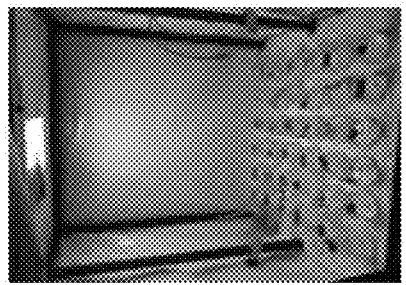
FIG. 38A shows growth chamber used to grow *Lemna minor* plants showing outside of the chamber covered by black tarp, LED light and laptop for data logging over top of the chamber in FIG. 38B Inside of the chamber with Red:Blue:White ratio used to grow plants, and FIG. 36C Erlenmeyer flasks containing *Lemna* plants under white light for demonstration with temperature and humidity sensors on the right hand side.
Figure 38B:
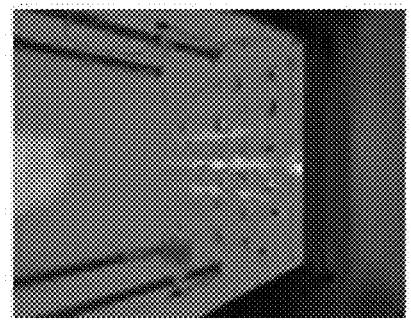
Figure 38A:
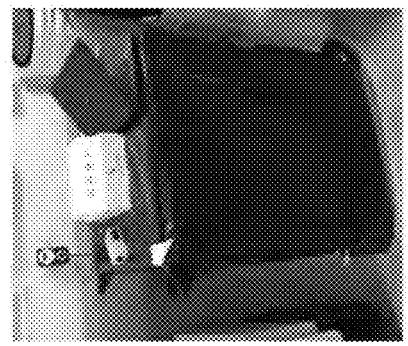
Figures 39, 40A:
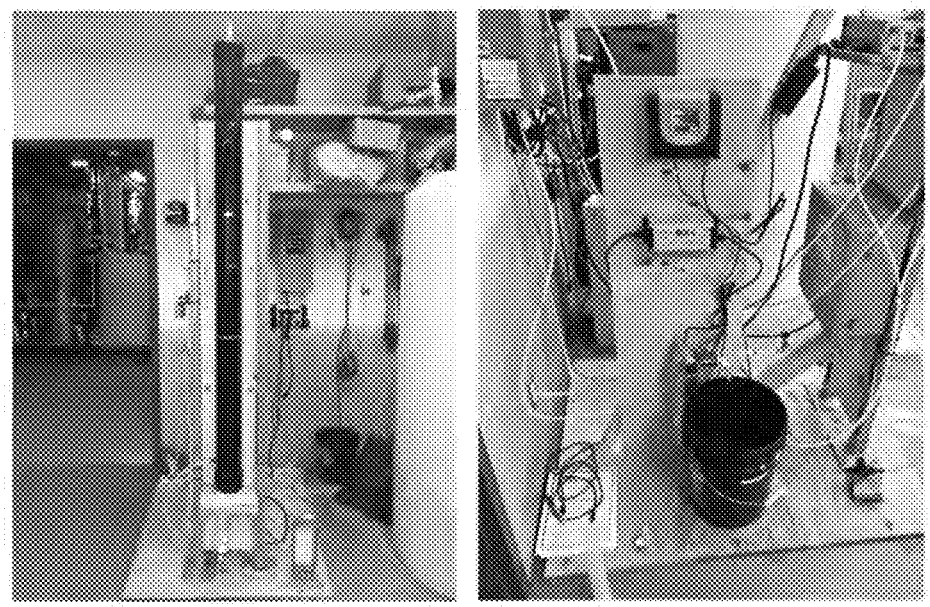
FIG. 39: Heat map of PAR levels for each 'grid' inside the growth chamber with red boxes depicting areas of low intensity, while higher light intensities were found in the middle of the chamber depicted by green boxes.
FIG. 40A shows a batch reactor system built in the Controlled Environment Systems Research facility for injecting ozone through the bottom of the batch reactor (Left) and the solution is then passed through the UV chamber by gravity to provide the AOP treatment (Right)
Figure 40B:
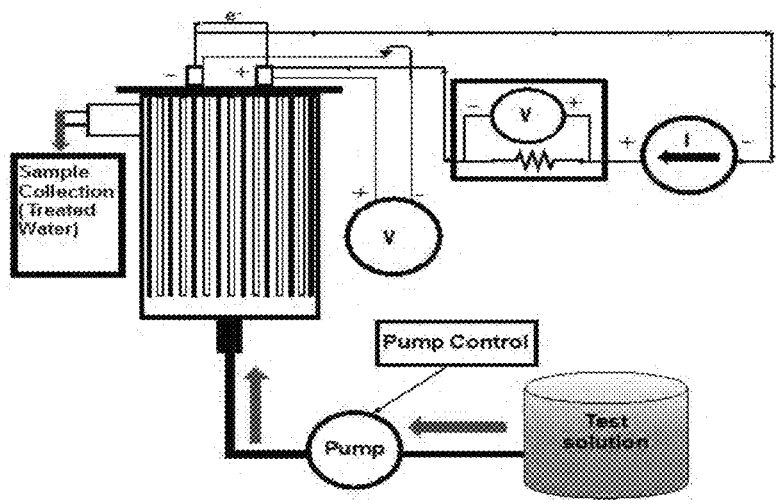
FIG. 40B shows an Electrochemical Flow Cell (EFC) testbed schematic showing the principle components and the direction of the electrical current depicted by arrows used for the experimental setup and FIG. 40C shows the EFC with red arrows depicting the flow path and FIG. 40D s monitoring and controlling components for flow rate (F), current (A), voltage (V), and the use of the power supply (P).
Figure 40C:
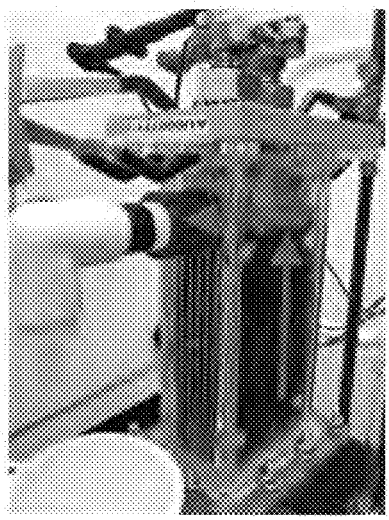
Figure 40D:

The temperature and humidity sensors were built in house by the Controlled Environment Systems Research Facility (CESRF) at the University of Guelph. The growth chamber conditions for humidity and temperature were recorded using an Acer Aspire 7750 laptop (P7YEO, Acer, Taiwan) and using the Termite software for data logging (version 3.4). The temperature was maintained at 25.68±0.02° C. and the relative humidity was 38.34±0.05%. Lumigrow pro 325 LED lights (LU60001, Lumigrow, USA) were used at a 80:10:10 ratio of Red:Blue:White as overhead lighting for plants (FIGS. 38A & 38B). Furthermore, a grid system inside the growth chamber with 36 grid boxes were used to place Erlenmeyer flasks in a completely randomized design (FIG. 38C). Each 'grid' was measured for photosynthetically active radiation (PAR) using a modular spectrometer (USB2000+, Ocean Optics Inc., USA). This allowed to account for random differences attributed to light intensity within the growth chamber. A heat map is generated with this information and in the middle of the 'grid box' there was a maximum intensity of 100 μmol/m$^2$ (FIG. 39).

Determining the Lowest Observable Effect Concentration (LOEC)

The analysis of dose-response curves for affecting the growth of *Lemna minor* was determined using the 'drc' package (v. 3.0-1, Christian Ritz, 2016) in the statistical program RStudio (v. 1.0.153, RStudio Inc., USA). The program was used to determine the EC 50 for each measured parameter for plant health and reproduction of the number of plants, number of fronds, and the dry weights of plants contained in each flask.

Electrochemical Treatment of Chemical Standards

Initial water treatment was performed by treating the solution by batch cell using the DSA and BDD anodes, as well as stainless steel (SS) cathodes. The experiment used a 2 L beaker and filled the beaker with 1.8 L of deionized water and dissolved the chemical standards glyphosate (45521, Sigma-Aldrich, USA) or paclobutrazol (46046, Sigma-Aldrich, USA) for separate treatments. The solution was constantly mixed using a magnetic stirrer (220T, Fisher Scientific, Canada) and bar during treatment with chemical standards. Samples containing glyphosate and paclobutrazol standards were submitted to the Agriculture and Food Laboratory (University of Guelph) to quantify samples using LC-MS/MS. The mean quantifiable limit for the analytical method was 8 μg/L for glyphosate, AMPA, and paclobutrazol. The non-purgeable organic carbon (NPOC) and total nitrogen (TN) of the solution were determined using a Shimadzu TOC-Vpn & TNM-1 analyzer. A calibration curve ($R^2$=0.99) was produced before performing the sample analysis using TOC and TN standards.

Chlorination with BDD Electrodes on *Lemna minor*

Chlorination was performed with BDD anodes and SS cathodes by passing a solution with 20 mg/L of chloride and deionized water through an electrochemical flow cell (EFC). The flow cell configuration was performed using the same equipment (FIGS. 40A-40D) as previous experiments with *R. solani* described herein. The solution was then collected and fixed to 75 mL inside an Erlenmeyer flask with a matching 75 mL of full-strength Hoagland solution. The experiment was performed in triplicate and placed inside the Grid box for further analysis.

Figure 32A:
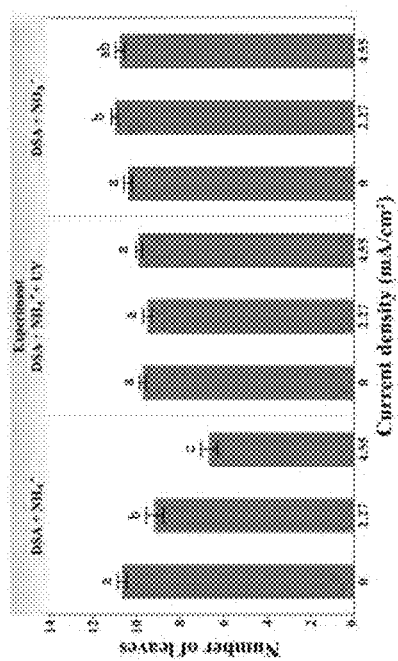
FIGS. 32A-32E: Plant performance following treatment of the solution under 3 different experiments, while using 3 current densities.
Figure 32B:
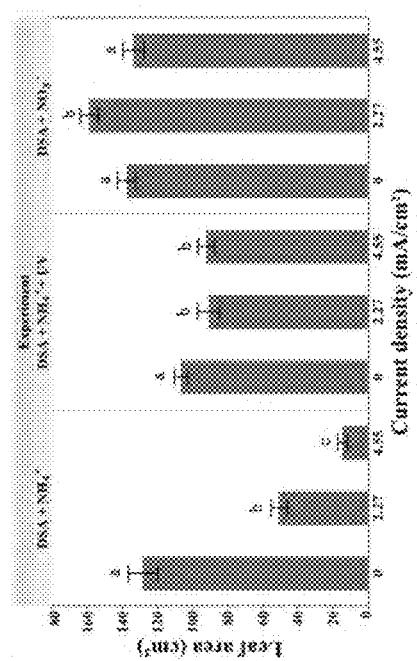
Figure 32C:
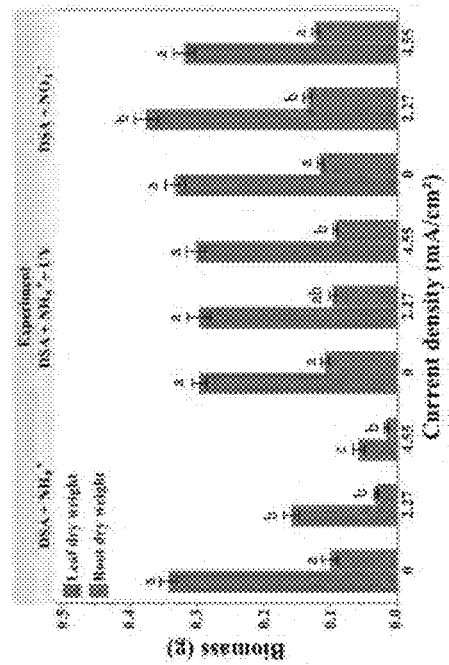
Figure 32D:
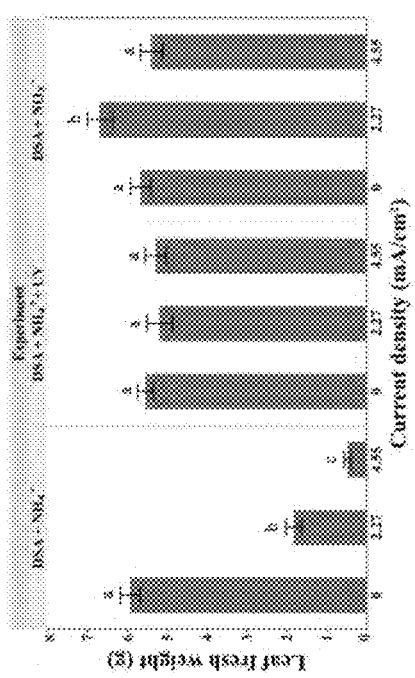
Figure 32E:
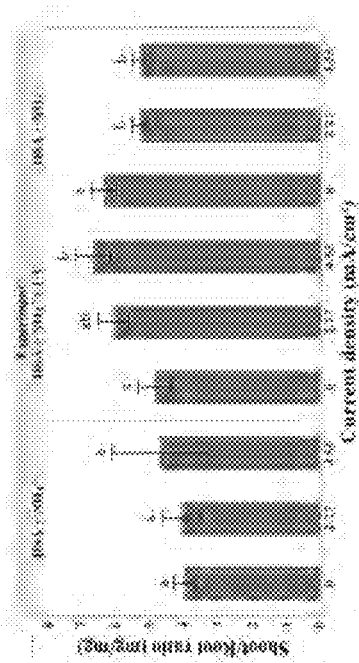

With reference to FIGS. 32B-32D, the electrochemical flow cell (EFC) system used consisted of a set of six $RuO_2$ dimensionally stable anodes (DSA) (De Nora Tech, Concord, USA) and a complementary set of five stainless steel cathodes, spaced 2 mm apart, in an acrylic casing. The total area of the anodes was 1320 cm$^2$. Solutions entered the cell from the bottom, passed upwards through the electrodes, and exited the cell at an outflow port at the top of the housing. A power supply (DF1730SC 20A DC power supply, Gold Source, China) was connected to the anode and cathode of the flow cell. The applied current value was derived from the voltage drop measured across a precision current resistor (RS-50-100, RIEDON, Alhambra, CA) using a multimeter (Fluke 189, Fluke Corporation, Canada). A second multimeter (Fluke 87, Fluke Corporation, Canada) connected directly to the anode and cathode of the cell measured the applied voltage. A second multimeter is connected directly to the terminals of the anode and cathode array to measure the applied voltage. A variable speed peristaltic pump (Cole-Parmer 1-100 RPM) drew water from the test solution reservoir to the entry port located at the base of the flow cell.

The total free volume of the EFC, the internal volume of the housing less the volume of the electrode assembly, was 380 mL but can be adjusted. The targeted contact times were achieved by adjusting the flow rates through the cell such that a given volume of solution would remain in contact with the electrodes for the desired time interval.

Water Treatment Methods with Commercial Pesticides

Water treatment for the recalcitrant organic pollutants (glyphosate and paclobutrazol) was performed by ozonation ($O_{3(aq)}$), AOP, DSA and BDD. The irrigation solution was spiked with 7 mg/L of glyphosate (Glyfos™, FMC corporation, USA) and 3 mg/L of paclobutrazol (Bonzi™, Syngenta Canada Inc., Canada) in multiple 20 L buckets containing 10 L of deionized water. Ozonation was performed with a batch reactor that was built in house at the CESRF (FIG. 40A). The batch reactor consisted of an oxygen concentrator (AS013-5, $^{Airstep}$ Corporation, USA), ozone generator (CD1500P, Clearwater tech., USA), PVC pipe (1.8 m×12 cm) and a 60 μm pore air stone diffuser at the base. The ozone gas stream that was injected into the batch reactor was measured by a high concentration ozone analyzer (Mini-Hicon, IN USA, USA). The ozone off gas was also measured by the ozone analyzer after removing the water vapour using the Sample conditioning system (SC-010-R, IN USA, USA). The ozone off gas from the solution was also carried out to the ozone destruct system (OCD-11, Clearwater tech., USA) after passing through the ozone analyzer. Furthermore, ozone was maintained at ~5 mg/L $O_{3(aq)}$ in solution and verified using Ozone AccuVac® Ampules (2518025, Hach Company, USA) and a colourimeter (DR/850, Hach Company, USA). Once the ozone is injected in solution to the desired level, the solution was then allowed to stand for 20 minutes.

The AOP treatment was performed following ozonation with the batch reactor by opening a check valve and allowing the irrigation solution to flow through a UV chamber (model #, Greenway Water Technologies, Canada) by gravity at 310 mL/min (FIG. 40A). The desired flow rate through the UV chamber was determined by measuring the effluent for ozone using ozone ampules and colourimeter. The flow rate was adjusted until no residual ozone could be measured in solution.

The electrochemical treatments used DSA and BDD anodes with SS cathodes for both treatment methods. The EFC was configured as shown for example in FIGS. 40B-40D. The solution also added 20 mg/L of Cl$^-$ in the form of KCl. The flow rate and current densities used were performed as described herein.

All solutions were treated with the four different water treatment methods and 75 mL of effluent solution was collected and added in 250 mL Erlenmeyer flasks. Negative control samples only contained 75 mL of deionized water, while all other treatments (positive control, Ozone, AOP, DSA, and BDD) contained 75 mL of the treated and non-treated solution. In a separate 3-litre beaker, a full-strength Hoagland solution was prepared and mixed with a magnetic stirrer (220T, Fisher Scientific, Canada). For each of the Erlenmeyer flasks containing the treated solutions, 75 mL of the Hoagland solution was added into each flask. The dilution factor with the Hoagland solution resulted in a half strength Hoagland solution for plant growth. *Lemna minor* that were previously cultured and acclimated to the 'Grid box' were then added to each flask. Two *Lemna minor* plants with three fronds each were added to flasks for the experiment. All 5 treatments contained 3 Erlenmeyer flasks giving a total of 18 flasks with 36 *Lemna* plants and the experiment was performed in triplicate. All of the flasks were placed at random inside the growth chamber within each grid and recorded their location. The pH and electrical conductivity of the solutions were also measured after the 7-day growth period.

Statistical Analysis

Statistical analyses were performed using JMP version 14.0 (SAS Institute Inc, Cary, NC). The residuals between data points and predicted values were tested for normality using the Shapiro-Wilk test. Residuals that did not follow a normal distribution were transformed and the analysis was conducted on the transformed data. One-way ANOVA was used to determine the significance between treatments, with the significance of $\alpha \leq 0.05$. All graphs used the calculated mean of samples within treatments with the standard error of the mean used for error bars.

*Lemna* Bioassay

Figure 41A:
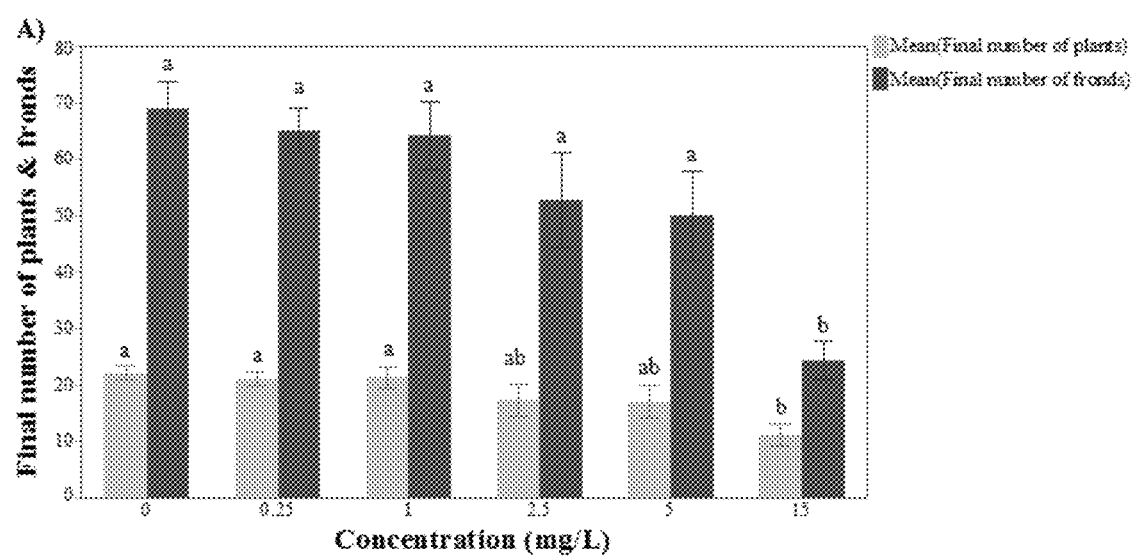
FIG. 41A shows the effects of glyphosate (Glyfos™) on (A) final number of *Lemna minor* plants, fronds
Figure 41B:
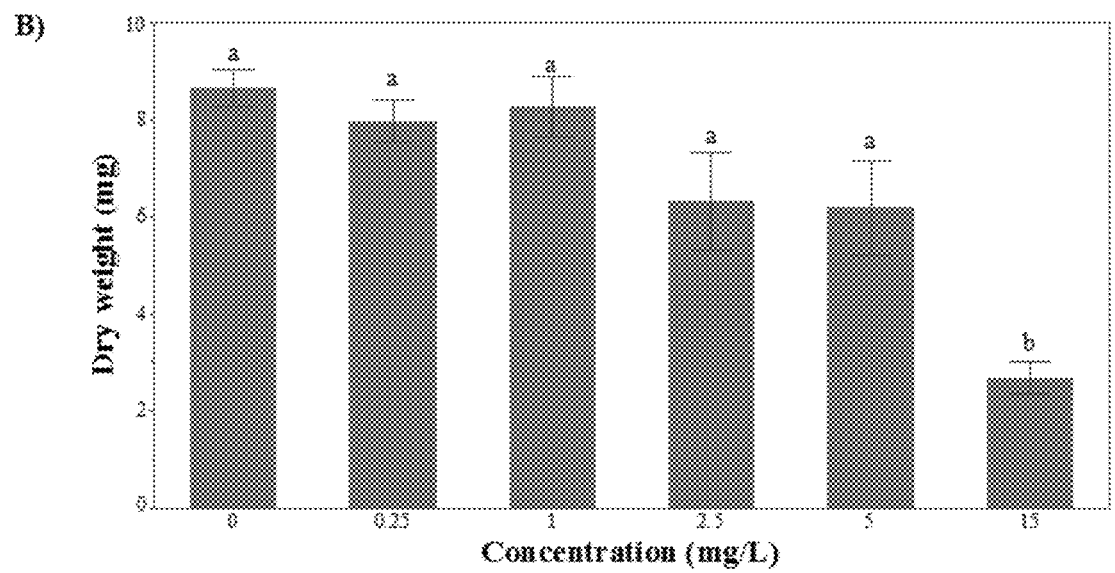
FIG. 41B shows dry weights with increasing concentration on the horizontal axis. Plant samples were measured after a growth period of 7 days in the growth chamber. Error bars are ±SEM, n=3.
Figure 42:
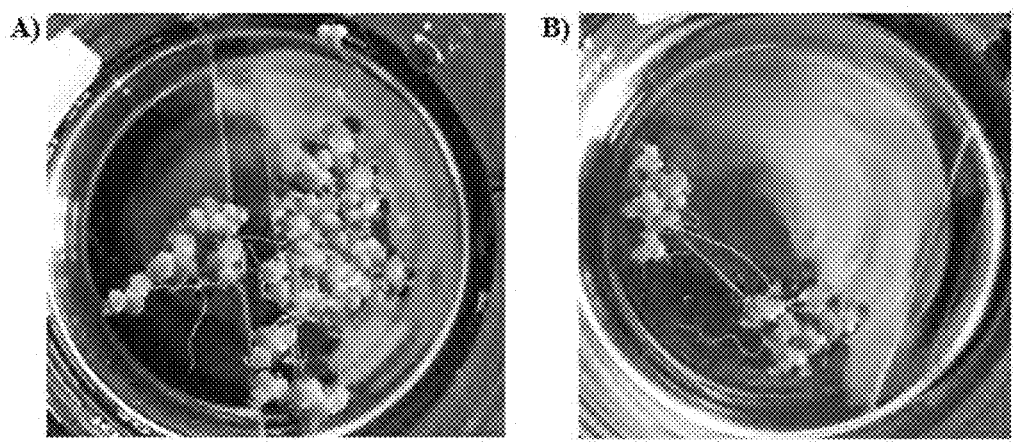
FIG. 42A demonstration the growth of *Lemna minor* without the presence of glyphosate and FIG. 42B with of 15 mg/L of glyphosate in solution and grown over a period of 7 days in the growth chamber.

When performing the bioassay on *Lemna minor*, the number of plants, fronds, and the final dry weights showed to decrease with increasing concentrations of glyphosate with respect to additional surfactants contained in Glyfosm. Significant differences were only observed at the concentration of 15 mg/L of glyphosate for the final number of fronds and the dry weight of plants (FIGS. 41A & 41B). Although, significant decreases in the number of plants were observed with glyphosate concentrations of 2.5, 5 and 15 mg/L in solution (FIG. 41A). Noticeable differences such as the number of plants, lighter colour of fronds, and spindly roots can be visualized in comparison with the control (FIG. 42A) to the presence of 15 mg/L of glyphosate (FIG. 42B).

Figure 43A:
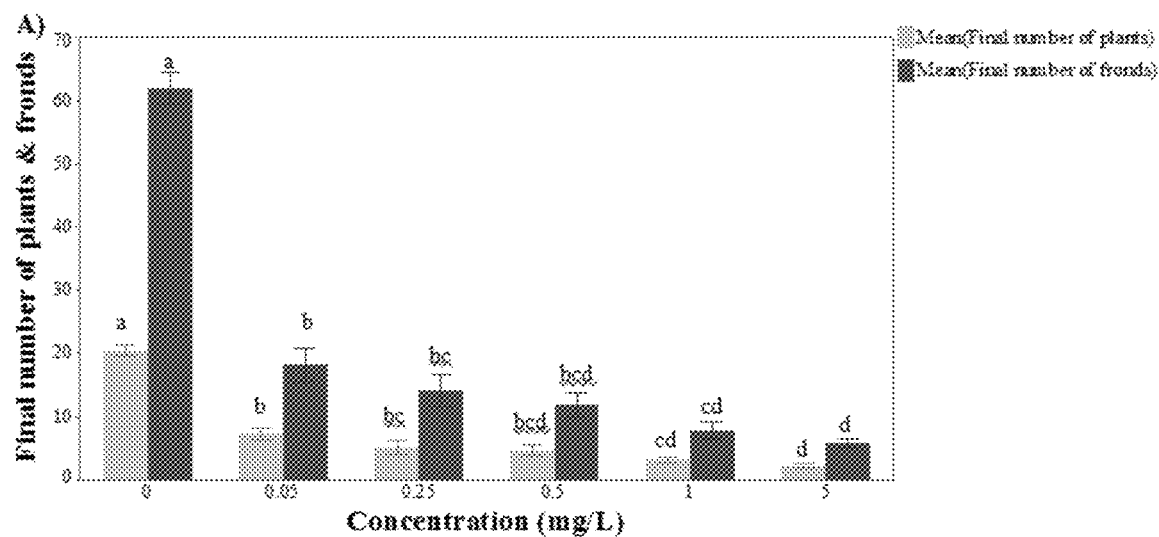
FIG. 43A shows the effects of paclobutrazol (Bonzi™) on (A) the final number of *Lemna minor* plants, fronds.
Figure 43B:
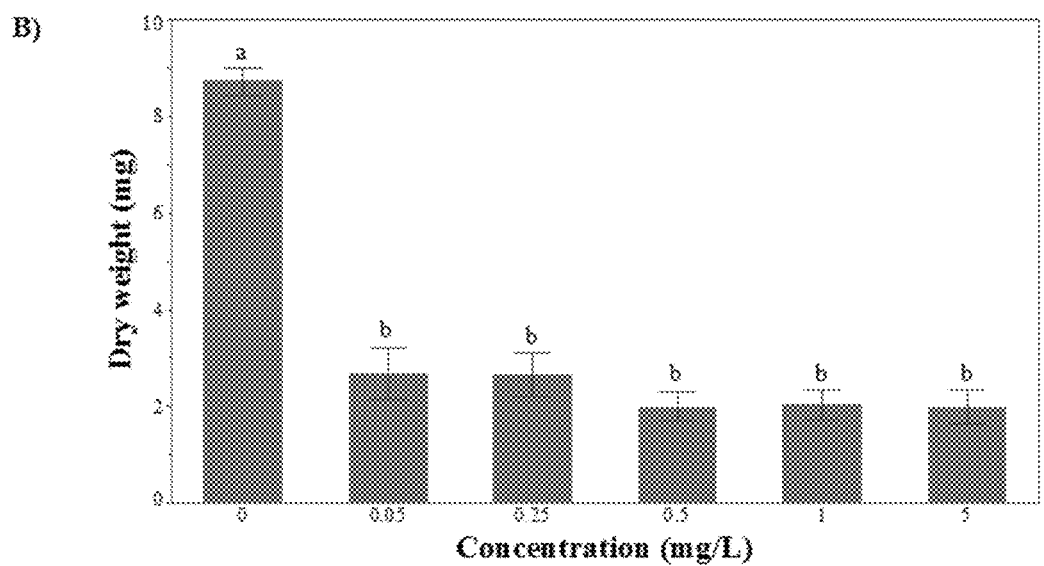
FIG. 43B shows their dry weights with increasing concentration on the horizontal axis. Plant samples were measured after a growth period of 7 days in the growth chamber. Error bars are ±SEM, n=3.
Figure 44:
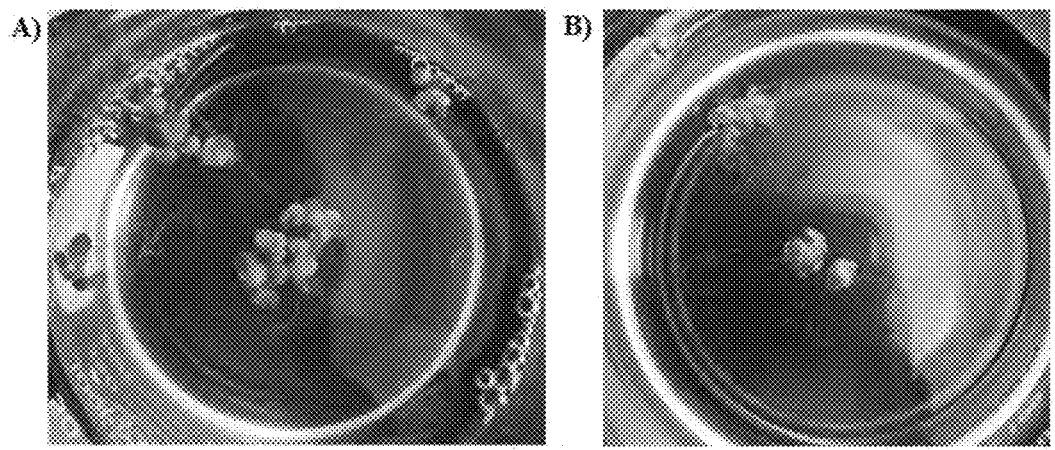
FIG. 44A demonstrates the growth of *Lemna minor* (A) without the presence of paclobutrazol and FIG. 44B with of 5 mg/L of paclobutrazol in solution and grown over a period of 7 days in the growth chamber.

When performing the same bioassay using paclobutrazol (Bonzi™), the results showed more profound effects on the growth and reproduction of *Lemna* plants. Significant decreases were observed for all tested concentrations in comparison to the control group with all of the tested parameters for plant physiological and reproductive health (FIGS. 43A & 43B). These visual differences can be observed in FIGS. 44A & 44B, showing the plants growing over top of each other and causing very spindly roots, which ultimately effects the growth of the plants.

Significant differences for all measured parameters in the health of *Lemna minor* was between 5 and 15 mg/L for glyphosate, while paclobutrazol had significant differences at even the lowest concentration of 0.05 mg/L. An analysis of dose-response for determining the EC50 dose with glyphosate was ~9 mg/L using the data from FIG. 4. However, the chosen dose for foregoing experiments was slightly lowered to 7 mg/L to be equivalent to 170 times higher than the background ratios typically found in surface water in Ontario, Canada. This allows to test the system as per the worst-case scenario if poor spraying management was utilized by a neighbouring grower. With paclobutrazol, the dose-response analysis determined that the EC50 concentration was 0.01 mg/L using the data collected from FIGS. 43A & 43B. However, the concentration was increased to 3 mg/L as per the worst-case scenario that a high concentration entering surface water due to the foliar application. The foliar application of paclobutrazol can range anywhere between 1-200 mg/L. However, it must be considered that these levels will be 60 times higher than what is typically found in surface water ponds. This enables to test all of these systems for handling the worst possible scenario that a grower might experience in their agricultural career.

Electrochemical Degradation of Agrichemicals

Figure 45:
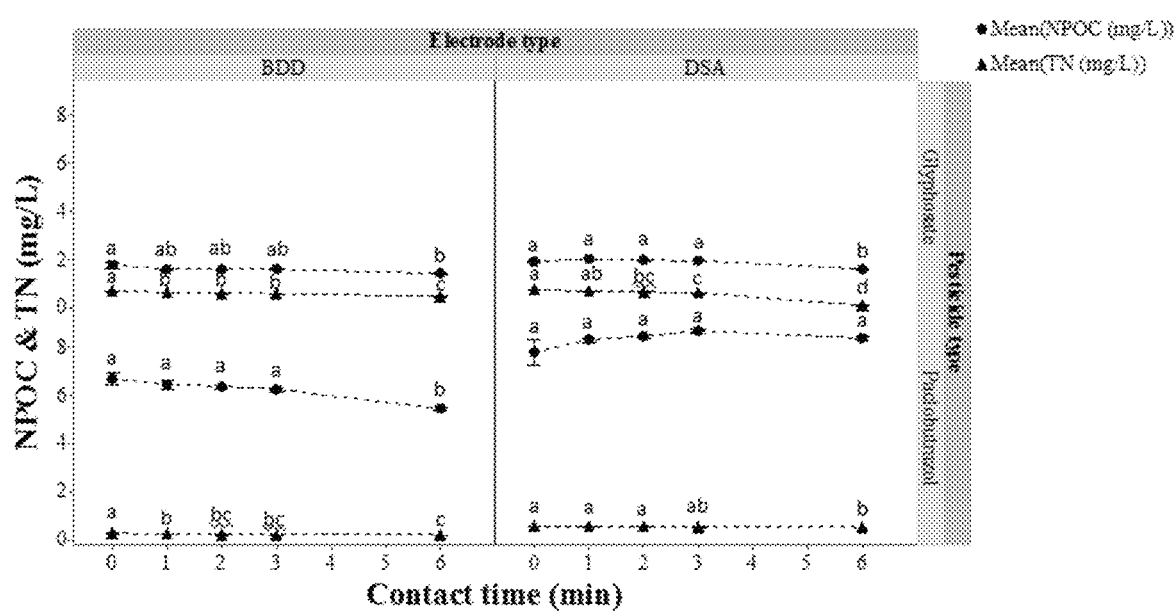
FIG. 45: The NPOC and TN measured following treatment from DSA and BDD electrodes on glyphosate and paclobutrazol standards in a batch cell. The solution also contained 20 mg/L of chloride with both systems for treating the water. Error bars are ±SEM, n=3.

The degradation of both glyphosate (8.5 mg/L) and paclobutrazol (12 mg/L) was conducted with the use of electrochemical systems for a direct comparison on their efficacies in a batch cell configuration. When applying a current density of 2.27 mA/cm$^2$ with the presence of glyphosate, the NPOC and TN were shown to significantly decrease with contact time by both electrochemical systems (FIG. 45). The NPOC had decreased by 16.18%, while the TN decreased by 85.97% with the use of DSA electrodes. Furthermore, the NPOC decreased by 19.73% and the TN decreased by 32.61% with BDD electrodes with the same compound. For paclobutrazol, the NPOC was unaffected and the TN decreased by only 7.12% with the DSA electrodes. However, the NPOC significantly decreased by 18.41%, as well as the TN decreasing by 22.58% when BDD electrodes were utilized. The NPOC and TN had larger decreases between the 3 and 6-minute contact time with the DSA electrodes for glyphosate, while the changes were more subtle using BDD electrodes. Although with the presence of paclobutrazol, there were larger decreases in NPOC and TN exhibited with the BDD electrodes.

Figure 46A:
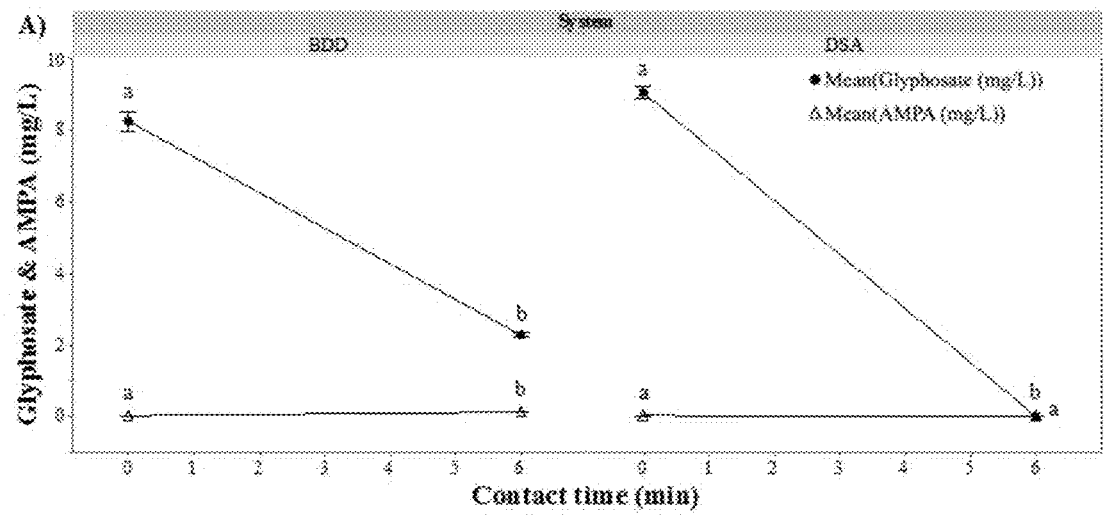
FIG. 46A shows the treatment of solution using the BDD and DSA electrodes for treating the solution from chemical standards glyphosate, AMPA
Figure 46B:
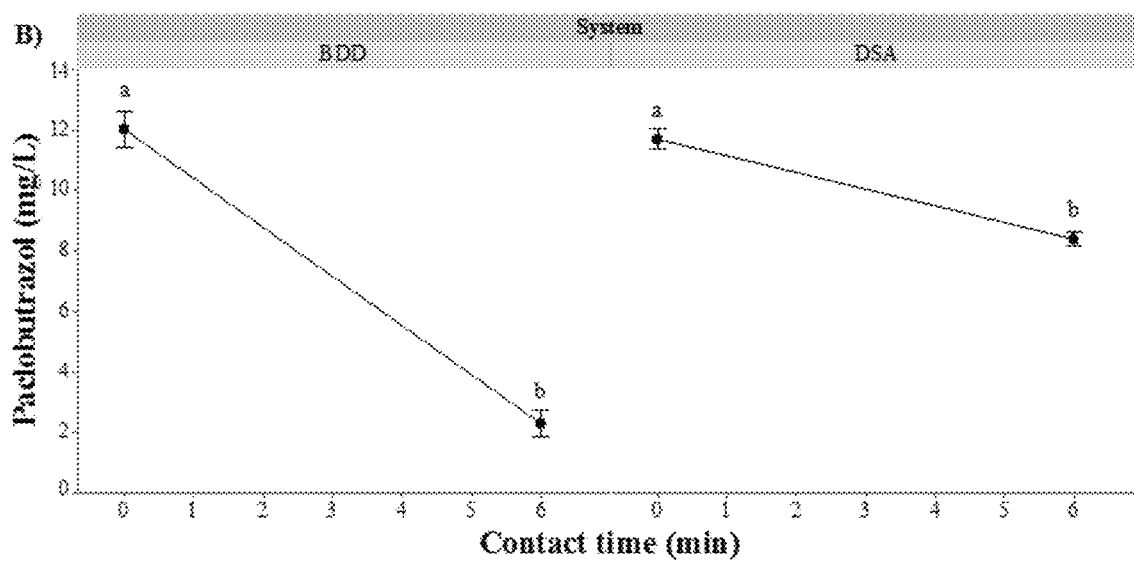
FIG. 46B shows paclobutrazol using a current density of 2.27 mA/cm$^2$ with a 6-minute contact time. The treatment was performed in a batch cell with constant mixing. Only 20 mg/L of chloride and the chemical standard were present in solution. Error bars are ±SEM, n=3.

With the same standards in solution from FIGS. 46A & 46B, there were significant decreases with both systems for glyphosate and paclobutrazol when applying the same current density of 2.27 mA/cm$^2$. The DSA electrodes removed glyphosate and AMPA from the solution to levels below the detection limit (<8 µg/L) between the contact times of 0 and 6-minutes (FIG. 46A). BDD electrodes achieved a reduction of 72.47% of glyphosate but increased AMPA by 0.10 mg/L. Although, when paclobutrazol was present, there was a reduction of 28.29% with DSA's and a reduction of 80.94% with BDD electrodes (FIG. 46B).

The complete degradation of glyphosate (<8 µg/L) was achieved using DSA electrodes with a current density of 2.27 mA/cm$^2$ and a contact time of 6-minutes (FIG. 46A). The system was shown to have degradation, which is supported by the decrease of 16% in NPOC and 86% in TN (FIG. 45). This indicates that not only is glyphosate being degraded, but also the derived compounds sarcosine and AMPA, which were being further degraded by losing their amine groups and releasing nitrate. Furthermore, the loss of TN was due to the reduction in nitrate to ammonium and forming chloramines, which reacts with hypochlorite and denitrifies from solution. This reaction is largely dependent on the pH and the $ClO^-/NH_4^+$ molar ratio to completely remove nitrogen from the solution. The final pH of the test solution was ~6.5 with a current density of 2.27 mA/cm$^2$ with a contact time of 6-minutes.

With BDD electrodes, the system achieved a degradation of 72% for glyphosate with the same current density and contact time of 6-minutes (FIG. 46A). The NPOC and TN showed a moderate decrease in solution, indicating that the current efficiency is lower for removing glyphosate in comparison to DSA electrodes. Glyphosate was not completely removed from solution with BDD electrodes showing 20% with 2.27 mA/cm$^2$ (FIG. 45). Furthermore, AMPA was shown to increase from 0.009 to 0.11 mg/L and the TN in solution had only decreased by 32%. This indicates that glyphosate is being degraded at a low current density, however, the mass balance between the release and degradation of AMPA may favour its accumulation in the solution. A higher current density and pH is established for the complete removal of glyphosate and AMPA to favour mineralization and denitrification reactions.

With the presence of paclobutrazol in solution, the results were found to be opposite from what was presented with the degradation of glyphosate. The DSA electrodes showed to have a minor effect by decreasing the TN by 7% and having no significant effect on decreasing NPOC (FIG. 45). The small decrease in TN indicates that there is degradation occurring at the location of the heterocyclic compound triazole in paclobutrazol, which is supported by the results shown in FIG. 46B. The DSA electrodes removed 28% of the paclobutrazol in solution. NPOC remained unaffected which indicates that the system was unable to reach complete mineralization of the contaminant.

Degradation of paclobutrazol by BDD electrodes was shown to be more efficient in comparison to the DSA electrodes (FIG. 46B). The loss of 18% of the NPOC and 23% of TN indicates some mineralization of the compound in solution. Resulting in an 81% reduction of paclobutrazol in solution (FIG. 45). The increased destruction of this molecule was due to a combination of direct oxidation by electron transfer, discharge of water molecules to form adsorbed hydroxyl radicals, indirect oxidation by other reactive oxygen species (ROS), and organic radical intermediates. The production of hydroxyl radicals differentiates both electrochemical systems for the degradation of paclobutrazol. This process explains why BDD electrodes were more effective at removing paclobutrazol. Although both systems did not completely remove paclobutrazol, they did cause a significant reduction when comparing the initial concentration (which was used at concentrations many fold higher than environmental background levels). Both systems improve water quality for plant growth when paclobutrazol is found in trace amounts in irrigation water.

Effects of Chlorination with the Use of BDD Anodes

Figure 47A:
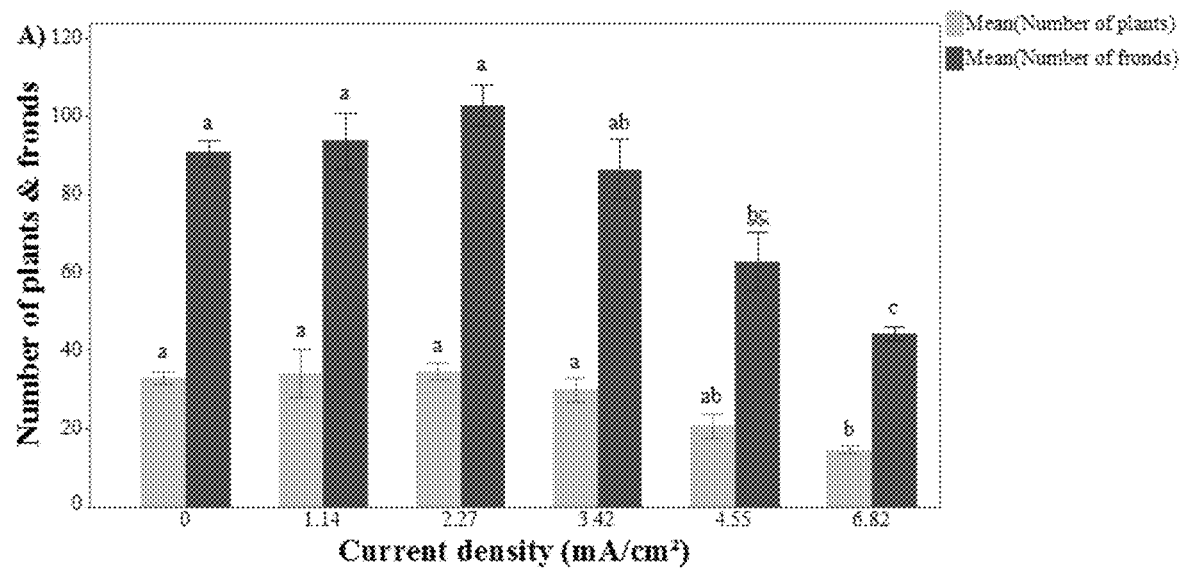
FIG. 47A shows measured parameters for plant health in relation to the current density with the number of plants, fronds
Figure 47B:
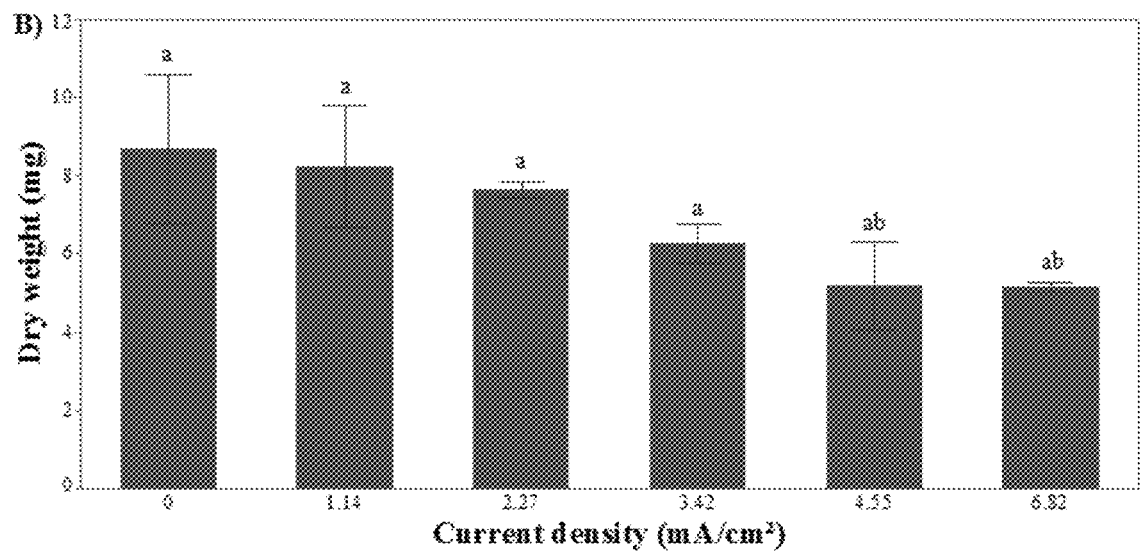
FIG. 47B shows the total dry weight of plants. The system was configured to the EFC with only the presence of 20 mg/L Cl in solution. Error bars are ±SEM, n=3.
Figure 48:
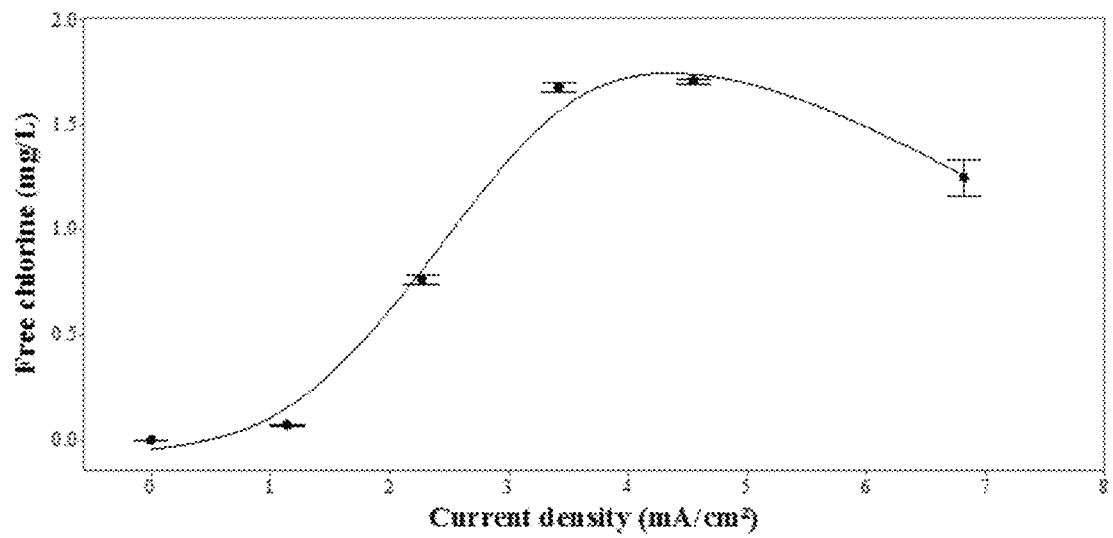
FIG. 48: Measured values of free chlorine in the effluent stream from the EFC in relation to the current density applied to the solution. The system was configured to the EFC with only the presence of 20 mg/L Cl in solution. Error bars are ±SEM, n=3.

The effects of free chlorine and other chlorinated species formed such as chlorates and perchlorates were explored to evaluate potential effects on plant growth with BDD anodes. The health and reproduction of the plants were evaluated in relation to the current density applied to the solution. Significant decreases were observed with the number of fronds with current densities ≥3.42 mA/cm$^2$ (FIG. 47A). However, significant decreases in the number of plants and dry weights were not observed until reaching current densities of ≥4.55 mA/cm$^2$ (FIGS. 47A & 47B). When observing the concentration of free chlorine exiting the cell, there was a positive trend for increasing free chlorine with current density (FIG. 48). However, a saturation point was reached at both current densities of 3.41 and 4.55 mA/cm$^2$ and a moderate decrease was shown for preceding currents.

Results shown in FIGS. 47A & 47B demonstrate that no effects on plant growth or function occur with current densities ≤2.27 mA/cm$^2$. No difference in dry weight and number of plants were observed with a current density of 3.42 mA/cm$^2$, there was however, a moderate decrease in the number of fronds (FIG. 47A). The concentration of free chlorine was shown to peak at ~1.75 mg/L for both these current densities (FIG. 47A). These minor effects that are experienced, relate to free chlorine concentrations approaching the determined phytotoxic threshold (2.5 mg/L) for most major crops. Though, when increasing the current density ≥3.42 mA/cm$^2$, there were clear decreases in the form and function of plants (FIG. 47A/B). The level of free chlorine had moderately decreased to ~1.25 mg/L, indicating that chlorates could be formed (FIG. 48). Some negative effects on plant growth were experienced at 4.55 and 6.82 mA/cm$^2$ (FIG. 47A). In the presence of fertilizer in solution the formation of chlorates may be prevented.

Degradation of Agrichemicals by Various Water Treatment Methods

Figure 49A:
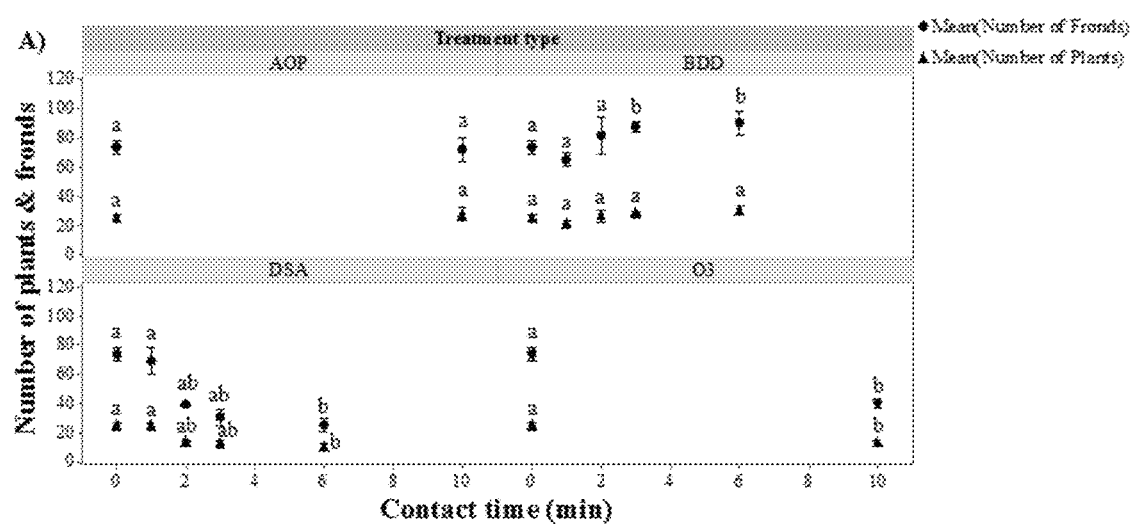
FIGS. 49A and 49B shows results on plant growth and reproduction after treatment with AOP, BDD, DSA and $O_3$ on the commercial product Roundup. Parameters measured are shown in FIG. 49A of the number of plants, fronds
Figure 49B:
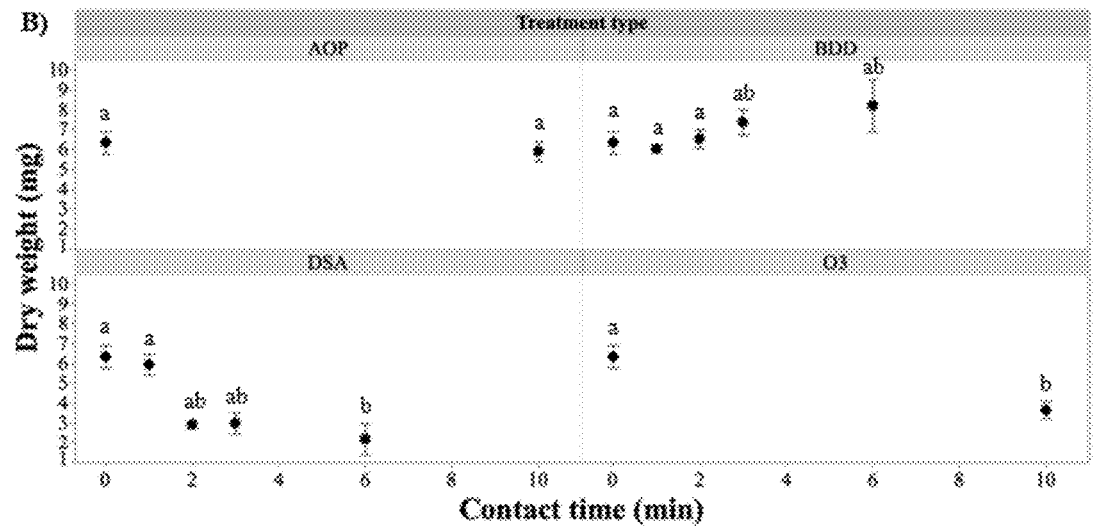

The commercialized product Roundup™ was added to deionized water at a concentration of 7 mg/L for the main active compound glyphosate. The solution was treated with varying contact times by all treatment methods previously mentioned. Both electrochemical systems used a current density of 2.27 mA/cm$^2$ with various contact times, while the ozone and AOP treatments had an injection of ozone for 10 mins reaching 4.7±0.26 mg/L $O_{3(aq)}$. The AOP treatment followed the ozone treatment by passing the solution through UV light with a flow rate of 310 mL/min. There were no significant differences in the number of plants, fronds, or dry weights of Lemna minor following the AOP treatment (FIGS. 49A & 49B). However, with the BDD electrodes, there were significant increases in the number of fronds and dry weight of plants past the contact time of 2 minutes. No significant differences were found in the number of plants with any contact time that was subjected to the solution (FIG. 49A). With the DSA electrodes, there were no significant differences found in the growth of Lemna minor with a contact time of 1-minute. However, when increasing the contact time ≥2 minutes, there were decreases in the growth and reproduction of plants. Ozonation had the same concentration of 4.7 mg/L used for the AOP treatment and it showed significant decreases in plant growth for all measured parameters with a contact time of 10 minutes.

All of the treatments were successful at removing glyphosate to concentrations low enough to maintain healthy plants following treatment, except for ozonation (FIG. 12). The decreases in plant growth should not be associated with the presence of glyphosate in solution but rather an ozone residual that is too high for plant growth. This occurred nevertheless with allowing the solution to stand for 20 minutes before adding the Hoagland solution and Lemna minor into Erlenmeyer flasks. A partial amount of ozone would have been consumed with the introduction of the Hoagland solution however, the residual ozone concentration must have been above 1.5 mg/L. When AOP was employed, the residual concentration of ozone was absent in solution which lead to no adverse effects on plant growth as experienced with ozone. BDD electrodes were also successful at removing glyphosate and even had significant increases in plant growth with the contact time. Without being bound by any theory, the phosphatic group and nitrogen found in glyphosate after the compound is mineralized by hydroxyl radicals and other side reactions is released. This releases orthophosphate, ammonium, and nitrate in solution and increases the amount of available nutrients needed for plant growth. This increase in nutrients leads to improved growth conditions in comparison to control plants. With the DSA electrodes, no significant differences in plant growth were observed by treating the solution with 2.27 mA/cm$^2$ for a 1-minute contact time.

Thus, indicating that glyphosate had been removed to concentrations lower than 2.5 mg/L (FIGS. 4 & 12). Increasing the contact time (>2 minutes) lead to a decrease in growth due to the residual free chlorine concentration approaching phytotoxicity for plants. The residual free chlorine concentrations at the 2-minute contact time were more than 1.5 mg/L and this shows phytotoxicity effects on *Lemna minor* at these higher concentrations.

Figure 50A:
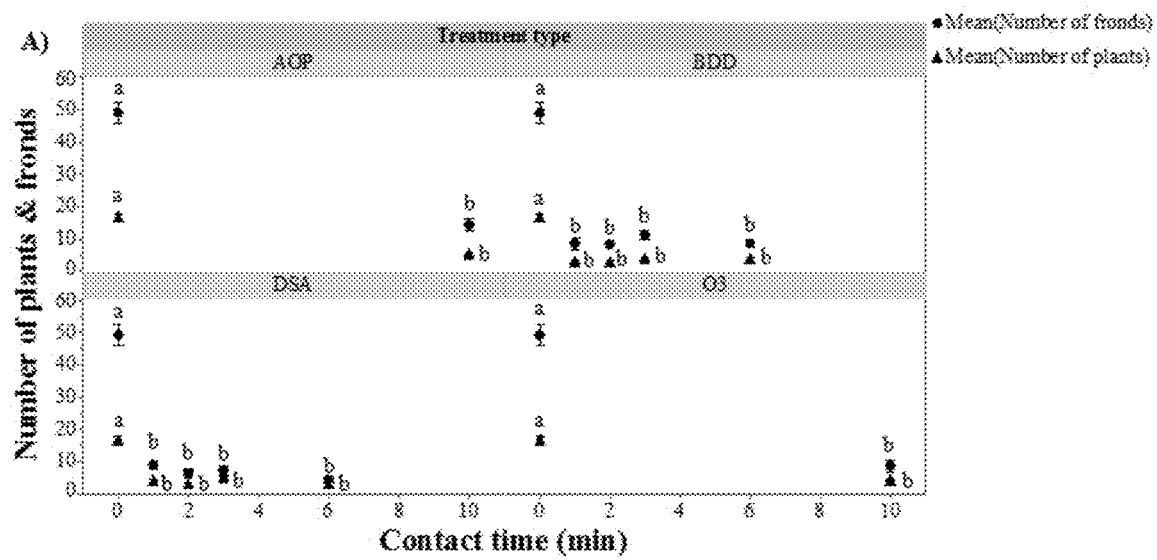
FIGS. 50A and 50B shows results on plant growth and reproduction after treatment with AOP, BDD, DSA and $O_3$ on the commercial product Bonzi™. Parameters measured are shown in FIG. 50A of the number of plants, fronds and FIG. 50B the dry weights of plants in relation to the contact time each treatment. The electrochemical systems were configured to the EFC with only the presence of 20 mg/L Cl⁻ in solution. Error bars are ±SEM, n=3.
Figure 50B:
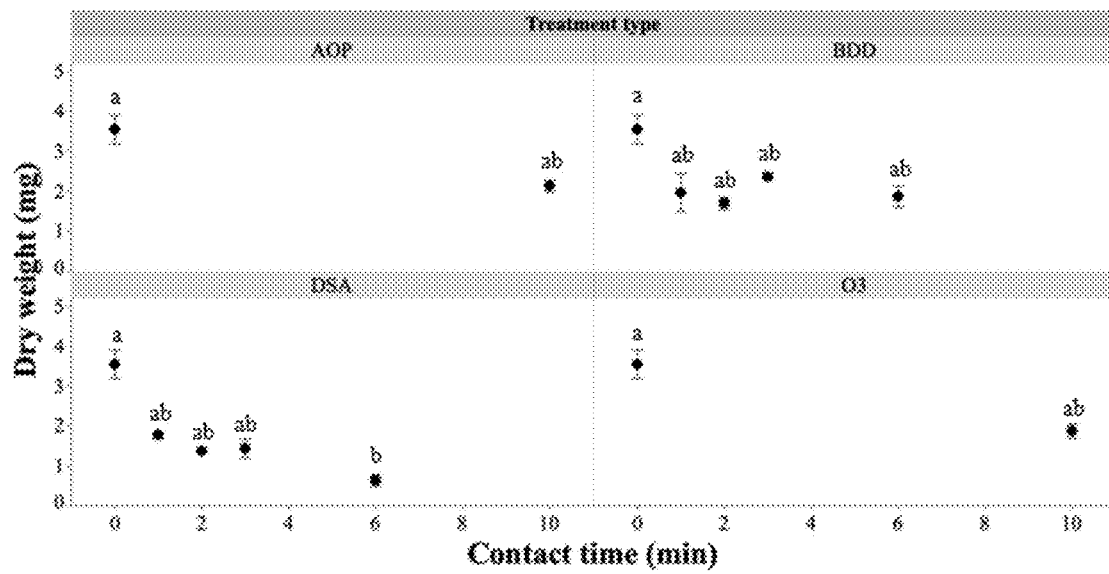

Paclobutrazol was added in solution in the form of the commercialized product Bonzi™ at a concentration of 3 mg/L of paclobutrazol (FIG. 50A/50B). The solutions were then subjected to treatment by AOP, BDD, DSA and ozonation, same as the previous experiment conducted with Glyfos™. For all treatments, there were significant decreases in plant health and reproduction with all contact times that were tested. With the DSA electrodes, it showed to have an additive effect for decreasing plant health with a longer contact time of 6 minutes. No signs of improvement for *Lemna minor* were found with all tested parameters for this experiment.

When 3 mg/L of paclobutrazol is in solution from the commercial product Bonzi™, all treatments did not completely remove the compound. Some of the paclobutrazol and surfactants were removed by the treatments, as partially indicated by FIG. 46B. However, all treatment methods were not able to reduce the concentration lower than the LOEC levels of 0.01 mg/L previously determined by the results collected in FIGS. 43A/43B. Paclobutrazol has been shown to be highly recalcitrant, thus either one or more repetition of the treatment could be effected or stronger treatment method could be employed to completely remove the chemical. The BDD electrodes had been shown to be the most effective treatment known for removing the compound (FIGS. 46A/46B).

Recirculation Experiments with Paclobutrazol

Figure 51A:
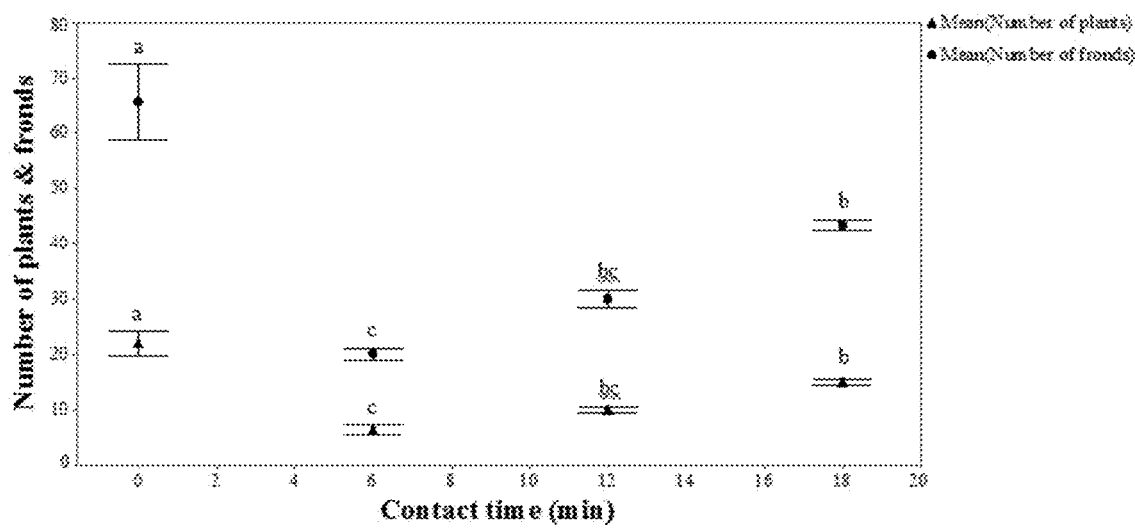
FIGS. 51A and 51B shows results on plant growth and reproduction after treatment with AOP, BDD, DSA and $O_3$ on the commercial product Bonzi™. Parameters measured are shown in FIG. 51A of the number of plants, fronds and FIG. 51B the dry weights of plants in relation to the contact time each treatment. The electrochemical system was configured to the EFC with only the presence of 20 mg/L Cl⁻ in solution and recirculated 3 times with a 6-minute contact time. Error bars are ±SEM, n=3.
Figure 51B:
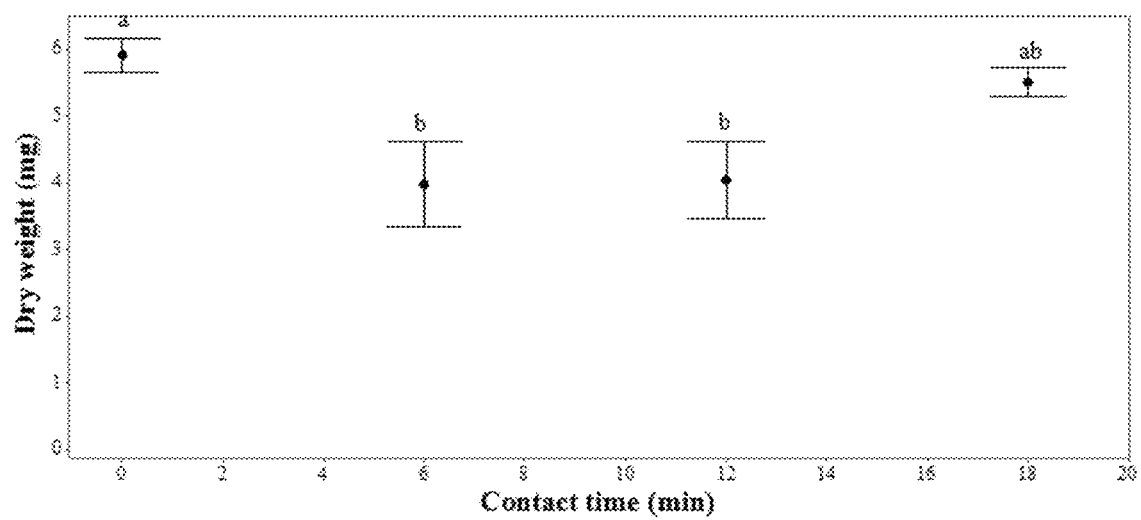

The experiment with paclobutrazol from FIG. 50A/50B was re-performed with longer contact times by recirculating the solution through the electrochemical flow cell with BDD electrodes (FIG. 51A/51B). The solution was recirculated at a flow rate of 64 mL/min with a total volume of 2.14 L in a 3 L beaker. The solution had a contact time of 6 minutes with the electrodes and took approximately 35 minutes for the solution to recirculate completely for 1 full pass. Each pass added 6 minutes, as the solution would be in contact with the electrodes for a total of 18 minutes with a total of 3 passes. With each pass there was a positive improvement with all parameters monitored for plant health. However, there were still significant differences with even the longest contact time of 18 minutes in comparison to the control without paclobutrazol present. The solution was recirculated with longer contact times and using the same current density for identifying whether the compound can be removed effectively with BDD electrodes. Although there was still a difference in comparison to the control, there is a positive trend for remediating water quality for plant growth and function. These results suggest that a contact time of 24 minutes may remove paclobutrazol to levels low enough to have no significant differences. Upon looking at the growth parameters of plants, there is a definite indication that paclobutrazol levels were lower than 0.05 mg/L by comparing the results between FIGS. 43A/43B & 51A/51B. Furthermore, having a concentration of 3 mg/L of paclobutrazol in the source water of a greenhouse may be unlikely. Thus, the system does demonstrate that significant improvements are made to source water if paclobutrazol was only present in trace amounts.

*Lemna* Experiments (with Fertilizer Present):

The experiments described herein are repeated in the presence of fertilizer in solution (0.5 g/L of 20-8-20 plant prod fertilizer or half strength Hoagland solution).

TABLE 2

| List Of Registered Pesticides (Chemical Name) | CAS Registry Number (or EDF Substance ID) |
|---|---|
| .ALPHA.-L-XYLO-2-HEXULOFURANOSONIC ACID, 2,3:4,6-BIS-O-(1-METHYLETHYLIDENE)-, SODIUM SALT | 52508-35-7 |
| .BETA.-D-ALLOFURANURONIC ACID, 5-[[2-AMINO-5-O-(AMINOCARBONYL)-2-DEOXY-L-XYLONOYL]AMINO]-1-(5-CARBOXY-3,4-DIHYDRO-2,4-DI . . . | 146659-78-1 |
| ABAMECTIN | 71751-41-2 |
| ABSOLUE ORANGE FLOWER | 8008-57-9 |
| AC 263222 (CADRE HERBICIDE) | 81334-60-3 |
| ACACIA MOLLISSIMA TANNIN | 1401-55-4 |
| ACEITE DE LINAZA | 8001-26-1 |
| ACEITE DE PINO | 8002-09-3 |
| ACEPHATE | 30560-19-1 |
| ACETALDEHYDE, (3,3-DIMETHYLCYCLOHEXYLIDENE)-, (E)- | 26532-25-2 |
| ACETALDEHYDE, (3,3-DIMETHYLCYCLOHEXYLIDENE)-, (Z)- | 26532-24-1 |
| ACETAMIDE, N-[2,4-DIMETHYL-5-[[(TRIFLUOROMETHYL)SULFONYL]AMINO]PHENYL]- | 53780-34-0 |
| ACETAMIDE, N-[2,4-DIMETHYL-5-[[(TRIFLUOROMETHYL)SULFONYL]AMINO]PHENYL]-, MONOPOTASSIUM SALT | 83601-83-6 |
| ACETAMINOPHEN | 103-90-2 |
| ACETIC ACID | 64-19-7 |
| ACETIC ACID, (2,4,5-TRICHLOROPHENOXY)-, 1-METHYLETHYL ESTER | 93-78-7 |
| ACETIC ACID, (2,4,5-TRICHLOROPHENOXY)-, 2-BUTOXYETHYL ESTER | 2545-59-7 |
| ACETIC ACID, (2,4,5-TRICHLOROPHENOXY)-, 2-ETHYL-4-METHYLPENTYL ESTER | 69462-12-0 |
| ACETIC ACID, (2,4,5-TRICHLOROPHENOXY)-, 2-ETHYLHEXYL ESTER | 1928-47-8 |
| ACETIC ACID, (2,4,5-TRICHLOROPHENOXY)-, COMPD. WITH 2-(DIETHYLAMINO)ETHANOL (1:1) | 53404-86-7 |
| ACETIC ACID, (2,4,5-TRICHLOROPHENOXY)-, PENTYL ESTER | 120-39-8 |
| ACETIC ACID, (2,4-DICHLOROPHENOXY)-, 2-METHYLPROPYL ESTER | 1713-15-1 |

TABLE 2-continued

List Of Registered Pesticides (Chemical Name)

| | CAS Registry Number (or EDF Substance ID) |
|---|---|
| ACETIC ACID, (2,4-DICHLOROPHENOXY)-, AMMONIUM SALT | 2307-55-3 |
| ACETIC ACID, (2,4-DICHLOROPHENOXY)-, COMPD. WITH 1,1',1''-NITRILOTRIS(2-PROPANOL) (1:1) | 32341-80-3 |
| ACETIC ACID, (2,4-DICHLOROPHENOXY)-, COMPD. WITH 1,1',1''-NITRILOTRIS[2-PROPANOL] (1:1) | 18584-79-7 |
| ACETIC ACID, (2,4-DICHLOROPHENOXY)-, COMPD. WITH 1-DODECANAMINE (1:1) | 2212-54-6 |
| ACETIC ACID, (2,4-DICHLOROPHENOXY)-, COMPD. WITH 1-TETRADECANAMINE (1:1) | 28685-18-9 |
| ACETIC ACID, (2,4-DICHLOROPHENOXY)-, COMPD. WITH 2,2',2''-NITRILOTRIS[ETHANOL] (1:1) | 2569-01-9 |
| ACETIC ACID, (2,4-DICHLOROPHENOXY)-, COMPD. WITH 2,2'-IMINOBIS[ETHANOL] (1:1) | 5742-19-8 |
| ACETIC ACID, (2,4-DICHLOROPHENOXY)-, COMPD. WITH 2-AMINOETHANOL (1:1) | 3599-58-4 |
| ACETIC ACID, (2,4-DICHLOROPHENOXY)-, COMPD. WITH 2-PROPANAMINE (1:1) | 5742-17-6 |
| ACETIC ACID, (2,4-DICHLOROPHENOXY)-, COMPD. WITH N,N-DIETHYLETHANAMINE (1:1) | 2646-78-8 |
| ACETIC ACID, (2,4-DICHLOROPHENOXY)-, COMPD. WITH N-ETHYLETHANAMINE (1:1) | 20940-37-8 |
| ACETIC ACID, (2,4-DICHLOROPHENOXY)-, COMPD. WITH N-METHYLMETHANAMINE (1:1) | 2008-39-1 |
| ACETIC ACID, (2,4-DICHLOROPHENOXY)-, LITHIUM SALT | 3766-27-6 |
| ACETIC ACID, (2,4-DICHLOROPHENOXY)-, POTASSIUM SALT | 14214-89-2 |
| ACETIC ACID, (4-CHLORO-2-METHYLPHENOXY)-, COMPD. WITH N-METHYLMETHANAMINE (1:1) | 2039-46-5 |
| ACETIC ACID, (4-CHLORO-2-METHYLPHENOXY)-, ISOOCTYL ESTER | 26544-20-7 |
| ACETIC ACID, BROMO-, 2-BUTENE-1,4-DIYL ESTER | 20679-58-7 |
| ACETIC ACID, NITRILOTRI-, TRISODIUM SALT | 5064-31-3 |
| ACETIC ACID, SODIUM SALT (2:1) | 126-96-5 |
| ACETIC ACID, TRICHLORO-, SODIUM SALT | 650-51-1 |
| ACETIC ACID, [(3,5,6-TRICHLORO-2-PYRIDINYL)OXY]-, 2-BUTOXYETHYL ESTER | 64700-56-7 |
| ACETOCHLOR | 34256-82-1 |
| ACETONE | 67-64-1 |
| ACETYLSALICYLIC ACID | 50-78-2 |
| ACIBENZOLAR-S-METHYL | 135158-54-2 |
| ACID BLUE 9,DIAMMONIUM SALT | 2650-18-2 |
| ACIDULATED COCONUT SOAPSTOCK | 8001-31-8 |
| ACIDULATED SOYBEAN SOAPSTOCK | 8001-22-7 |
| ACIFLUORFEN, SODIUM SALT | 62476-59-9 |
| ACROLEIN | 107-02-8 |
| ACRYLONITRILE | 107-13-1 |
| ACTOCOL 51-530 | 25322-69-4 |
| ADEPS LANE | 8006-54-0 |
| 1,1'-AETHYLEN-2,2'-BIPYRIDINIUM-DIBROMID | 85-00-7 |
| AKYPOSAL ALS 33 | 2235-54-3 |
| AKYPOSAL TLS | 139-96-8 |
| ALACHLOR | 15972-60-8 |
| ALCOHOLS, C11-15, ETHOXYLATED, COMPDS. WITH IODINE | 68439-47-4 |
| ALCOHOLS, C11-15-SECONDARY, ETHOXYLATED | 68131-40-8 |
| ALCOHOLS, C8-10 | 85566-12-7 |
| ALDICARB | 116-06-3 |
| ALDRIN | 309-00-2 |
| ALKENES, C14-16 ALPHA-, SULFONATED, SODIUM SALTS | 68439-57-6 |
| ALKYL DIMETHYLBENZYL AMMONIUM CHLORIDE | 8001-54-5 |
| ALKYL PYRIDINES | 68391-11-7 |
| ALKYL(C12-16)DIMETHYLBENZYLAMMONIUM CHLORIDE | 68424-85-1 |
| ALLETHRIN | 584-79-2 |
| ALLYL ALCOHOL | 107-18-6 |
| ALLYL ISOTHIOCYANATE | 57-06-7 |
| 1-ALLYL-4-METHOXYBENZENE | 140-67-0 |
| ALMOND ARTIFICIAL ESSENTIAL OIL | 100-52-7 |
| ALPHA,ALPHA'-((9-OCTADECENYLIMINO)DI-2,1-ETHANEDIYL)BIS(OMEGA-HYDROXYPOLY(OXY-1,2-ETHANEDIYL)-, (Z)- | 26635-93-8 |
| ALPHA,ALPHA,ALPHA-TRIFLUORO-3'-ISOPROPOXY-O-TOLUANILIDE | 66332-96-5 |
| ALPHA-METOLACHLOR | 87392-12-9 |
| ALUMINUM | 7429-90-5 |
| ALUMINUM CHLORIDE | 7446-70-0 |
| ALUMINUM PHOSPHIDE | 20859-73-8 |
| ALUMINUM SULFATE | 10043-01-3 |
| AMETRYN | 834-12-8 |
| AMIDES, C12-18, N,N-BIS(HYDROXYETHYL) | 68155-06-6 |
| AMIDES, COCO, N-(2-HYDROXYETHYL)- | 68140-00-1 |
| AMIDES, SOYA, N,N-BIS(HYDROXYETHYL) | 68425-47-8 |
| AMINES, COCO ALKYL, ACETATES | 61790-57-6 |
| AMINES, COCO ALKYL, HYDROCHLORIDES | 91745-52-7 |

TABLE 2-continued

List Of Registered Pesticides (Chemical Name)

| | CAS Registry Number (or EDF Substance ID) |
|---|---|
| AMINES, N-C12-18-ALKYLTRIMETHYLENEDI- | 68155-37-3 |
| AMINES, N-COCO ALKYLTRIMETHYLENEDI- | 61791-63-7 |
| AMINES, N-COCO ALKYLTRIMETHYLENEDI-, ACETATES | 61791-64-8 |
| AMINES, N-COCO ALKYLTRIMETHYLENEDI-, ADIPATES | 68155-42-0 |
| AMINES, N-COCO ALKYLTRIMETHYLENEDI-, GLYCOLATES | 68155-43-1 |
| AMINES, TALL-OIL ALKYL, (2,4-DICHLOROPHENOXY)ACETATES | 137335-70-7 |
| 2-AMINO-4-(HYDROXYMETHYLPHOSPHINYL)BUTANOIC ACID MONOAMMONIUM SALT | 77182-82-2 |
| 4-AMINO-BENZOLSULFONYL-METHYLCARBAMAT | 3337-71-1 |
| AMINOCARB | 2032-59-9 |
| 2-AMINOETHANOL | 141-43-5 |
| AMITRAZ | 33089-61-1 |
| AMITROLE | 61-82-5 |
| AMMATE | 7773-06-0 |
| AMMONIA | 7664-41-7 |
| AMMONIUM CARBONATE | 506-87-6 |
| AMMONIUM HYDROXIDE | 1336-21-6 |
| AMMONIUM OLEATE | 544-60-5 |
| AMMONIUM SILICOFLUORIDE | 16919-19-0 |
| AMMONIUM SULFATE | 7783-20-2 |
| AMMONIUM THIOSULFATE | 7783-18-8 |
| AMYL ACETATE | 628-63-7 |
| ANCYMIDOL | 12771-68-5 |
| ANHIDRIDO BUTIRICO | 106-31-0 |
| ANILAZINE | 101-05-3 |
| 9,10-ANTHRACENEDIONE | 84-65-1 |
| ANTIMONY POTASSIUM TARTRATE | 28300-74-5 |
| ANTIMYCIN A | 1397-94-0 |
| ANTU | 86-88-4 |
| APPLE ACID | 6915-15-7 |
| ARAMITE | 140-57-8 |
| ARIEN | 64742-16-1 |
| AROMATIC NAPHTHA, TYPE I | 64742-95-6 |
| AROMATIC PETROLEUM DERIVATIVE SOLVENT | 68477-31-6 |
| ARQUAD 2C | 61789-77-3 |
| ARSENIC ACID | 7778-39-4 |
| ARSENIC ACID (H3ASO4), MONOAMMONIUM SALT | 13462-93-6 |
| ARSENIC AS ELEMENTAL, PRESENT AS DODECYL AND OCTYL AMMONIUM METHYL ARSENATES | 6379-37-9 |
| ARSENIC OXIDE (3) | 1327-53-3 |
| ARSENIC PENTOXIDE | 1303-28-2 |
| ARSONIC ACID, METHYL-, CALCIUM SALT (2:1) | 5902-95-4 |
| ASBESTOS (FRIABLE) | 1332-21-4 |
| ASPHALT (PETROLEUM) FUMES | 8052-42-4 |
| ASPON (NPD) | 3244-90-4 |
| ATRAZINE | 1912-24-9 |
| AURAMINE | 492-80-8 |
| AZACOSTEROL | 1249-84-9 |
| AZADIRACHTIN | 11141-17-6 |
| AZINPHOS-ETHYL | 2642-71-9 |
| AZINPHOS-METHYL | 86-50-0 |
| AZODRIN | 6923-22-4 |
| AZOXYSTROBIN | 131860-33-8 |
| BACILLUS THURINGIENSIS (BERLINER) | 68038-71-1 |
| BARBAN | 101-27-9 |
| BARIUM CARBONATE | 513-77-9 |
| BARIUM METABORATE | 13701-59-2 |
| BASIC COPPER SULFATE | 1344-73-6 |
| BASIC VIOLET 3 | 548-62-9 |
| BENDIOCARB | 22781-23-3 |
| BENFLURALIN | 1861-40-1 |
| BENOMYL | 17804-35-2 |
| BENSULFURON METHYL | 83055-99-6 |
| BENSULIDE | 741-58-2 |
| BENZADOX | 5251-79-6 |
| BENZAMIDE, 5-BROMO-N-(4-BROMOPHENYL)-2-HYDROXY- | 87-12-7 |
| BENZAMIDE, N-[[[3,5-DICHLORO-4-(1,1,2,2-TETRAFLUOROETHOXY)PHENYL]AMINO]CARBONYL]-2,6-DIFLUORO- | 86479-06-3 |
| BENZENE | 71-43-2 |
| BENZENE, (2-BROMO-2-NITROETHENYL)- | 7166-19-0 |
| BENZENE, 1,2,4-TRIMETHOXY- | 135-77-3 |
| BENZENE, 1-[(DIIODOMETHYL)SULFONYL]-4-METHYL- | 20018-09-1 |

TABLE 2-continued

List Of Registered Pesticides (Chemical Name)

| | CAS Registry Number (or EDF Substance ID) |
|---|---|
| 1,2-BENZENEDICARBOXALDEHYDE | 643-79-8 |
| BENZENEDIMETHANAMINIUM, AR-DODECYL-AR,N,N,N,N',N',N'-HEPTAMETHYL-, DICHLORIDE, MIXT. WITH AR-DODECYL-AR,N,N,N-TETRAMETHYLBENZENEMETHANAMINIU | 1399-80-0 |
| BENZENEMETHANAMINIUM, AR-DODECYL-N,N,N-TRIMETHYL-, CHLORIDE | 1330-85-4 |
| BENZENEMETHANAMINIUM, N,N-DIMETHYL-N-TETRADECYL-, CHLORIDE | 139-08-2 |
| BENZENEMETHANAMINIUM, N,N-DIMETHYL-N-[2-[2-[METHYL-4-(1,1,3,3-TETRAMETHYLBUTYL)PHENOXY]ETHOXY]ETHYL]-, CHLORIDE | 25155-18-4 |
| BENZENEMETHANAMINIUM, N-[2-[(2,6-DIMETHYLPHENYL)AMINO]-2-OXOETHYL]-N,N-DIETHYL-, SALT WITH 1,2-BENZISOTHIAZOL-3(2H)-ONE 1,1-DIOXIDE (1:1) | 90823-38-4 |
| BENZENEMETHANOL, 4-CHLORO-.ALPHA.-(4-CHLOROPHENYL)-.ALPHA.-METHYL- | 80-06-8 |
| BENZENESULFONIC ACID, DECYL(SULFOPHENOXY)-, DISODIUM SALT | 36445-71-3 |
| BENZENESULFONIC ACID, DIMETHYL-, SODIUM SALT | 1300-72-7 |
| BENZENESULFONIC ACID, DODECYL-, POTASSIUM SALT | 27177-77-1 |
| BENZENESULFONIC ACID, METHYL-, SODIUM SALT | 12068-03-0 |
| BENZETHONIUM CHLORIDE | 121-54-0 |
| BENZINE | 8032-32-4 |
| 1,2-BENZISOTHIAZOLIN-3-ONE | 2634-33-5 |
| BENZOCAINE | 94-09-7 |
| BENZOIC ACID | 65-85-0 |
| BENZOIC ACID, 2,3,6-TRICHLORO- | 50-31-7 |
| BENZOIC ACID, 3,6-DICHLORO-2-METHOXY-, COMPD. WITH 2,2'-IMINOBIS[ETHANOL] (1:1) | 25059-78-3 |
| BENZOIC ACID, 3,6-DICHLORO-2-METHOXY-, COMPD. WITH 2-(2-AMINOETHOXY)ETHANOL (1:1) | 104040-79-1 |
| BENZOIC ACID, 3,6-DICHLORO-2-METHOXY-, COMPD. WITH 2-AMINOETHANOL (1:1) | 53404-28-7 |
| BENZOIC ACID, 3,6-DICHLORO-2-METHOXY-, COMPD. WITH 2-PROPANAMINE (1:1) | 55871-02-8 |
| BENZOIC ACID, 3,6-DICHLORO-2-METHOXY-, POTASSIUM SALT | 10007-85-9 |
| BENZOIC ACID, PHENYLMETHYL ESTER | 120-51-4 |
| 1,4-BENZOQUINONE, 2,3,5,6-TETRACHLORO- | 118-75-2 |
| 2,2'-BENZOTHIAZYL DISULFIDE | 120-78-5 |
| BENZYL ALCOHOL | 100-51-6 |
| BENZYL BROMOACETATE | 5437-45-6 |
| BENZYLADENINE | 1214-39-7 |
| BICYCLO(2.2.1)HEPTAN-2-OL, 1,7,7-TRIMETHYL-, ACETATE, EXO- | 125-12-2 |
| BIDRIN | 141-66-2 |
| BIFENAZATE | 149877-41-8 |
| BIFENOX | 42576-02-3 |
| BIFENTHRIN | 82657-04-3 |
| BIOBAN-C | 4075-81-4 |
| BIOBAN-S | 137-40-6 |
| BIORESMETHRIN | 28434-01-7 |
| BIPHENYL | 92-52-4 |
| [1,1'-BIPHENYL]-2-OL, AMMONIUM SALT | 52704-98-0 |
| [1,1'-BIPHENYL]-2-OL, POTASSIUM SALT | 13707-65-8 |
| 2,3,4,5-BIS (2-BUTENYLENE) TETRAHYDROFURFURAL | 126-15-8 |
| 2,6-BIS(1-METHYLETHYL)NAPHTHALENE | 24157-81-1 |
| 1,4-BIS(2-ETHYLHEXYL) SODIUM SULFOSUCCINATE | 577-11-7 |
| BIS(2-HYDROXYETHYL)LAURAMIDE | 120-40-1 |
| BIS(HYDROGENATED TALLOW ALKYL)DIMETHYLAMMONIUM BENTONITE | 68953-58-2 |
| 10,10'-BIS(PHENOXYARSINYL) OXIDE | 58-36-6 |
| BIS(TRIBUTYLTIN) OXIDE | 56-35-9 |
| BIS(TRICHLORMETHYL) SULFONE | 3064-70-8 |
| BISODIUM SULFATE | 7757-82-6 |
| BISPYRIBAC-SODIUM | 125401-92-5 |
| BK2-W | 9004-70-0 |
| BL 2142 | 31512-74-0 |
| BONE OIL | 8001-85-2 |
| BORATES,TETRA,SODIUM SALTS | 1303-96-4 |
| BORIC ACID | 10043-35-3 |
| BORON SODIUM OXIDE (B4NA2O7), PENTAHYDRATE | 12179-04-3 |
| BORON SODIUM OXIDE (B8NA2O13) | 12008-41-2 |
| BORON SODIUM OXIDE (B8NA2O13), TETRAHYDRATE | 12280-03-4 |
| BORON ZINC OXIDE (B6ZN2O11), HYDRATE | 12447-61-9 |
| BRILLIANT BLUE FCF | 3844-45-9 |
| BRODIFACOUM | 56073-10-0 |
| BROMACIL | 314-40-9 |
| BROMACIL LITHIUM SALT (2,4(H,3H)-PYRIMIDINEDIONE, ETHYL-3 (1-METHYLPROPYL), LITHIUM SALT) | 53404-19-6 |
| BROMADIOLONE | 28772-56-7 |
| BROMETHALIN | 63333-35-7 |
| BROMINE | 7726-95-6 |

TABLE 2-continued

List Of Registered Pesticides (Chemical Name)

| | CAS Registry Number (or EDF Substance ID) |
|---|---|
| BROMINE CHLORIDE | 13863-41-7 |
| 1-BROMO-1-(BROMOMETHYL)-1,3-PROPANEDICARBONITRILE | 35691-65-7 |
| 4-BROMO-2,5-DICHLOROPHENYL DIMETHYL PHOSPHOROTHIONATE | 2104-96-3 |
| 2-BROMO-2-NITROPROPANE-1,3-DIOL | 52-51-7 |
| BROMOXYNIL | 1689-84-5 |
| BROMOXYNIL OCTANOATE | 1689-99-2 |
| BROMUCONAZOLE | 116255-48-2 |
| BTC 1100 | 53516-75-9 |
| BTC 776 | 53516-76-0 |
| BTC 927 | 8045-22-5 |
| BUFA-4,20,22-TRIENOLIDE, 6-(ACETYLOXY)-3-(.BETA.-D-GLUCOPYRANOSYLOXY)-8,14-DIHYDROXY-, (3.BETA.,6.BETA.)- | 507-60-8 |
| BUFENCARB (RE-5353) | 2282-34-0 |
| BUPROFEZIN (APPLAUD) | 69327-76-0 |
| BUSAN 1104 | 85264-33-1 |
| BUSAN 74 (HPMTS) | 29803-57-4 |
| 1,3-BUTANDIOL | 107-88-0 |
| BUTANEDIOIC ACID, CADMIUM SALT (1:1) | 141-00-4 |
| BUTANEDIOIC ACID, SULFO-, 1,4-DIOCTYL ESTER, SODIUM SALT | 1639-66-3 |
| 1-BUTANETHIOL | 109-79-5 |
| BUTANOIC ACID, 4-(2,4-DICHLOROPHENOXY)-, COMPD. WITH N-METHYLMETHANAMINE (1:1) | 2758-42-1 |
| BUTANOIC ACID, 4-(2,4-DICHLOROPHENOXY)-, ISOOCTYL ESTER | 1320-15-6 |
| BUTANOIC ACID, 4-(2,4-DICHLOROPHENOXY)-, SODIUM SALT | 10433-59-7 |
| BUTANOIC ACID, 4-(4-CHLORO-2-METHYLPHENOXY)-, SODIUM SALT | 6062-26-6 |
| 3-BUTEN-2-ONE, 4-(2,6,6-TRIMETHYL-2-CYCLOHEXEN-1-YL)-, (E)- | 127-41-3 |
| 3-BUTENOIC ACID, 2-AMINO-4-(2-AMINOETHOXY)-, MONOHYDROCHLORIDE, [S-(E)]- | 55720-26-8 |
| BUTONATE | 126-22-7 |
| BUTOXYCARBOXIM | 34681-23-7 |
| BUTRALIN | 33629-47-9 |
| BUTYLATE | 2008-41-5 |
| C.I. BASIC GREEN 4 | 569-64-2 |
| (C10-C16) ALKYLBENZENESULFONIC ACID | 68584-22-5 |
| (C10-C16)ALKYLDIMETHYLAMINE OXIDE | 70592-80-2 |
| (C12-C18) ALKYLDIMETHYLBENZYL AMMONIUM CHLORIDE | 68391-01-5 |
| (C14-C18) DIALKYLDIMETHYLAMMONIUM CHLORIDE | 68002-59-5 |
| (C6-C12) ALKYL ALCOHOL | 68603-15-6 |
| (C6-C12) ALKYLCARBOXYLIC ACID METHYL ESTER | 67762-39-4 |
| (C8-C18 AND C18)UNSATURATED ALKYL CARBOXYLIC ACID, POTASSIUM SALT | 67701-09-1 |
| (C8-C18) AND (C18) UNSATURATED ALKYLCARBOXYLIC ACID SODIUM SALT | 67701-10-4 |
| CACODYLIC ACID | 75-60-5 |
| CADMIUM CARBONATE | 513-78-0 |
| CADMIUM CHLORIDE | 10108-64-2 |
| CADRE | 104098-49-9 |
| CALCIUM ARSENATE [2ASH3O4.2CA] | 7778-44-1 |
| CALCIUM CARBONATE | 471-34-1 |
| CALCIUM CHLORIDE (CACL2) | 10043-52-4 |
| CALCIUM CYANAMIDE | 156-62-7 |
| CALCIUM CYANIDE | 592-01-8 |
| CALCIUM HYDROXIDE | 1305-62-0 |
| CALCIUM HYPOCHLORITE | 7778-54-3 |
| CALCIUM OXIDE | 1305-78-8 |
| CALCIUM OXYTETRACYCLINE | 7179-50-2 |
| CALCIUM SILICATE | 10101-39-0 |
| CALCIUM SILICATE | 1344-95-2 |
| CALCIUM SULFATE | 7778-18-9 |
| CALCIUM SULFIDE (CA(SX)) | 1344-81-6 |
| CALCIUM THIOSULFATE | 10124-41-1 |
| CAMPHECHLOR | 8001-35-2 |
| CAMPHOR | 76-22-2 |
| CAPRIC ACID | 334-48-5 |
| CAPRYLIC ACID | 124-07-2 |
| CAPSAICIN | 404-86-4 |
| CAPTAN | 133-06-2 |
| CARBAMIC ACID, 1H-BENZIMIDAZOL-2-YL, 2-(ETHOXYETHOXY)ETHYL ESTER | 62732-91-6 |
| CARBAMIC ACID, 1H-BENZIMIDAZOL-2-YL-, METHYL ESTER, PHOSPHATE (1:1) | 52316-55-9 |
| CARBAMIC ACID, [(4-AMINOPHENYL)SULFONYL]-, METHYL ESTER, MONOSODIUM SALT | 2302-17-2 |
| CARBARYL | 63-25-2 |
| CARBENDAZIM | 10605-21-7 |
| CARBOFURAN | 1563-66-2 |
| CARBON | 7440-44-0 |
| CARBON DIOXIDE | 124-38-9 |

TABLE 2-continued

List Of Registered Pesticides (Chemical Name)

| | CAS Registry Number (or EDF Substance ID) |
|---|---|
| CARBON DISULFIDE | 75-15-0 |
| CARBON TETRACHLORIDE | 56-23-5 |
| CARBONIC ACID, AMMONIUM COPPER SALT | 33113-08-5 |
| CARBONIC ACID, COPPER(2+) SALT (1:1) | 1184-64-1 |
| CARBOPHENOTHION | 786-19-6 |
| CARBOXIN | 5234-68-4 |
| (((CARBOXYMETHYL)IMINO)BIS(ETHYLENENITRILO))TETRAACETIC ACID, PENTASODIUM SALT | 140-01-2 |
| CARFENTRAZONE-ETHYL | 128639-02-1 |
| CASTOR OIL | 8001-79-4 |
| CAUSTIC SODA | 1310-73-2 |
| CEDARWOOD OIL | 8000-27-9 |
| CETYLDIMETHYLETHYLAMMONIUM BROMIDE | 124-03-8 |
| CHEMICAL OIL (COAL) | 65996-82-9 |
| CHINOMETHIONAT (6-METHYL-1,3-DITHIOLO[4,5-B]QUINOX | 2439-01-2 |
| CHITIN | 1398-61-4 |
| CHITOSAN | 9012-76-4 |
| 4-CHLOR-M-CRESOL | 59-50-7 |
| CHLORBROMURON (MALORAN) | 13360-45-7 |
| CHLORDANE | 57-74-9 |
| CHLORDIMEFORM | 6164-98-3 |
| CHLORETHOXYFOS (FORTRESS) | 54593-83-8 |
| CHLORFENAC (+SALTS) | 85-34-7 |
| CHLORFENAPYR (PIRATE) | 122453-73-0 |
| CHLORFENVINFOS | 470-90-6 |
| CHLORFLURECOL METHYL ESTER | 2536-31-4 |
| CHLORHYDRIN | 96-24-2 |
| CHLORIDAZON | 1698-60-8 |
| CHLORIMURON ETHYL | 90982-32-4 |
| CHLORINATED TRISODIUM PHOSPHATE | 56802-99-4 |
| CHLORINE | 7782-50-5 |
| CHLORINE DIOXIDE | 10049-04-4 |
| CHLORMEQUAT CHLORIDE | 999-81-5 |
| 4-CHLORO-2-CYCLOPENTYLPHENOL | 13347-42-7 |
| (+-)-2-(4-CHLORO-2-METHYLPHENOXY)PROPIONIC ACID | 7085-19-0 |
| 1-CHLORO-2-NITROPROPANE | 2425-66-3 |
| 4-CHLORO-3,5-XYLENOL | 88-04-0 |
| 2-CHLORO-N,N-DI-2-PROPENYLACETAMIDE | 93-71-0 |
| (4-CHLORO-O-TOLYLOXY)BUTYRIC ACID | 94-81-5 |
| 3-CHLORO-P-TOLUIDINE | 7745-89-3 |
| 1-(3-CHLOROALLYL)-3,5,7-TRIAZA-1-AZONIAADAMANTANE CHLORIDE | 4080-31-3 |
| CHLOROBENZENE | 108-90-7 |
| CHLOROBENZILATE | 510-15-6 |
| 1-(2-(2-CHLOROETHOXY)PHENYLSULFONYL)-3-(4-METHOXY-6-METHYL-1,3,5--TRIAZIN-2-YL)UREA (IUPAC) | 82097-50-5 |
| CHLOROFORM | 67-66-3 |
| CHLORONEB | 2675-77-6 |
| CHLOROPHACINONE | 3691-35-8 |
| 2-CHLOROPHENOL | 95-57-8 |
| (4-CHLOROPHENOXY)ACETIC ACID | 122-88-3 |
| CHLOROPICRIN | 76-06-2 |
| CHLOROPROPHAM | 101-21-3 |
| CHLOROPROPYLATE | 5836-10-2 |
| CHLOROTHALONIL | 1897-45-6 |
| CHLOROXURON | 1982-47-4 |
| CHLORPYRIFOS | 2921-88-2 |
| CHLORPYRIFOS METHYL | 5598-13-0 |
| CHLORSULFURON | 64902-72-3 |
| CHOLECALCIFEROL | 67-97-0 |
| CHROMIC ACID | 7738-94-5 |
| CHROMIC ACID (H2CR2O7), DISODIUM SALT, DIHYDRATE | 7789-12-0 |
| CHROMIUM TRIOXIDE | 1333-82-0 |
| CITRIC ACID | 77-92-9 |
| CLETHODIM (SELECT HERBACIDE) | 99129-21-2 |
| CLODINAFOP-PROPARGYL | 105512-06-9 |
| CLOFENTEZINE | 74115-24-5 |
| CLOMAZONE (DIMETHAZONE) | 81777-89-1 |
| CLONITRALID | 1420-04-8 |
| CLOPROP (+SALTS) (FRUITONE) | 53404-22-1 |
| CLOPYRALID (LONTREL) | 1702-17-6 |
| CLORANSULAM-METHL (XDE-565) | 147150-35-4 |
| COAL TARS | 8007-45-2 |
| COBALT NAPHTHENATE | 61789-51-3 |
| (COCO ALKYL)DIETHANOLAMIDES | 68603-42-9 |

TABLE 2-continued

List Of Registered Pesticides (Chemical Name)

| | CAS Registry Number (or EDF Substance ID) |
|---|---|
| COCOA FATTY ACIDS, POTASSIUM SALTS | 61789-30-8 |
| COCONUT FATTY ACID, SODIUM SALT | 61789-31-9 |
| COMPOUND 105 | 137-16-6 |
| COPPER | 7440-50-8 |
| COPPER (11)-8- HYDROXYQUINOLINE | 10380-28-6 |
| COPPER (I) CHLORIDE | 7758-89-6 |
| COPPER ARSENATE | 10103-61-4 |
| COPPER CARBONATE (BASIC) | 12069-69-1 |
| COPPER CHLORIDE HYDROXIDE (CU2CL(OH)3) | 1332-65-6 |
| COPPER CHLORIDE HYDROXIDE (CU2CL(OH)3), MIXT. WITH COPPER HYDROXIDE SULFATE (CU4(OH)6(SO4)) | 8012-69-9 |
| COPPER CHLORIDE OXIDE, HYDRATE | 1332-40-7 |
| COPPER NAPHTHENATE | 1338-02-9 |
| COPPER OXIDE | 1317-38-0 |
| COPPER ZINC HYDROXIDE SULFATE | 55072-57-6 |
| COPPER(2), TETRAAMINE- | 16828-95-8 |
| COPPER, BIS(2-AMINOETHANOLATO-N,O)- | 14215-52-2 |
| COPPER, BIS(D-GLUCONATO-O1,O2)- | 527-09-3 |
| COPPER, [[2,2',2''-NITRILOTRIS[ETHANOLATO]](2-)-N,O,O',O'']- | 82027-59-6 |
| COTTON OIL | 8001-29-4 |
| COUMAFURYL (FUMARIN) | 117-52-2 |
| COUMAPHOS | 56-72-4 |
| CREOSOTES | 8001-58-9 |
| CRESOL (MIXED ISOMERS) | 1319-77-3 |
| CROTOXYPHOS | 7700-17-6 |
| CRUDE LIGHT OIL (COAL) | 65996-78-3 |
| CRUFOMATE | 299-86-5 |
| CRYOLITE | 15096-52-3 |
| CUPRIC (II) OXALATE | 814-91-5 |
| CUPRIC ACETOARSENITE | 12002-03-8 |
| CUPRIC HYDROXIDE | 20427-59-2 |
| CUPRIC NITRATE | 3251-23-8 |
| CUPRIC SULFATE | 7758-98-7 |
| CUPRIETHYLENE-DIAMINE SOLUTION | 13426-91-0 |
| CUPROUS OXIDE | 1317-39-1 |
| CUPROUS THIOCYANATE | 1111-67-7 |
| CYANAMIDE | 420-04-2 |
| CYANAZINE | 21725-46-2 |
| CYANURIC ACID | 108-80-5 |
| CYCLANILIDE | 113136-77-9 |
| CYCLOATE | 1134-23-2 |
| CYCLOBUTANEETHANOL, 1-METHYL-2-(1-METHYLETHENYL)-, (1R-CIS)- | 26532-22-9 |
| CYCLOHEXANE | 110-82-7 |
| CYCLOHEXANOL, 5-METHYL-2-(1-METHYLETHYL)- | 1490-04-6 |
| CYCLOHEXANONE | 108-94-1 |
| CYCLOHEXIMIDE | 66-81-9 |
| CYCLOPROPANECARBOXYLIC ACID, 2,2-DIMETHYL-3-(2-METHYL-1-PROPENYL)-, 2-METHYL-4-OXO-3-(2-PROPENYL)-2-CYCLOPENTEN-1-YL ESTER, [1.ALPHA.(S*),3. | 42534-61-2 |
| CYCLOPROPANECARBOXYLIC ACID, 2,2-DIMETHYL-3-(2-METHYL-1-PROPENYL)-, 2-METHYL-4-OXO-3-(2-PROPENYL)-2-CYCLOPENTEN-1-YL ESTER, [1R-[1.ALPHA.(S* | 28434-00-6 |
| CYCLOPROPANECARBOXYLIC ACID, 2,2-DIMETHYL-3-(2-METHYL-1-PROPENYL)-, CYANO(3-PHENOXYPHENYL)METHYL ESTER | 39515-40-7 |
| CYFLUTHRIN | 68359-37-5 |
| CYHALOFOP BUTYL | 122008-85-9 |
| CYHALOTHRIN K | 91465-08-6 |
| CYMOXANIL | 57966-95-7 |
| CYPERMETHRIN | 52315-07-8 |
| CYPRAZINE | 22936-86-3 |
| CYPROCONAZOLE (SAN 619F) | 94361-06-5 |
| CYPRODINIL | 121552-61-2 |
| CYROMAZINE | 66215-27-8 |
| 2,4-D | 94-75-7 |
| 2,4-D 2-ETHYL-4-METHYLPENTYL ESTER | 53404-37-8 |
| 2,4-D 2-ETHYLHEXYL ESTER | 1928-43-4 |
| 2,4-D BUTOXYETHYL ESTER | 1929-73-3 |
| 2,4-D BUTYL ESTER | 94-80-4 |
| 2,4-D PROPYLENE GLYCOL BUTYL ETHER ESTER | 1320-18-9 |
| 2,4-D SODIUM SALT | 2702-72-9 |
| 2,4-D, ISOOCTYL ESTER | 25168-26-7 |
| 2,4-D, ISOPROPYL ESTER | 94-11-1 |
| D-STREPTAMINE, O-2-DEOXY-2-(METHYLAMINO)-.ALPHA.-L-GLUCOPYRANOSYL-(1.FWDARW.2)-O-5-DEOXY-3-C-FORMYL-.ALPHA.-L-LYXOFURANOSYL-(1.FWDARW.4)-N | 298-39-5 |

TABLE 2-continued

List Of Registered Pesticides (Chemical Name)

| | CAS Registry Number (or EDF Substance ID) |
|---|---|
| D-TRANS-ALLETHRIN | 28057-48-9 |
| DAMINOZIDE | 1596-84-5 |
| DASANIT | 115-90-2 |
| DAZOMET | 533-74-4 |
| 2,4-DB | 94-82-6 |
| DDT | 50-29-3 |
| 1-DECANAMINIUM, N,N-DIMETHYL-N-OCTYL-, CHLORIDE | 32426-11-2 |
| 1-DECANAMINIUM, N-DECYL-N-METHYL-N-[3-(TRIMETHOXYSILYL)PROPYL]-, CHLORIDE | 68959-20-6 |
| 1-DECANAMINIUM, N-ISONONYL-N,N-DIMETHYL-, CHLORIDE | 138698-36-9 |
| DECANEDIOIC ACID, CADMIUM SALT (1:1) | 4476-04-4 |
| 1-DECANOL | 112-30-1 |
| 5-DECEN-1-OL, (E)- | 56578-18-8 |
| 5-DECEN-1-OL, ACETATE, (E)- | 38421-90-8 |
| DEET | 134-62-3 |
| DEHYDROABIETYLAMINE ACETATE | 2026-24-6 |
| DEHYDROABIETYLAMINE ETHYLENE OXIDE | 51344-62-8 |
| DELTAMETHRIN (DECA-) | 52918-63-5 |
| DEMETON | 8065-48-3 |
| DENATONIUM BENZOATE | 3734-33-6 |
| DEODORIZER DISTILLATE | 68476-80-2 |
| DESMEDIPHAM | 13684-56-5 |
| DEXTRIN | 9004-53-9 |
| 2,6-DI-TERT-BUTYL-P-CRESOL | 128-37-0 |
| DIACETONE ALCOHOL | 123-42-2 |
| DIALLATE | 2303-16-4 |
| DIAMMONIUM EDTA | 20824-56-0 |
| DIAZINON | 333-41-5 |
| DIBENZOTHIAZINE | 92-84-2 |
| 1,2-DIBROMO-3-CHLOROPROPANE (DBCP) | 96-12-8 |
| 2,2-DIBROMO-3-NITRILOPROPIONAMIDE | 10222-01-2 |
| 1,2-DIBROMOETHANE | 106-93-4 |
| 3,5-DIBROMOSALICYLANILIDE | 2577-72-2 |
| DIBUTYL PHTHALATE | 84-74-2 |
| DICAMBA | 1918-00-9 |
| DICHLOBENIL | 1194-65-6 |
| DICHLOFENTHION | 97-17-6 |
| DICHLONE | 117-80-6 |
| 2,2-DICHLOROPROPIONIC ACID | 75-99-0 |
| DICHLORAN | 99-30-9 |
| DICHLORFLURECOL-METHYL | 21634-96-8 |
| 3,6-DICHLORO-2-PYRIDINECARBOXYLIC ACID, MONOETHANOLAMINE SALT | 57754-85-5 |
| 1,3-DICHLORO-5,5-DIMETHYL-HYDANTOIN | 118-52-5 |
| DICHLOROBENZALKONIUM CHLORIDE | 8023-53-8 |
| 1,2-DICHLOROBENZENE | 95-50-1 |
| 1,4-DICHLOROBENZENE | 106-46-7 |
| (3,4-DICHLOROBENZYL)DODECYLDIMETHYLAMMONIUM CHLORIDE | 102-30-7 |
| DICHLORODIFLUOROMETHANE | 75-71-8 |
| 1,2-DICHLOROETHANE | 107-06-2 |
| DICHLOROISOCYANURIC ACID | 2782-57-2 |
| DICHLOROMETHANE | 75-09-2 |
| DICHLOROPHENE | 97-23-4 |
| 1,2-DICHLOROPROPANE | 78-87-5 |
| 2,3-DICHLOROPROPENE | 78-88-6 |
| 1,3-DICHLOROPROPENE (MIXED ISOMERS) | 542-75-6 |
| DICHLORVOS | 62-73-7 |
| DICLOFOP METHYL | 51338-27-3 |
| DICLOSULAM | 145701-21-9 |
| DICOFOL | 115-32-2 |
| DIDECYLDIMETHYLAMMONIUM CHLORIDE | 7173-51-5 |
| DIELDRIN | 60-57-1 |
| DIENOCHLOR | 2227-17-0 |
| DIETHATYL ETHYL | 38727-55-8 |
| DIETHYLENE GLYCOL MONOMETHYL ETHER | 111-77-3 |
| DIFENOCONAZOLE (DIVIDEND) | 119446-68-3 |
| DIFETHIALONE | 104653-34-1 |
| DIFLUBENZURON | 35367-38-5 |
| DIFLUFENZOPYR | 109293-97-2 |
| DIFLUFENZOPYR-SODIUM | 109293-98-3 |
| 1,2-DIHYDRO-2,2,4-TRIMETHYL-6-ETHOXYQUINOLINE | 91-53-2 |
| (+-)-2-(4,5-DIHYDRO-4-METHYL-4(1-METHYLETHYL)-5-OXO-1H-IMIDAZOL-2-YL)-5-ETHYL-3-PYRIDINECARBOXYLIC ACID | 81335-77-5 |
| 2-(4,5-DIHYDRO-4-METHYL-4-(1-METHYLETHYL)-5-OXO-1H-IMIDAZOL-2-YL)- -3-QUINOLINECARBOXYLIC ACID | 81335-37-7 |

TABLE 2-continued

List Of Registered Pesticides (Chemical Name)

| Chemical Name | CAS Registry Number (or EDF Substance ID) |
|---|---|
| 2,2'-DIHYDROXY-3,3'-DIMETHYL-5,5'-DICHLORODIPHENYL SULFIDE | 4418-66-0 |
| DIISOBUTYL KETONE;2,6-DIMETHYL-4-HEPTONE | 108-83-8 |
| DIMETHAMETRYN | 22936-75-0 |
| DIMETHENAMID (SAN 582H) | 87674-68-8 |
| DIMETHIPIN | 55290-64-7 |
| DIMETHOATE | 60-51-5 |
| DIMETHOMORPH | 110488-70-5 |
| DIMETHOXANE | 828-00-2 |
| 2,6-DIMETHOXY-N-(3-(1-ETHYL-1-METHYLPROPYL)-5-ISOXAZOLYL)BENZAMID- E | 82558-50-7 |
| DIMETHRIN | 70-38-2 |
| DIMETHYL PHTHALATE | 131-11-3 |
| DIMETHYL TETRACHLOROTEREPHTHALATE | 1861-32-1 |
| 2,6-DIMETHYL-2-OCTEN-8-OL | 106-22-9 |
| 1,2-DIMETHYL-3,5-DIPHENYL-1-H-PYRAZOLIUM METHYL SULFATE | 43222-48-6 |
| DIMETHYLAMINE DICAMBA | 2300-66-5 |
| 1,1-DIMETHYLETHYL HYDROPEROXIDE | 75-91-2 |
| DIMETHYLNAPHTHALENE | 28804-88-8 |
| DIMETHYLOXAZOLIDINE, 4,4- | 51200-87-4 |
| 2,4-DIMETHYLPHENOL | 105-67-9 |
| DIMETILAN | 644-64-4 |
| DINITRAMINE | 29091-05-2 |
| 1,3-DINITRO-4-CHLOROBENZENE | 97-00-7 |
| 2,6-DINITRO-N,N-DIPROPYL-4-ISOPROPYLANILINE | 33820-53-0 |
| 4,6-DINITRO-O-CRESOL | 534-52-1 |
| DINITROBUTYL PHENOL | 88-85-7 |
| 2,4-DINITROPHENOL | 51-28-5 |
| DINOCAP | 39300-45-3 |
| DINOSEB, AMMONIUM SALT | 6365-83-9 |
| 1,3,2-DIOXABORINANE, 2,2'-OXYBIS[4,4,6-TRIMETHYL- | 14697-50-8 |
| 1,3,2-DIOXABORINANE, 2,2'-[(1-METHYL-1,3-PROPANEDIYL)BIS(OXY)]BIS[4-METHYL- | 2665-13-6 |
| DIPENTENE | 138-86-3 |
| DIPHACINONE | 82-66-6 |
| DIPHENAMID | 957-51-7 |
| DIPHENYLAMINE | 122-39-4 |
| DIPHENYLSTIBINE 2-ETHYLHEXOATE | 5035-58-5 |
| DIPOTASSIUM ENDOTHALL | 2164-07-0 |
| DIPROPETRYN | 4147-51-7 |
| DIPROPYL ISOCINCHOMERONATE | 136-45-8 |
| DIPROPYLENE GLYCOL | 25265-71-8 |
| DIPROPYLENE GLYCOL MONOMETHYL ETHER | 34590-94-8 |
| DISODIUM CYANODITHIOIMIDOCARBONATE | 138-93-2 |
| DISODIUM METHANEARSONATE | 144-21-8 |
| DISODIUM PHOSPHATE | 7558-79-4 |
| DISTILLATES (PETROLEUM), HYDROTREATED (MILD) HEAVY PARAFFINIC (9C1) | 64742-54-7 |
| DISTILLATES (PETROLEUM), HYDROTREATED (MILD) LIGHT PARAFFINIC (9C1) | 64742-55-8 |
| DISTILLATES (PETROLEUM), SOLVENT-REFINED (MILD) HEAVY PARAFFINIC (9C1) | 64741-88-4 |
| DISTILLATES (PETROLEUM), SOLVENT-REFINED (MILD) LIGHT NAPHTHENIC (9C1) | 64741-97-5 |
| DISTILLATES (PETROLEUM), SOLVENT-REFINED (MILD) LIGHT PARAFFINIC (9C1) | 64741-89-5 |
| DISTILLATES, PETROLEUM, C12-30-AROM. | 68602-80-2 |
| DISTILLATES, WOOD TAR | 91995-59-4 |
| DISULFOTON | 298-04-4 |
| DITALIMFOS | 5131-24-8 |
| DITHIANON | 3347-22-6 |
| DITHIOPYR (MON 7200) | 97886-45-8 |
| DIURON | 330-54-1 |
| DMPA (ZYTRON) | 299-85-4 |
| 8,10-DODECADIEN-1-OL, (E,E)- | 33956-49-9 |
| 2,4-DODECADIENOIC ACID, 11-METHOXY-3,7,11-TRIMETHYL-, 1-METHYLETHYL ESTER, [S-(E,E)]- | 65733-16-6 |
| 2,4-DODECADIENOIC ACID, 3,7,11-TRIMETHYL-, 2-PROPYNYL ESTER,[S-(E,E)]- | 65733-20-2 |
| 2,4-DODECADIENOIC ACID, 3,7,11-TRIMETHYL-, ETHYL ESTER, [S-(E,E)]- | 65733-18-8 |
| 1-DODECANAMINIUM, N,N,N-TRIMETHYL-, CHLORIDE | 112-00-5 |
| 1-DODECANAMINIUM, N,N-DIMETHYL-N-OCTYL-, CHLORIDE | 10361-16-7 |
| DODECANOIC ACID, POTASSIUM SALT | 10124-65-9 |
| 1-DODECANOL | 112-53-8 |
| 2,6,10-DODECATRIEN-1-OL, 3,7,11-TRIMETHYL- | 4602-84-0 |
| 1,6,10-DODECATRIEN-3-OL, 3,7,11-TRIMETHYL- | 7212-44-4 |
| 8-DODECEN-1-OL, (Z)- | 40642-40-8 |
| DODECYL GUANIDINE HYDROCHLORIDE | 13590-97-1 |
| DODECYLBENZENESULFONIC ACID | 27176-87-0 |
| DODINE | 2439-10-3 |
| 2,4-DP | 120-36-5 |
| DPX-M 6316 | 79277-27-3 |

TABLE 2-continued

List Of Registered Pesticides (Chemical Name)

| | CAS Registry Number (or EDF Substance ID) |
|---|---|
| (E)-3,7-DIMETHYL-2,6-OCTADIEN-1-OL | 106-24-1 |
| (E,E)-2,4-HEXADIENOIC ACID | 110-44-1 |
| E-8-DODECENYL ACETATE | 38363-29-0 |
| EDETATE SODIUM | 64-02-8 |
| EDETATE TRISODIUM | 150-38-9 |
| EMAMECTIN | 137512-74-4 |
| ENDOSULFAN | 115-29-7 |
| ENDOTHALL | 145-73-3 |
| ENDRIN | 72-20-8 |
| ENQUIK | 21351-39-3 |
| EPICHLOROHYDRIN | 106-89-8 |
| EPN | 2104-64-5 |
| ERBON | 136-25-4 |
| ESFENVALERATE | 66230-04-4 |
| ETHALFLURALIN | 55283-68-6 |
| ETHAMETSULFURON | 97780-06-8 |
| ETHANAMINE, 2-DECYLTHIO-, HYDROCHLORIDE | 36362-09-1 |
| ETHANOL | 64-17-5 |
| ETHANOL, 2-(3,3-DIMETHYLCYCLOHEXYLIDENE)-, (Z)- | 26532-23-0 |
| ETHANOL, 2-(HYDROXYMETHYLAMINO)- | 34375-28-5 |
| ETHEPHON | 16672-87-0 |
| ETHIOLATE | 2941-55-1 |
| ETHION | 563-12-2 |
| ETHOFENPROX (ETOFENPROX) | 80844-07-1 |
| ETHOFUMESATE | 26225-79-6 |
| ETHOPROP | 13194-48-4 |
| ETHYL ACETATE | 141-78-6 |
| ETHYL DIPROPYLTHIOCARBAMATE | 759-94-4 |
| ETHYL FORMATE | 109-94-4 |
| ETHYLENE | 74-85-1 |
| ETHYLENE GLYCOL | 107-21-1 |
| ETHYLENE GLYCOL MONOBUTYL ETHER | 111-76-2 |
| ETHYLENE GLYCOL MONOMETHYL ETHER | 109-86-4 |
| ETHYLENE OXIDE | 75-21-8 |
| ETHYLENE THIOUREA | 96-45-7 |
| ETHYLENEDIAMINE | 107-15-3 |
| ETHYLENEDIAMINE TETRAACETIC ACID (EDTA) | 60-00-4 |
| ETHYLENEDIAMINETETRAACETIC ACID, TRIPOTASSIUM SALT | 17572-97-3 |
| (ETHYLENEDINITRILO)-TETRAACETIC ACID DISODIUM SALT | 139-33-3 |
| EUGENOL | 97-53-0 |
| FAMPHUR | 52-85-7 |
| FENAMINOSULF (DIAZOBEN) | 140-56-7 |
| FENAMIPHOS | 22224-92-6 |
| FENARIMOL | 60168-88-9 |
| FENBUCONAZOLE (FENETHANIL) | 114369-43-6 |
| FENBUTATIN OXIDE | 13356-08-6 |
| FENHEXAMID | 126833-17-8 |
| FENITROTHION | 122-14-5 |
| FENOXAPROP ETHYL(2-(4-((6-CHLORO-2-BENZOXAZOLYEN)OXY)PENOXY)PROPANIC ACID, ETHYL ESTER) | 66441-23-4 |
| FENOXYCARB | 72490-01-8 |
| FENPROPATHRIN | 39515-41-8 |
| FENPRYROXIMATE | 134098-61-6 |
| FENRIDAZON | 83588-43-6 |
| FENTHION | 55-38-9 |
| FENTICHLOR | 97-24-5 |
| FENURON-TCA | 4482-55-7 |
| FENVALERATE | 51630-58-1 |
| FERBAM | 14484-64-1 |
| FERRIC SULFATE | 10028-22-5 |
| FERROUS AMMONIUM SULFATE | 10045-89-3 |
| FIPRONIL | 120068-37-3 |
| FLUAZIFOP-BUTYL | 69806-50-4 |
| FLUAZINAM | 79622-59-6 |
| FLUCARBAZONE SODIUM | 181274-17-9 |
| FLUCHLORALIN | 33245-39-5 |
| FLUCYTHRINATE | 70124-77-5 |
| FLUDIOXONIL (MAXIM) | 131341-86-1 |
| FLUMETRALIN | 62924-70-3 |
| FLUMETSULAM (XRD-498) | 98967-40-9 |
| FLUMICLORAC PENTYL | 87546-18-7 |
| FLUMIOXAZIN | 103361-09-7 |
| FLUOMETURON | 2164-17-2 |
| FLUOROACETAMIDE | 640-19-7 |

TABLE 2-continued

List Of Registered Pesticides (Chemical Name)

| | CAS Registry Number (or EDF Substance ID) |
|---|---|
| FLUOROACETIC ACID, SODIUM SALT | 62-74-8 |
| FLUORODIFEN | 15457-05-3 |
| FLUROXYPYR 1-METHYLHEPTYL ESTER | 81406-37-3 |
| FLUTHIACET-METHYL (ACTION) | 117337-19-6 |
| FLUVALINATE | 69409-94-5 |
| FLUVALINATE, TAU- | 102851-06-9 |
| FOLPET | 133-07-3 |
| FOMESAFEN | 72178-02-0 |
| FOMESAFEN SODIUM (FLEX) | 108731-70-0 |
| FONOFOS | 944-22-9 |
| FORAMSULFURON | 173159-57-4 |
| FORMALDEHYDE | 50-00-0 |
| FORMETANATE HYDROCHLORIDE | 23422-53-9 |
| FORMIC ACID | 64-18-6 |
| FOSAMINE AMMONIUM | 25954-13-6 |
| FOSETYL AL | 39148-24-8 |
| FOSTHIAZATE | 98886-44-3 |
| FOSTHIETAN | 21548-32-3 |
| FUMARIC ACID | 110-17-8 |
| GAMMA-LINDANE | 58-89-9 |
| GASOLINE | 8006-61-9 |
| GIBB-3-ENE-1,10-DICARBOXYLIC ACID, 2,4A,7-TRIHYDROXY-1-METHYL-8-METHYLENE-, 1,4A-LACTONE, MONOPOTASSIUM SALT, (1.ALPHA.,2.BETA.,4A.ALPHA.,4B | 125-67-7 |
| GIBB-3-ENE-1,10-DICARBOXYLIC ACID, 2,4A-DIHYDROXY-1-METHYL-8-METHYLENE-1,4A-LACTONE MIXT. WITH GIBBANE-1,10-DICARBOXYLIC ACID, 2,4A-DIHYDRO | 8030-53-3 |
| GIBBERELLIC ACID | 77-06-5 |
| GLUTARALDHYDE | 111-30-8 |
| GLYCERIN MIST | 56-81-5 |
| GLYCINE, N,N'-1,2-ETHANEDIYLBIS[N-(CARBOXYMETHYL)-, TETRAPOTASSIUM SALT | 5964-35-2 |
| GLYCINE, N-(HYDROXYMETHYL)-, MONOSODIUM SALT | 70161-44-3 |
| GLYCINE, N-(PHOSPHINOMETHYL)-, AMMONIUM SALT | 114370-14-8 |
| GLYCINE, N-(PHOSPHONOMETHYL)-, COMPD. WITH 2-PROPANAMINE (1:1) | 38641-94-0 |
| GLYCINE, N-(PHOSPHONOMETHYL)-, SODIUM SALT (2:3) | 70393-85-0 |
| GLYCOLIC ACID | 79-14-1 |
| GLYCOLS, POLYETHYLENE, MONO(HYDROGEN SULFATE), DODECYL ETHER, SODIUM SALT | 9004-82-4 |
| GLYODIN | 556-22-9 |
| GLYPHOSATE | 1071-83-6 |
| GLYPHOSATE TRIMESIUM | 81591-81-3 |
| GLYPHOSINE | 2439-99-8 |
| 15H | 9003-29-6 |
| 2(3H)-BENZOTHIAZOLETHIONE, SODIUM SALT | 2492-26-4 |
| 2(3H)-BENZOTHIAZOLETHIONE, ZINC SALT | 155-04-4 |
| 2(3H)-FURANONE, 5-(1-DECENYL)DIHYDRO-, [R-(Z)]- | 64726-91-6 |
| 2(3H)-FURANONE, 5-HEPTYLDIHYDRO- | 104-67-6 |
| 2(3H)-FURANONE, DIHYDRO-5-PENTYL- | 104-61-0 |
| 3(2H)-ISOTHIAZOLONE, 4,5-DICHLORO-2-OCTYL- | 64359-81-5 |
| 1H,3H,5H-OXAZOLO[3,4-C]OXAZOLE, 7A-ETHYLDIHYDRO- | 7747-35-5 |
| 1H,3H,5H-OXAZOLO[3,4-C]OXAZOLE-7A(7H)-METHANOL | 6542-37-6 |
| 1H,7H-NAPHTHO[1,8-BC:4,4A-C']DIFURAN-5,10A(8H)-DICARBOXYLIC ACID, 10-(ACETYLOXY)-4-(HEXAHYDRO-6A-HYDROXY-7A-METHYL-2,7-METHANOFURO[2,3-B] . . . | 108189-58-8 |
| 3H-1,2-DITHIOL-3-ONE, 4,5-DICHLORO- | 1192-52-5 |
| 2H-1,3-THIAZINE, TETRAHYDRO-2-(NITROMETHYLENE)- | 58842-20-9 |
| 1H-2,1,3-BENZOTHIADIAZIN-4(3H)-ONE, 3-(1-METHYLETHYL)-, 2,2-DIOXIDE, SODIUM SALT | 50723-80-3 |
| 1H-INDENE-1,3(2H)-DIONE, 2-(2,2-DIMETHYL-1-OXOPROPYL)-, ION(1−), SODIUM | 6120-20-3 |
| 1H-INDENE-1,3(2H)-DIONE, 2-(DIPHENYLACETYL)-, ION(1−), SODIUM | 42721-99-3 |
| 1H-INDOLE | 120-72-9 |
| 1H-INDOLE-3-BUTANETHIOIC ACID, S-PHENYL ESTER | 85977-73-7 |
| HAIMASED | 540-72-7 |
| HALOFENOZIDE | 112226-61-6 |
| HALOSULFURON METHYL | 100784-20-1 |
| HEAVY ALKYLATE HYDROCARBONS | 68919-17-5 |
| HEPTACHLOR | 76-44-8 |
| 1-HEPTADECANECARBOXYLIC ACID | 57-11-4 |
| HEPTANOIC ACID, 2,6-DIBROMO-4-CYANOPHENYL ESTER | 56634-95-8 |
| HEXACHLOROBENZENE | 118-74-1 |
| 1,2,3,4,5,6-HEXACHLOROCYCLOHEXANE (MIXTURE OF ISOMERS) | 608-73-1 |
| HEXACHLOROCYCLOPENTADIENE | 77-47-4 |
| HEXACHLOROPHENE (HCP) | 70-30-4 |

TABLE 2-continued

List Of Registered Pesticides (Chemical Name)

| | CAS Registry Number (or EDF Substance ID) |
|---|---|
| 7,11-HEXADECADIEN-1-OL, ACETATE | 50933-33-0 |
| 7,11-HEXADECADIEN-1-OL, ACETATE, (E,Z)- | 53042-79-8 |
| 7,11-HEXADECADIEN-1-OL, ACETATE, (Z,Z)- | 52207-99-5 |
| 1-HEXADECANOL | 36653-82-4 |
| 11-HEXADECENAL, (Z)- | 53939-28-9 |
| 2,4-HEXADIENOIC ACID, POTASSIUM SALT, (2E,4E)- | 24634-61-5 |
| 1,3-HEXANEDIOL, 2-ETHYL- | 94-96-2 |
| 1-HEXANOL | 111-27-3 |
| 1-HEXANOL, 2-ETHYL- | 104-76-7 |
| HEXAZINONE | 51235-04-2 |
| HEXYLENE GLYCOL | 107-41-5 |
| #2 HOME HEATING OILS | 68476-30-2 |
| HYDANTOIN, 3-BROMO-1-CHLORO-5,5-DIMETHYL- | 126-06-7 |
| HYDRAMETHYLNON | 67485-29-4 |
| HYDRIODIC ACID | 10034-85-2 |
| HYDROCARBONS | 68920-06-9 |
| HYDROCHLORIC ACID | 7647-01-0 |
| HYDROFLUORIC ACID | 7664-39-3 |
| HYDROGEN CYANIDE | 74-90-8 |
| HYDROGEN PEROXIDE (CONC > 52%) | 7722-84-1 |
| (HYDROLYSIS PRODUCTS OF SULFATED CASTOR OIL), SODIUM SALTS | 68187-76-8 |
| HYDROPRENE (ALTOZAR) | 41096-46-2 |
| 1-HYDROXY-4-TERT-BUTYLBENZENE | 98-54-4 |
| 4-HYDROXY-BUTYL ESTER BENZOIC ACID | 94-26-8 |
| 2-HYDROXYBENZOIC ACID | 69-72-7 |
| 1-(2-HYDROXYETHYL)-2-(TALL OIL ALKYL)-2-IMIDAZOLINE | 61791-39-7 |
| HYDROXYLETHYL OCTYL SULFIDE | 3547-33-9 |
| 1-(HYDROXYMETHYL)-5,5-DIMETHYL HYDANTOIN | 116-25-6 |
| 2-HYDROXYNAPHTHALENE | 135-19-3 |
| 1-HYDROXYOCTANE | 111-87-5 |
| 1-(4-HYDROXYPHENYL)-2-BROMOETHANONE | 2491-38-5 |
| 1-(2-HYDRPXYETHYL)-2-HEPTADECYLIMIDAZOLINE | 27136-73-8 |
| HYMEXAZOL (TACHIGAREN) | 10004-44-1 |
| HYPOCHLORITE | 7778-66-7 |
| HYPOCHLOROUS ACID | 7790-92-3 |
| IMAZALIL | 35554-44-0 |
| IMAZAMETHABENZ | 81405-85-8 |
| IMAZAPYR (ARSENAL) | 81334-34-1 |
| IMIDACLOPRID | 105827-78-9 |
| IMIDAN | 732-11-6 |
| 2,4-IMIDAZOLIDINEDIONE, 1,3-BIS(HYDROXYMETHYL)-5,5-DIMETHYL- | 6440-58-0 |
| 2,4-IMIDAZOLIDINEDIONE, 1,3-DIBROMO-5,5-DIMETHYL- | 77-48-5 |
| 2,4-IMIDAZOLIDINEDIONE, 1,3-DICHLORO-5-ETHYL-5-METHYL- | 89415-87-2 |
| 2,4-IMIDAZOLIDINEDIONE, 1-BROMO-3-CHLORO-5,5-DIMETHYL- | 16079-88-2 |
| 2,2'-IMINOBISETHANOL N-COCO ALKYL DERIVS. | 61791-31-9 |
| INDOLE-3-BUTYRIC ACID | 133-32-4 |
| INDOXACARB (DPX-MP062) | 173584-44-6 |
| IODINE | 7553-56-2 |
| 3-IODO-2-PROPYNYL BUTYLCARBAMATE | 55406-53-6 |
| IPRODIONE | 36734-19-7 |
| ISOFENPHOS | 25311-71-1 |
| ISOPROPYL ACETATE | 108-21-4 |
| ISOPROPYL ALCOHOL | 67-63-0 |
| KAOLIN | 1332-58-7 |
| KBR 3023 (PROPIDINE) | 119515-38-7 |
| KEROSENE | 8008-20-6 |
| KINETIN | 525-79-1 |
| KINOXIFEN | 124495-18-7 |
| 5-KLOR-2-METYL-4-ISOTIAZOLIN-3-ON OCH 2-METYL-4-ISOTIAZOLIN-3-ON (I FÖRHÅLLANDE 3:1) > 15 PPM | 26172-55-4 |
| KRESOXIM-METHYL | 143390-89-0 |
| LACTOFEN | 77501-63-4 |
| LAURYL DIMETHYL BENZYL AMMONIUM CHLORIDE | 139-07-1 |
| LEAD ACETATE | 301-04-2 |
| LEAD ARSENATE | 7784-40-9 |
| LETHANE | 112-56-1 |
| LINURON | 330-55-2 |
| LITHIUM HYPOCHLORITE | 13840-33-0 |
| LITHIUM PERFLUOROOCTANE SULFONATE | 29457-72-5 |
| LURSECT | 51609-52-0 |
| M-CRESOL | 108-39-4 |
| MAGNESIUM CHLORIDE | 7786-30-3 |
| MAGNESIUM PHOSPHIDE | 12057-74-8 |
| MAGNESIUM SULFATE | 7487-88-9 |

TABLE 2-continued

List Of Registered Pesticides (Chemical Name)

| | CAS Registry Number (or EDF Substance ID) |
|---|---|
| MALATHION | 121-75-5 |
| MANCOZEB | 8018-01-7 |
| MANEB | 12427-38-2 |
| MANGANESEDIMETHYLDITHIOCARBAMATE | 15339-36-3 |
| MEDIUM STEAM CRACKED AROMATIC NAPHTHA (PETROLEUM) | 68516-20-1 |
| MEFENOXAM TECHNICAL | 70630-17-0 |
| MEFLUIDINE DIETHANOLAMINE | 53780-36-2 |
| 1-MENTHENE-8-OL | 98-55-5 |
| MEPIQUAT CHLORIDE | 24307-26-4 |
| 2-MERCAPTOBENZOTHIAZOLE | 149-30-4 |
| MERCAPTODIMETHUR | 2032-65-7 |
| MERCURY CHLORIDE (2) | 7487-94-7 |
| MERCURY(1+), [2,2',2''-NITRILOTRIS[ETHANOL]-N,O,O',O'']PHENYL-, SALT WITH 2-HYDROXYPROPANOIC ACID (1:1) | 23319-66-6 |
| MERCURY, (2-ETHYLHEXANOATO)PHENYL- | 13302-00-6 |
| MERCURY, (2-HYDROXYPROPANOATO)PHENYL- | 122-64-5 |
| MERCURY, (9-OCTADECENOATO-O)PHENYL-, (Z)- | 104-60-9 |
| MERCURY, (NITRATO-O)PHENYL- | 55-68-5 |
| MERCURY, DIPHENYL)[.MU.-[(TETRAPROPENYL)BUTANEDIOATO(2-)-O:O']]DI- | 27236-65-3 |
| MERCURY, PHENYL(8-QUINOLINOLATO-N1,O8)- | 14354-56-4 |
| MERCURY, [.MU.-[ORTHOBORATO(2-)-O:O']]DIPHENYLDI- | 6273-99-0 |
| MERPHOS | 150-50-5 |
| MESOTRIONE | 104206-82-8 |
| 2-MESYL-2-METHYLPROPIONALDEHYDE O-METHYLCARBAMOYLOXIME | 1646-88-4 |
| METACETALDEHYDE | 108-62-3 |
| METALAXYL | 57837-19-1 |
| METALDEHYDE | 9002-91-9 |
| METARHIZIUM ANISOPLIAE ESF1 | 67892-13-1 |
| METHAM SODIUM | 137-42-8 |
| METHAMIDOPHOS | 10265-92-6 |
| METHANESULFONIC ACID, THIO-, O-(2-HYDROXYPROPYL) ESTER | 30388-01-3 |
| METHANIMIDAMIDE, N'-(4-CHLORO-2-METHYLPHENYL)-N,N-DIMETHYL-, MONOHYDROCHLORIDE | 19750-95-9 |
| METHANOL | 67-56-1 |
| METHANOL, (1H,3H,5H-OXAZOLO[3,4-C]OXAZOL-7A(7H)-YLMETHOXY)- | 59720-42-2 |
| METHANOL, [[[1-METHYL-2-(5-METHYL-3-OXAZOLIDINYL)ETHYOXY]METHOXY]METHOXY]- | 97553-90-7 |
| METHANONE, (5-CYCLOPROPYL-4-ISOXAZOLYL)[2-(METHYLSULFONYL)-4-(TRIFLUOROMETHYL)PHENYL]- | 141112-29-0 |
| METHAZOLE | 20354-26-1 |
| METHIDATHION | 950-37-8 |
| METHOMYL | 16752-77-5 |
| METHOPRENE | 40596-69-8 |
| METHOXONE | 94-74-6 |
| METHOXONE SODIUM SALT ((4-CHLORO-2-METHYLPGENOXY) ACETATE SODIUM SALT) | 3653-48-3 |
| 1-(2-METHOXY-1-METHYLETHOXY)-2-PROPANOL | 20324-32-7 |
| 1-METHOXY-4-(1-PROPENYL)BENZENE | 104-46-1 |
| 2-(((((4-METHOXY-6-METHYL-1,3,5-TRIAZIN-2YL)AMINO)CARBONYL)AMINO)-SULFONYL)BENZOIC ACID METHYL ESTER | 74223-64-6 |
| 2-(METHOXYCARBONYL)ANILINE | 134-20-3 |
| 4-(METHOXYCARBONYL)PHENOL | 99-76-3 |
| METHOXYCHLOR | 72-43-5 |
| METHOXYFENOZIDE | 161050-58-4 |
| METHYL BROMIDE | 74-83-9 |
| METHYL DEMETON | 8022-00-2 |
| METHYL ISOBUTYL KETONE | 108-10-1 |
| METHYL ISOTHIOCYANATE | 556-61-6 |
| METHYL NAPHTHALENE | 1321-94-4 |
| METHYL NONYL KETONE | 112-12-9 |
| METHYL PARATHION | 298-00-0 |
| 2-(METHYL(1-OXO-9-OCTADECENYL)AMINO)ETHANESULFONIC ACID, SODIUM SALT | 137-20-2 |
| METHYL-2,3,5,6-TETRACHLORO-4-PYRIDYLSULPHON E | 13108-52-6 |
| 2-METHYL-2-PROPENOIC ACID, DODECYL ESTER | 142-90-5 |
| 1-METHYL-3-PHENYL-5-(3-(TRIFLUOROMETHYL)PHENYL)-4(1H)-PYRIDINONE | 59756-60-4 |
| METHYL-4-ISOTHIAZOLIN | 2682-20-4 |
| 4-METHYLBENZENESULFONIC ACID | 104-15-4 |
| METHYLENE BLUE | 61-73-4 |
| METHYLENEBISTHIOCYANAT | 6317-18-6 |
| 1-METHYLETHYL TETRADECANOATE | 110-27-0 |
| 2-METHYLPROPANOIC ACID | 79-31-2 |
| METIRAM | 9006-42-2 |
| METOBROMURON | 3060-89-7 |

TABLE 2-continued

List Of Registered Pesticides (Chemical Name)

| | CAS Registry Number (or EDF Substance ID) |
|---|---|
| METOLACHLOR | 51218-45-2 |
| METRIBUZIN | 21087-64-9 |
| METRONIDAZOLE | 443-48-1 |
| MEVINPHOS | 7786-34-7 |
| MEXACARBATE | 315-18-4 |
| MGK-264 | 113-48-4 |
| MINERAL OIL SULFONIC ACIDS, SODIUM SALTS | 68608-26-4 |
| MIREX | 2385-85-5 |
| MITIN FF | 3567-25-7 |
| MOLINATE | 2212-67-1 |
| MON 21200 (GENESIS) | 82697-71-0 |
| MONURON | 150-68-5 |
| MONURON TCA (UROX) | 140-41-0 |
| MORPHOLINE | 110-91-8 |
| MORPHOLINE, 4,4'-(2-ETHYL-2-NITRO-1,3-PROPANEDIYL)BIS- | 1854-23-5 |
| MORPHOLINE, 4-(2-NITROBUTYL)- | 2224-44-4 |
| MORPHOLINE, 4-CYCLODODECYL-2,6-DIMETHYL-, ACETATE | 31717-87-0 |
| MSMA | 2163-80-6 |
| MUSCALURE | 27519-02-4 |
| MYCLOBUTANIL | 88671-89-0 |
| MYRISTYL ALCOHOL | 112-72-1 |
| N,N-DIMETHYL-N-(3-(TRIMETHOXYSILYL)PROPYL)-1-OCTADECANAMINIUM CHLORIDE | 27668-52-6 |
| N-(2-(BISCARBOXYMETHYLAMINO)ETHYL)-N-(2-HYDROXYETHYL)GLYCINE TRISODIUM SALT | 139-89-9 |
| N-ALKYL (5% C5-18, 61% C12, 23% C14, 11% C16) DIMETHYL BENZYL AMMONIUM CHLORIDE | 63449-41-2 |
| N-ALKYL DIMETHYLETHYLBENZYL AMMONIUM CHLORIDE | 68956-79-6 |
| N-METHYL NEODECANAMIDE (MNDA) | 105726-67-8 |
| N-METHYLOL CHLOROACETAMIDE | 2832-19-1 |
| N-PROPYL ALCOHOL | 71-23-8 |
| NABAM | 142-59-6 |
| NALED | 300-76-5 |
| NAPHTHALENE | 91-20-3 |
| NAPHTHALENE, 1,4-DIMETHYL- | 571-58-4 |
| 1-NAPHTHALENEACETAMIDE | 86-86-2 |
| 1-NAPHTHALENEACETIC ACID | 86-87-3 |
| 1-NAPHTHALENEACETIC ACID, AMMONIUM SALT | 25545-89-5 |
| 1-NAPHTHALENEACETIC ACID, ETHYL ESTER | 2122-70-5 |
| 1-NAPHTHALENEACETIC ACID, POTASSIUM SALT | 15165-79-4 |
| 1-NAPHTHALENEACETIC ACID, SODIUM SALT | 61-31-4 |
| NAPHTHO[2,3-D]-1,3-DIOXOLE-5,6-DICARBOXYLIC ACID, 5,6,7,8-TETRAHYDRO-7-METHYL-, DIPROPYL ESTER | 83-59-0 |
| 2-NAPHTHYLOXACETIC ACID | 120-23-0 |
| NAPROPAMIDE | 15299-99-7 |
| NAPTALAM (ALANAP-1) | 132-66-1 |
| NAPTALAM, SODIUM SALT | 132-67-2 |
| NATRIUMTETRABORAT ANHYDRID | 1330-43-4 |
| NEBURON | 555-37-3 |
| NEOMYCIN SULFATE | 1405-10-3 |
| NICKEL (NICKEL SULFATE HEXAHYDRATE) | 10101-97-0 |
| NICOSULFURON (ACCENT) | 111991-09-4 |
| NICOTINE AND SALTS | 54-11-5 |
| NICOTINE SULFATE | 65-30-5 |
| NITRALIN | 4726-14-1 |
| NITRAPYRIN | 1929-82-4 |
| 1,1',1''-NITRILOTRI-2-PROPANOL | 122-20-3 |
| NITROBENZENE | 98-95-3 |
| NITROFEN | 1836-75-5 |
| NITROGEN | 7727-37-9 |
| 4-NITROPHENOL | 100-02-7 |
| 4-NITROPHENOL SODIUM SALT | 824-78-2 |
| NONANOIC ACID, SULFOPHENYL ESTER, SODIUM SALT | 91125-43-8 |
| 2-(2-(2-(2-(NONYLPHENOXY)ETHOXY)ETHOXY)ETHOXY)ETHANOL | 9016-45-9 |
| NONYLPHENOXYPOLYETHOXYETHANOL - IODINE COMPLEX | 35860-86-7 |
| NOREA (NORURON) | 18530-56-8 |
| NORFLURAZON | 27314-13-2 |
| NOVALURON | 116714-46-6 |
| O-PHENYLPHENATE, SODIUM | 132-27-4 |
| 9-OCTADECEN-1-AMINIUM, N-ETHYL-N,N-DIMETHYL-, BROMIDE | 6458-13-5 |
| 9-OCTADECENOIC ACID (Z)-, COMPD. WITH 2,2',2''-NITRILOTRIS[ETHANOL](1:1) | 2717-15-9 |
| 9-OCTADECENOIC ACID (Z)-, COPPER SALT (2+) | 1120-44-1 |
| 9-OCTADECENOIC ACID (Z)-, SULFONATED, SODIUM SALTS | 68443-05-0 |
| 1,6-OCTADIEN-3-OL, 3,7-DIMETHYL- | 78-70-6 |

TABLE 2-continued

List Of Registered Pesticides (Chemical Name)

| | CAS Registry Number (or EDF Substance ID) |
|---|---|
| 1,6-OCTADIENE, 7-METHYL-3-METHYLENE- | 123-35-3 |
| 1-OCTANAMINIUM, N,N-DIMETHYL-N-OCTYL-, CHLORIDE | 5538-94-3 |
| 1-OCTANECARBOXYIC ACID | 112-05-0 |
| OCTANOIC ACID, COPPER SALT | 20543-04-8 |
| 1-OCTEN-3-OL | 3391-86-4 |
| OCTHILINONE | 26530-20-1 |
| OIL MIST, MINERAL | 8012-95-1 |
| OIL OF BLACK PEPPER | 8006-82-4 |
| OIL OF CITRONELLA | 8000-29-1 |
| OIL OF LEMONGRASS | 8007-02-1 |
| OILS, EUCALYPTUS | 8000-48-4 |
| OLEIC ACID | 112-80-1 |
| OLEIC ACID POTASSIUM SALT | 143-18-0 |
| ORTHO-BENZYL-P-CHLOROPHENOL | 120-32-1 |
| ORYZALIN | 19044-88-3 |
| OVEX | 80-33-1 |
| 7-OXABICYCLO[2.2.1]HEPTANE-2,3-DICARBOXYLIC ACID, COMPD. WITH N,N-DIMETHYLCOCOAMINE (1:1) | 66330-88-9 |
| 7-OXABICYCLO[2.2.1]HEPTANE-2,3-DICARBOXYLIC ACID, DISODIUM SALT | 129-67-9 |
| OXADIXYL (SAN 371F) | 77732-09-3 |
| OXALIC ACID | 144-62-7 |
| OXAMYL | 23135-22-0 |
| 1,4-OXATHIIN-3-CARBOXAMIDE, 5,6-DIHYDRO-2-METHYL-N-PHENYL-, 4,4-DIOXIDE | 5259-88-1 |
| OXINE BENZOATE | 7091-57-8 |
| OXIRANE, 2-DECYL-3-(5-METHYLHEXYL)-, CIS- | 29804-22-6 |
| OXIRANE, METHYL-, POLYMER WITH OXIRANE, COMPD. WITH IODINE | 26617-87-8 |
| OXIRANE, METHYL-, POLYMER WITH OXIRANE, MONOBUTYL ETHER, COMPD. WITH IODINE | 68610-00-4 |
| OXYDEMETON METHYL | 301-12-2 |
| OXYDIAZON | 19666-30-9 |
| (OXYDIETHYLENEGLYCOL)BIS(COCO ALKYL)DIMETHYL AMMONIUM CHLORIDE | 68607-28-3 |
| OXYFLUORFEN | 42874-03-3 |
| OXYTETRACYCLINE HYDROCHLORIDE (INTERNAL USE) | 2058-46-0 |
| 2,3-P-DIOXANEDITHIOL S,S-BIS(O,O-DIETHYL PHOSPHORODITHIOATE) | 78-34-2 |
| 2-(P-HYDROXYPHENYL)GLYOXYLOHYDROXYMOYL CHLORIDE | 34911-46-1 |
| P-TERT-AMYLPHENOL | 80-46-6 |
| P-TERT-AMYLPHENOL, POTASSIUM SALT | 53404-18-5 |
| PACLOBUTRAZOL | 76738-62-0 |
| PARABENS | 94-13-3 |
| PARAFORMALDEHYDE | 30525-89-4 |
| PARAQUAT | 1910-42-5 |
| PARAQUAT METHOSULFATE | 2074-50-2 |
| PARATHION | 56-38-2 |
| PEBULATE | 1114-71-2 |
| PENDIMETHALIN | 40487-42-1 |
| PENTACHLOROPHENOL | 87-86-5 |
| 2,3,4,5,6-PENTAHYDROXYHEXANOIC ACID | 526-95-4 |
| PENTANE | 109-66-0 |
| 1-PENTANETHIOL | 110-66-7 |
| PERACETIC ACID | 79-21-0 |
| PERBORIC ACID, SODIUM SALT, MONOHYDRATE | 10332-33-9 |
| PERFLUIDONE | 37924-13-3 |
| PERMETHRIN | 52645-53-1 |
| PEROXYCARBONIC ACID, TETRATHIO-, DISODIUM SALT | 7345-69-9 |
| PEROXYMONOSULFURIC ACID, MONOPOTASSIUM SALT | 10058-23-8 |
| PERTHANE | 72-56-0 |
| PETROLEUM DISTILLATES | 8002-05-9 |
| 1-PHENANTHRENEMETHANAMINE, 1,2,3,4,4A,9,10,10A-OCTAHYDRO-1,4A-DIMETHYL-7- . . . | 1446-61-3 |
| PHENMEDIPHAM | 13684-63-4 |
| PHENOL | 108-95-2 |
| PHENOL, 2-(1-METHYLPROPYL)-4,6-DINITRO-, COMPD. WITH 2,2',2"-NITRILOTRIS[ETHANOL] (1:1) | 6420-47-9 |
| PHENOL, 2-(1-METHYLPROPYL)-4,6-DINITRO-, SODIUM SALT | 35040-03-0 |
| PHENOL, 2-METHOXY-5-N1TRO-, SODIUM SALT | 67233-85-6 |
| PHENOL, 2-N1TRO-, SODIUM SALT | 824-39-5 |
| PHENOL, 3-(1-METHYLETHYL)-, METHYLCARBAMATE | 64-00-6 |
| PHENOL, 4-(1,1-DIMETHYLPROPYL)-, SODIUM SALT | 31366-95-7 |
| PHENOL, 4-CHLORO-2-(PHENYLMETHYL)-, POTASSIUM SALT | 35471-49-9 |
| PHENOL, 4-CHLORO-2-(PHENYLMETHYL)-, SODIUM SALT | 3184-65-4 |
| PHENOL, 4-NITRO-3-(TRIFLUOROMETHYL)- | 88-30-2 |
| PHENOL, METHYL-, POTASSIUM SALT | 12002-51-6 |
| PHENOTHRIN | 26002-80-2 |

TABLE 2-continued

List Of Registered Pesticides (Chemical Name)

| | CAS Registry Number (or EDF Substance ID) |
|---|---|
| PHENTHOATE | 2597-03-7 |
| 1-PHENYL-2-ETHANOL | 60-12-8 |
| PHENYLMERCURIC ACETATE | 62-38-4 |
| 2-PHENYLPHENOL | 90-43-7 |
| PHEROMONE: GRAPE BERRY MOTH | 16974-11-1 |
| PHORATE | 298-02-2 |
| PHOSACETIM | 4104-14-7 |
| PHOSALONE | 2310-17-0 |
| PHOSPHAMIDON | 13171-21-6 |
| PHOSPHINE | 7803-51-2 |
| PHOSPHINIC ACID, COMPD. WITH 2-(4-THIAZOLYL)-1H-BENZIMID AZOLE (1:1) | 28558-32-9 |
| PHOSPHORIC ACID | 7664-38-2 |
| PHOSPHORIC ACID, BIS(2-ETHYLHEXYL) ESTER, COMPD. WITH 2,2'-(COCO ALKYLIMINO)BIS[ETHANOL] | 68649-38-7 |
| PHOSPHORIC ACID, DIOCTYL ESTER, COMPD. WITH 2,2'-(DODECYLIMINO)BIS(ETHANOL) (1:1) | 68961-66-0 |
| PHOSPHORIC ACID, IRON(3+) SALT (1:1) | 10045-86-0 |
| PHOSPHORIC ACID, MONO(2-ETHYLHEXYL) ESTER | 1070-03-7 |
| PHOSPHORIC ACID, MONO(2-ETHYLHEXYL)ESTER, COMPDS. WITH DIETHANOLAMINE N-COCO ALKYL DERIVS. (1:1) | 120579-32-0 |
| PHOSPHORIC ACID, MONOOCTYL ESTER, COMPD. WITH 2,2'-(DODECYLIMINO)BIS(ETHANOL) (1:1) | 125091-04-5 |
| PHOSPHOROTHIOIC ACID, O-[5-CHLORO-1-( 1-METHYLETHYL)-1H-1,2,4-TRIAZOL-3-YL] O,O-DIETHYL ESTER | 42509-80-8 |
| PHOSPHORUS (YELLOW OR WHITE) | 7723-14-0 |
| PHOSPHORUS PENTOXIDE | 1314-56-3 |
| PICLORAM | 1918-02-1 |
| PICLORAM TRIETHYLAMINE SALT | 35832-11-2 |
| PIPERALIN | 3478-94-2 |
| PIPERAZINE DIHYDROCHLORIDE | 142-64-3 |
| PIPERINE | 94-62-2 |
| PIPERONYL BUTOXIDE | 51-03-6 |
| PIRIMICARB | 23103-98-2 |
| PIRIMIFOS-ETHYL | 23505-41-1 |
| PIRIMIPHOS METHYL | 29232-93-7 |
| 2-PIVALYL-1,3-INDANDIONE (PINDONE) | 83-26-1 |
| POLY(DIMETHYLDIALLYLAMMINIUM CHLORIDE) | 26062-79-3 |
| POLY(IMINOCARBONIMIDOYLIMINOCARBONIMIDOYLIMINO-1,6-HEXANEDIYL), HYDROCHLORIDE | 32289-58-0 |
| POLY(OXY-1,2-ETHANEDIYL), .ALPHA.-(NONYLPHENYL)-.OMEGA.-HYDROXY-, COMPD. WITH IODINE | 11096-42-7 |
| POLY(OXY-1,2-ETHANEDIYL), .ALPHA.-ISOOCTADECYL-.OMEGA.-HYDROXY- | 52292-17-8 |
| POLY(OXY-1,2-ETHANEDIYL), .ALPHA.-[4-(1,1,3,3-TETRAMETHYLBUTYL)PHENYL]-.OMEGA.-HYDROXY-, COMPD. WITH IODINE | 53404-04-9 |
| POLY(OXYMETHYLENE), .ALPHA.-(1H,3H,5H-OXAZOLO[3,4-C]OXAZOL-7A(7H)-YLMETHYL)-.OMEGA.-HYDROXY- | 56709-13-8 |
| POLYCHLORINATED TERPHENYLS | 61788-33-8 |
| (POLYETHYL)BENZENES | 64742-94-5 |
| POLYOXYETHYLENE (20) SORBITAN MONOLAURATE | 9005-64-5 |
| POLYVINYL PYRROLIDONE | 9003-39-8 |
| POLY[OXY(METHYL-1,2-ETHANEDIYL)], .ALPHA.-BUTYL-.OMEGA.-HYDROXY- | 9003-13-8 |
| POTASSIUM BROMIDE | 7758-02-3 |
| POTASSIUM CHROMATE | 7789-00-6 |
| POTASSIUM CYANIDE | 151-50-8 |
| POTASSIUM DICHLORO ISOCYANURATE | 2244-21-5 |
| POTASSIUM DICHROMATE | 7778-50-9 |
| POTASSIUM DIMETHYLDITHIOCARBAMATE | 128-03-0 |
| POTASSIUM HYDROXIDE | 1310-58-3 |
| POTASSIUM HYROXYMETHYL-N-METHYL-DITHIOCARBAMATE | 51026-28-9 |
| POTASSIUM IODIDE | 7681-11-0 |
| POTASSIUM IODIDE (K(13)) | 12298-68-9 |
| POTASSIUM N-METHYLDITHIOCARBAMATE | 137-41-7 |
| POTASSIUM NITRATE | 7757-79-1 |
| POTASSIUM PERMANGANATE | 7722-64-7 |
| POTASSIUM PYROPHOSPHATE | 7320-34-5 |
| POTASSIUM SALT OF ETHYLENEDIAMINETETRAACETIC ACID | 7379-27-3 |
| POTASSIUM SOAP OF TALL OIL FATTY ACIDS (C18) | 61790-44-1 |
| POTASSIUM SORBATE | 590-00-1 |
| PRALLETHRIN (ETOC) | 23031-36-9 |
| PRIMISULFURON-METHYL | 86209-51-0 |
| PRODIAMINE (RYDEX) | 29091-21-2 |
| PROFENOFOS | 41198-08-7 |
| PROFLURALIN | 26399-36-0 |
| PROHEXADIONE CALCIUM | 127277-53-6 |

TABLE 2-continued

List Of Registered Pesticides (Chemical Name)

| | CAS Registry Number (or EDF Substance ID) |
|---|---|
| PROMETON | 1610-18-0 |
| PROMETRYN | 7287-19-6 |
| PROMEXAL (MTI) | 82633-79-2 |
| PRONAMIDE | 23950-58-5 |
| PROPACHLOR | 1918-16-7 |
| PROPAMOCARB HYDROCHLORIDE | 25606-41-1 |
| 1,3-PROPANEDIOL, 2-ETHYL-2-NITRO- | 597-09-1 |
| 1,2,3-PROPANETRICARBOXYLIC ACID, 2-HYDROXY-, COPPER SALT | 10402-15-0 |
| 1,2,3-PROPANETRIOL TRI(12-HYDROXYSTEARATE) | 8001-78-3 |
| PROPANIL | 709-98-8 |
| PROPANOIC ACID, 2-(2,4,5-TRICHLOROPHENOXY)-, COMPD. WITH 2,2',2"-NITRILOTRIS[ETHANOL] (1:1) | 17369-89-0 |
| PROPANOIC ACID, 2-(2,4,5-TRICHLOROPHENOXY)-, COMPD. WITH N-METHYLMETHANAMINE (1:1) | 55617-85-1 |
| PROPANOIC ACID, 2-(2,4,5-TRICHLOROPHENOXY)-, POTASSIUM SALT | 2818-16-8 |
| PROPANOIC ACID, 2-(2,4-DICHLOROPHENOXY)-, 2-BUTOXYETHYL ESTER | 53404-31-2 |
| PROPANOIC ACID, 2-(2,4-DICHLOROPHENOXY)-, COMPD. WITH N-METHYLMETHANAMINE (1:1) | 53404-32-3 |
| PROPANOIC ACID, 2-(2,4-DICHLOROPHENOXY)-, ISOOCTYL ESTER | 28631-35-8 |
| PROPANOIC ACID, 2-(4-CHLORO-2-METHYLPHENOXY)-, (R)- | 16484-77-8 |
| PROPANOIC ACID, 2-(4-CHLORO-2-METHYLPHENOXY)-, COMPD. WITH 2,2'-IMINOBIS[ETHANOL] (1:1) | 1432-14-0 |
| PROPANOIC ACID, 2-(4-CHLORO-2-METHYLPHENOXY)-, COMPD. WITH N-METHYLMETHANAMINE (1:1) | 32351-70-5 |
| PROPANOIC ACID, 2-(4-CHLORO-2-METHYLPHENOXY)-, ISOOCTYL ESTER | 28473-03-2 |
| PROPANOIC ACID, 2-(4-CHLORO-2-METHYLPHENOXY)-, POTASSIUM SALT | 1929-86-8 |
| PROPANOIC ACID, 2-HYDROXY-, (S)- | 79-33-4 |
| PROPANOIC ACID, 2-PHENYLETHYL ESTER | 122-70-3 |
| PROPANOIC ACID, 2-[4-[(6-CHLORO-2-BENZOXAZOLYL)OXY]PHENOXY]-, ETHYL ESTER, (R)- | 71283-80-2 |
| PROPANOIC ACID, 2-[4-[[5-(TRIFLUOROMETHYL)-2-PYRIDINYL]OXY]PHENOXY]-, BUTYL ESTER, (R)- | 79241-46-6 |
| 1-PROPANOL, 2-[(HYDROXYMETHYL)AMINO]-2-METHYL- | 52299-20-4 |
| 2-PROPANONE, 1,1,1,3,3,3-HEXACHLORO- | 116-16-5 |
| PROPARGITE | 2312-35-8 |
| PROPAZINE | 139-40-2 |
| 2-PROPEN-1-OL, 3-PHENYL- | 104-54-1 |
| 2-PROPENAL, 3-PHENYL- | 104-55-2 |
| 2-PROPENOIC ACID, 2-METHYL-, METHYL ESTER = STANNANE, TRIBUTYLMEACRYLATE | 26354-18-7 |
| 2-PROPENOIC ACID, 3-(4-METHOXYPHENYL)-, 2-ETHOXYETHYL ESTER | 104-28-9 |
| PROPETAMPHOS | 31218-83-4 |
| PROPHAM | 122-42-9 |
| PROPICONAZOLE | 60207-90-1 |
| PROPIONIC ACID | 79-09-4 |
| PROPOXUR | 114-26-1 |
| PROPYLENE GLYCOL | 57-55-6 |
| PROPYLENE OXIDE | 75-56-9 |
| PROSULFURON (CGA-152005) | 94125-34-5 |
| PYMETROZINE | 123312-89-0 |
| PYRACLOSTROBIN | 175013-18-0 |
| PYRETHRUM | 8003-34-7 |
| PYRIDABEN | 96489-71-3 |
| 3,6-PYRIDAZINEDIONE, 1,2-DIHYDRO-, MONOPOTASSIUM SALT | 28382-15-2 |
| PYRIDINE | 110-86-1 |
| PYRIDINE, 4-AMINO- | 504-24-5 |
| 3-PYRIDINECARBOXYLIC ACID, 2-[4,5-DIHYDRO-4-METHYL-4-(1-METHYLETHYL)-5-OXO-1H-IMIDAZOL-2-YL]-, COMPD. WITH 2-PROPANAMINE(1:1) | 81510-83-0 |
| 3-PYRIDINECARBOXYLIC ACID, 2-[4,5-DIHYDRO-4-METHYL-4-(1-METHYLETHYL)-5-OXO-1H-IMIDAZOL-2-YL]-5-(METHOXYMETHYL)- | 114311-32-9 |
| 3-PYRIDINECARBOXYLIC ACID, 2-[4,5-DIHYDRO-4-METHYL-4-(1-METHYLETHYL)-5-OXO-1H-IMIDAZOL-2-YL]-5-ETHYL-, MONOAMMONIUM SALT | 101917-66-2 |
| 2-PYRIDINECARBOXYLIC ACID, 4-AMINO-3,5,6-TRICHLORO-, COMPD.WITH 1,1',1"-NITRILOTRIS[2-PROPANOL] (1:1) | 6753-47-5 |
| 2-PYRIDINECARBOXYLIC ACID, 4-AMINO-3,5,6-TRICHLORO-, ISOOCTYL ESTER | 26952-20-5 |
| 2-PYRIDINECARBOXYLIC ACID, 4-AMINO-3,5,6-TRICHLORO-, MONOPOTASSIUM SALT | 2545-60-0 |
| PYRITHIOBAC-SODIUM | 123343-16-8 |
| 2-PYRROLIDINONE, 1-ETHENYL-, HOMOPOLYMER, COMPD. WITH IODINE | 25655-41-8 |
| QUATERNARY AMMONIUM COMPOUNDS, BENZYL-C10-18-ALKYLBIS(HYDROXYETHYL), CHLORIDES | 91721-81-2 |
| QUATERNARY AMMONIUM COMPOUNDS, BENZYL-C12-18-ALKYLDIMETHYL, SALTS WITH 1,2-BENZISOTHIAZOL-3(2H)-ONE 1,1-DIOXIDE (1:1) | 68989-01-5 |

TABLE 2-continued

List Of Registered Pesticides (Chemical Name)

| | CAS Registry Number (or EDF Substance ID) |
|---|---|
| QUATERNARY AMMONIUM COMPOUNDS, BENZYLCOCO ALKYLDIMETHYL, CHLORIDES | 61789-71-7 |
| QUATERNARY AMMONIUM COMPOUNDS, BENZYLDI-C12-18-ALKYLMETHYL, CHLORIDES | 73049-75-9 |
| QUATERNARY AMMONIUM COMPOUNDS, C12-14-ALKYL[(ETHYLPHENYL)METHYL]DIMETHYL, CHLORIDES | 85409-23-0 |
| QUATERNARY AMMONIUM COMPOUNDS, C12-16-ALKYL[(DICHLOROPHENYL)METHYL]DIMETHYL, CHLORIDES | 68989-02-6 |
| QUATERNARY AMMONIUM COMPOUNDS, C12-18-ALKYLDIMETHYLETHYLBENZYL, CHLORIDES | 8045-21-4 |
| QUATERNARY AMMONIUM COMPOUNDS, C14-18-ALKYLETHYLDIMETHYL | 134595-54-3 |
| QUATERNARY AMMONIUM COMPOUNDS, C14-18-ALKYLTRIMETHYL, BROMIDES | 68424-92-0 |
| QUATERNARY AMMONIUM COMPOUNDS, C14-18-ALKYLTRIMETHYL, CHLORIDES | 68002-63-1 |
| QUATERNARY AMMONIUM COMPOUNDS, C16-18-ALKYLTRIMETHYL, CHLORIDES | 68002-62-0 |
| QUATERNARY AMMONIUM COMPOUNDS, DI-C8-18-ALKYLDIMETHYL, CHLORIDES | 73398-64-8 |
| QUINCLORAC (FACET) | 84087-01-4 |
| 3-QUINOLINECARBOXYLIC ACID, 2-[4,5-DIHYDRO-4-METHYL-4-(1-METHYLETHYL)-5-OXO-1H-IMIDAZOL-2-YL]-, MONOAMMONIUM SALT | 81335-47-9 |
| 3-QUINOLINECARBOXYLIC ACID, 2-[4,5-DIHYDRO-4-METHYL-4-(1-METHYLETHYL)-5-OXO-1H-IMIDAZOL-2-YL]-, SODIUM SALT | 81335-46-8 |
| QUINONE | 106-51-4 |
| QUINTOZENE | 82-68-8 |
| QUIZALOFOP P-ETHYL | 100646-51-3 |
| QUIZALOFOP-ETHYL | 76578-14-8 |
| RESIN ACIDS AND ROSIN ACIDS, COPPER SALTS | 9007-39-0 |
| RESMETHRIN | 10453-86-8 |
| RIMSULFURON (DPX-E9636) | 122931-48-0 |
| RONNEL | 299-84-3 |
| ROTENONE, COMMERCIAL | 83-79-4 |
| (RS)-2-(3,5-DICHLOROPHENYL)-2-(2,2,2-TRICHLOROETHYL)OXIRANE | 58138-08-2 |
| (RS)-2-METHYL-1-PYRIMIDIN-5-YL-1-(4-TRIFLUOROMETHOXY)PHENYLPROPAN--2-OL | 56425-91-3 |
| (RS)-SEC-BUTYLAMINE | 13952-84-6 |
| (4RS,5RS)-5-(4-CHLOROPHENYL)-N-CYCLOHEXYL-4-METHYL-2-OXO-1,3-THIA-ZOLIDINE-3-CARBOXAMIDE | 78587-05-0 |
| RYANODINE | 15662-33-6 |
| (S)-ALPHA-CYANO-3-PHENOXYBENZYL (1R)-CIS-2,2-DIMETHYL-3-((RS)-1,2,2,2-TETRABROMOETHYL)-CYCLOPROPA- NECARBOXYLATE | 66841-25-6 |
| S,S,S-TRIBUTYLTRITHIOPHOSPHATE | 78-48-8 |
| SABADILLA | 8051-02-3 |
| SEC-BUTYL ALCOHOL | 78-92-2 |
| SESONE | 136-78-7 |
| SETHOXYDIM | 74051-80-2 |
| SIDURON | 1982-49-6 |
| SILICA GEL | 63231-67-4 |
| SILICA, AMORPHOUS | 61790-53-2 |
| SILICA, AMORPHOUS HYDRATED | 7631-86-9 |
| SILICIC ACID (H2SlO3), DISODIUM SALT | 6834-92-0 |
| SILVER | 7440-22-4 |
| SILVER NITRATE | 7761-88-8 |
| SILVER OXIDE (AG4O4) | 155645-89-9 |
| SIMAZINE | 122-34-9 |
| SODIUM 4,6-DINITRO-O-CRESOL | 2312-76-7 |
| SODIUM ALKYL ARYL SULFONATE | 68411-30-3 |
| SODIUM ARSENATE | 13464-38-5 |
| SODIUM ARSENITE | 7784-46-5 |
| SODIUM AZIDE | 26628-22-8 |
| SODIUM BENZOATE | 532-32-1 |
| SODIUM BICARBONATE | 144-55-8 |
| SODIUM BICHROMATE | 10588-01-9 |
| SODIUM BISULFATE | 7681-38-1 |
| SODIUM BISULFITE | 7631-90-5 |
| SODIUM BROMIDE | 7647-15-6 |
| SODIUM CACODYLATE | 124-65-2 |
| SODIUM CARBONATE | 497-19-8 |
| SODIUM CHLORATE | 7775-09-9 |
| SODIUM CHLORIDE | 7647-14-5 |
| SODIUM CHLORITE | 7758-19-2 |
| SODIUM CHROMATE | 7775-11-3 |
| SODIUM CYANIDE | 143-33-9 |
| SODIUM DEHYDROACETATE | 4418-26-2 |
| SODIUM DICAMBA | 1982-69-0 |
| SODIUM DICHLORO-S-TRIAZINETRIONE | 2893-78-9 |

TABLE 2-continued

List Of Registered Pesticides (Chemical Name)

| | CAS Registry Number (or EDF Substance ID) |
|---|---|
| SODIUM DIMETHYLDITHIOCARBAMATE | 128-04-1 |
| SODIUM DODECYLBENZENE SULFONATE | 25155-30-0 |
| SODIUM FLUORIDE | 7681-49-4 |
| SODIUM FLUOSILICATE | 16893-85-9 |
| SODIUM HEXAMETAPHOSPATE | 10124-56-8 |
| SODIUM HYDROSULFIDE | 16721-80-5 |
| SODIUM HYPOCHLORITE | 7681-52-9 |
| SODIUM LAURYL SULFATE | 151-21-3 |
| SODIUM METABISULFITE | 7681-57-4 |
| SODIUM METABORATE | 7775-19-1 |
| SODIUM NITRATE | 7631-99-4 |
| SODIUM NITRITE | 7632-00-0 |
| SODIUM OMADINE | 15922-78-8 |
| SODIUM PENTACHLOROPHENATE | 131-52-2 |
| SODIUM PERCARBONATE | 15630-89-4 |
| SODIUM PHENATE | 139-02-6 |
| SODIUM PHOSPHATE, MONOBASIC | 7558-80-7 |
| SODIUM PHOSPHATE, TRIBASIC | 7601-54-9 |
| SODIUM SESQUICARBONATE | 533-96-0 |
| SODIUM SILICATE | 1344-09-8 |
| SODIUM SULFIDE (NA2S) | 1313-82-2 |
| SODIUM TRIPOLYPHOSPHATE | 7758-29-4 |
| SODIUM-2-PYRIDINETHIOL-1-OXIDE | 3811-73-2 |
| SODIUM-P-TOLUENESULPHONCHLORAMIDE | 127-65-1 |
| SOLVENT NAPHTHA (PETROLEUM), LIGHT ALIPHATIC | 64742-89-8 |
| SOLVENT NAPHTHA (PETROLEUM), MEDIUM ALIPHATIC | 64742-88-7 |
| SPIRO[11-OXABICYCLO[8.1.0]UNDEC-6-ENE-2,2'-OXIRAN]-3-ONE, 8-METHYLENE-5-(1-METHYLETHYL)-, [1R-(1R*,2R*,5S*,6E,10R*)]- | 61228-92-0 |
| SQUALANE | 111-01-3 |
| STANNANE, (ACETYLOXY)TRIBUTYL- | 56-36-0 |
| STANNANE, TRIBUTYL[(1-OXO-2-PROPENYL)OXY]- | 13331-52-7 |
| STANNANE, TRIBUTYL[(1-OXO-9,12-OCTADECAD | 24124-25-2 |
| STANNANE, TRIBUTYL[(1-OXONEODECYL)OXY]- | 28801-69-6 |
| STANNANE, TRIBUTYL[[2-[(TRIBUTYLSTANNYL)OXY]BENZOYL]OXY]- | 22330-14-9 |
| STANNANE, TRIBUTYL[[[1,2,3,4,4A,4B,5,6,1 | 26239-64-5 |
| STIROFOS | 22248-79-9 |
| STODDARD SOLVENT | 8052-41-3 |
| STREPTOMYCIN | 57-92-1 |
| STREPTOMYCIN SULFATE | 3810-74-0 |
| STRYCHNINE | 57-24-9 |
| STRYCHNINE, SULFATE | 60-41-3 |
| SUCROSE | 57-50-1 |
| SULFACETAMIDE | 144-80-9 |
| SULFALLATE | 95-06-7 |
| SULFAMIC ACID | 5329-14-6 |
| SULFAQUINOXALINE | 59-40-5 |
| SULFENTRAZONE | 122836-35-5 |
| SULFLURAMID | 4151-50-2 |
| SULFOMETURON METHYL | 74222-97-2 |
| SULFONAMIDE | 63-74-1 |
| 1-(4-SULFOPHENYL)-4-((4-SULFOPHENYL)AZO)-1H-PYRAZOLE-3-CARBOXYLIC | 1934-21-0 |
| SULFOSULFURON [MON 31500] | 141776-32-1 |
| SULFOTEP | 3689-24-5 |
| SULFOXIDE | 120-62-7 |
| SULFUR | 7704-34-9 |
| SULFUR DIOXIDE | 7446-09-5 |
| SULFURIC ACID | 7664-93-9 |
| SULFURIC ACID, COPPER(2+) SALT (1:1), PENTAHYDRATE | 7758-99-8 |
| SULFURIC ACID, IRON(2+) SALT (1:1), HEPTAHYDRATE | 7782-63-0 |
| SULFURIC ACID, IRON(2+) SALT (1:1), MONOHYDRATE | 17375-41-6 |
| SULFURIC ACID, ZINC SALT (1:1), MONOHYDRATE | 7446-19-7 |
| SULFURYL FLUORIDE | 2699-79-8 |
| SULPROFOS | 35400-43-2 |
| SUMILARV (PYRIPROXYFEN) | 95737-68-1 |
| 2,4,5-T | 93-76-5 |
| 2,4,5-T COMPOUND WITH N-METHYLMETHANAMINE (1:1) | 6369-97-7 |
| 2,4,5-T ESTERS | 93-79-8 |
| 2,4,5-T TRIETHYLAMINE SALT | 2008-46-0 |
| TAR ACIDS, COAL, CRUDE | 65996-85-2 |
| TCMTB | 21564-17-0 |
| TEBUCONAZOLE (FOLICUR) | 107534-96-3 |
| TEBUFENOZIDE | 112410-23-8 |
| TEBUPIRIMFOS | 96182-53-5 |
| TEBUTHIURON | 34014-18-1 |

TABLE 2-continued

List Of Registered Pesticides (Chemical Name)

| | CAS Registry Number (or EDF Substance ID) |
|---|---|
| TECNAZENE | 117-18-0 |
| TEFLUTHRIN | 79538-32-2 |
| TEMEPHOS | 3383-96-8 |
| TEPP | 107-49-3 |
| TEPRALOXYDIM | 149979-41-9 |
| TERBACIL | 5902-51-2 |
| TERBUFOS | 13071-79-9 |
| TERRAZOLE | 2593-15-9 |
| TERT-BUTYL ALCOHOL | 75-65-0 |
| 2,4,11,13-TETRAAZATETRADECANEDIIMIDAMIDE, N,N''-BIS(4-CHLOROPHENYL)-3,12-DIIMINO-, DIACETATE | 56-95-1 |
| TETRACAINE HYROCHLORIDE | 136-47-0 |
| 1,1,2,2-TETRACHLOROETHANE | 79-34-5 |
| TETRACHLOROETHYLENE | 127-18-4 |
| 2,3,4,6-TETRACHLOROPHENOL,POTASSIUM SALT | 53535-27-6 |
| 2,3,4,6-TETRACHLOROPHENOL,SODIUM SALT | 25567-55-9 |
| TETRACHLOROPHENOLS | 25167-83-3 |
| TETRACHLORVINPHOS | 961-11-5 |
| 1-TETRADECANAMINIUM, N-ETHYL-N,N-DIMETHYL-, BROMIDE | 68527-84-4 |
| 11-TETRADECEN-1-OL, (E)- | 35153-18-5 |
| 11-TETRADECEN-1-OL, ACETATE, (E)- | 33189-72-9 |
| 11-TETRADECEN-1-OL, ACETATE, (Z)- | 20711-10-8 |
| TETRADIFON | 116-29-0 |
| TETRAGLYCINE HYDROPERIODIDE | 7097-60-1 |
| 1,2,3,6-TETRAHYDRO-3,6-DIOXOPYRIDAZINE | 123-33-1 |
| 1,2,3,4-TETRAHYDRONAPHTHALENE | 119-64-2 |
| TETRAIODOETHYLENE | 513-92-8 |
| TETRAMETHRIN | 7696-12-0 |
| (1,1,3,3-TETRAMETHYLBUTYL)PHENOL | 27193-28-8 |
| TETRASODIUM PYROPHOSPHATE | 7722-88-5 |
| TETRASUL | 2227-13-6 |
| THIABENDAZOLE | 148-79-8 |
| THIAFLUAMIDE (FOE 5043) | 142459-58-3 |
| THIAMETHOXAM | 153719-23-4 |
| THIAZOPYR (MON 13200) | 117718-60-2 |
| THIDIAZURON | 51707-55-2 |
| THIOBENCARB | 28249-77-6 |
| 2,2'-THIOBIS(4,6-DICHLORO)PHENOL | 97-18-7 |
| 1,1'-THIOBISETHANE | 352-93-2 |
| THIODICARB | 59669-26-0 |
| THIOPHANATE ETHYL | 23564-06-9 |
| THIOPHANATE-METHYL | 23564-05-8 |
| THIRAM | 137-26-8 |
| THPS | 55566-30-8 |
| THYMOL | 89-83-8 |
| TOLUENE | 108-88-3 |
| TORAK | 10311-84-9 |
| 2,4,5-TP ACID (SILVEX) | 93-72-1 |
| TRALKOXYDIM | 87820-88-0 |
| 1-TRIACONTANOL | 593-50-0 |
| TRIADIMEFON | 43121-43-3 |
| TRIADIMENOL (BAYTAN) | 55219-65-3 |
| TRIALLATE | 2303-17-5 |
| 3,5,7-TRIAZA-1-AZONIATRICYCLO[3.3.1.1(3,7)]DECANE, 1-METHYL-, CHLORIDE | 76902-90-4 |
| 3,5,7-TRIAZATRICYCLO[3.1.1.1(3,7)]DECANE, 1-(3-CHLORO-2-PROPENYL)-, CHLORIDE, (Z)- | 51229-78-8 |
| 1,3,5-TRIAZINE-1,3,5(2H,4H,6H)-TRIETHANOL (9CI) | 4719-04-4 |
| 1,3,5-TRIAZINE-2,4,6(1H,3H,5H)-TRIONE, 1,3-DICHLORO-, SODIUMSALT, DIHYDRATE | 51580-86-0 |
| 1,3,5-TRIAZINE-2,4,6-TRIAMINE, N,N',N''-TRICHLORO- | 7673-09-8 |
| 1,3,5-TRIAZINE-2,4-DIAMINE, 6-CHLORO-N-(1,1-DIMETHYLETHYL)-N'-ETHYL- | 5915-41-3 |
| 1,3,5-TRIAZINE-2,4-DIAMINE, N-(1,1-DIMETHYLETHYL)-N'-ETHYL-6-(METHYLTHIO)- | 886-50-0 |
| 1,3,5-TRIAZINE-2,4-DIAMINE, N-CYCLOPROPYL-N'-(1,1-DIMETHYLETHYL)-6-(METHYLTHIO)- | 28159-98-0 |
| TRIBENURON METHYL | 101200-48-0 |
| 3,4,5-TRIBRMOSALICYLANILIDE | 87-10-5 |
| TRIBUTYLTIN BENZOATE | 4342-36-3 |
| TRIBUTYLTIN CHLORIDE | 1461-22-9 |
| TRIBUTYLTIN FLUORIDE | 1983-10-4 |
| TRIBUTYLTIN METHACRYLATE | 2155-70-6 |
| TRICHLORFON | 52-68-6 |
| 1,3,5-TRICHLORO-1,3,5-TRIAZINE-2,4,6 (1H,3H,5H)-TRIONE | 87-90-1 |
| TRICHLOROACETIC ACID | 76-03-9 |

TABLE 2-continued

List Of Registered Pesticides (Chemical Name)

| | CAS Registry Number (or EDF Substance ID) |
|---|---|
| 1,2,4-TRICHLOROBENZENE | 120-82-1 |
| TRICHLOROBENZYL CHLORIDE | 1344-32-7 |
| 1,1,1-TRICHLOROETHANE | 71-55-6 |
| TRICHLOROETHYLENE | 79-01-6 |
| TRICHLOROFLUOROMETHANE | 75-69-4 |
| 2,4,5-TRICHLOROPHENOL | 95-95-4 |
| 2,4,6-TRICHLOROPHENOL | 88-06-2 |
| TRICLOCARBAN | 101-20-2 |
| TRICLOPYR (SALTS & ESTERS) | 55335-06-3 |
| TRICLOPYR TRIETHYLAMMONIUM SALT | 57213-69-1 |
| TRICLOSAN | 3380-34-5 |
| 9-TRICOSENE, (E)- | 35857-62-6 |
| TRICYCLOHEXYLTIN HYDROXIDE | 13121-70-5 |
| 4-TRIDECEN-1-OL, ACETATE, (E)- | 72269-48-8 |
| 4-TRIDECEN-1-OL, ACETATE, (Z)- | 65954-19-0 |
| TRIETHANOLAMINE | 102-71-6 |
| TRIETHANOLAMINE DODECYLBENZENESULFONATE | 27323-41-7 |
| TRIETHYLENE GLYCOL | 112-27-6 |
| TRIFLOXYSTROBIN | 141517-21-7 |
| TRIFLUMIZOLE | 68694-11-1 |
| TRIFLURALIN | 1582-09-8 |
| TRIFLUSULFURON-METHYL | 126535-15-7 |
| TRIFORINE | 26644-46-2 |
| TRIIODOBENZOIC ACID, 2,3,5- | 88-82-4 |
| TRIMETHACARB (BROOT) | 2686-99-9 |
| 2,6,6-TRIMETHYL-BICYCLO(3.1.1)HEPTANE, DIDEHYDRO DERIV. | 1330-16-1 |
| 2,6,6-TRIMETHYLBICYCLO(3.1.1)-2-HEPT-2-ENE | 80-56-8 |
| 2,3,5-TRIMETHYLPHENYL METHYLCARBAMATE | 2655-15-4 |
| TRINEXAPAC-ETHYL | 95266-40-3 |
| TRIPHENYLTIN HYDROXIDE | 76-87-9 |
| 1,1,1-TRIS(HYDROXYMETHYL)NITROMETHANE | 126-11-4 |
| TURPENTINE | 8006-64-2 |
| TURPENTINE GUM | 9005-90-7 |
| 10-UNDECENOIC ACID | 112-38-9 |
| UNICONAZOLE (PRUNIT) | 83657-17-4 |
| UPPER COAL TAR DISTILLATE | 65996-91-0 |
| UREA | 57-13-6 |
| VANCIDE TH | 7779-27-3 |
| VERNOLATE | 1929-77-7 |
| VINCLOZOLIN | 50471-44-8 |
| WARFARIN AND SALTS | 81-81-2 |
| WARFARIN SODIUM | 129-06-6 |
| WINTERGREEN OIL | 119-36-8 |
| XYLENE (MIXED ISOMERS) | 1330-20-7 |
| XYLENOL | 1300-71-6 |
| Z-8-DODECENYL ACETATE | 28079-04-1 |
| ZINC | 7440-66-6 |
| ZINC CHLORIDE FUME | 7646-85-7 |
| ZINC NAPHTHENATE | 12001-85-3 |
| ZINC OXIDE | 1314-13-2 |
| ZINC PHENOLSULFONATE | 127-82-2 |
| ZINC PHOSPHIDE | 1314-84-7 |
| ZINC SILICFLUORIDE | 16871-71-9 |
| ZINC STEARATE | 557-05-1 |
| ZINC SULFATE | 7733-02-0 |
| ZINC SULFATE (BASIC) | 68813-94-5 |
| ZINC, BIS(1-HYDROXY-2(1H)-PYRIDINETHIONATO-O,S)-, (T-4)- | 13463-41-7 |
| ZINEB | 12122-67-7 |
| ZIRAM | 137-30-4 |
| ZOXAMIDE | 156052-68-5 |

While this disclosure has been described in connection with what is presently considered to be practical exemplary embodiments, it is to be understood that the present invention is not limited to the disclosed embodiments, but, on the contrary, is intended to cover various modifications and equivalent arrangements. Thus it should be understood that various changes and modifications to the described embodiments herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A regenerative in situ oxidant producing method for the treatment of fertigation water, comprising:
flowing fertigation water containing organic matter through an electrochemical cell to effect regenerative mediated electrolysis, the electrochemical cell comprising a boron-doped diamond (BDD) anode and at least one complementary stainless steel cathode while simultaneously adjusting one or more of current density, flow rate and pH;

continuously regenerating oxidative species in an effective amount to control an oxidant-susceptible pathogen and/or degrade the organic matter thereby releasing solubilized nutrients in said fertigation water; and collecting the electrochemically treated fertigation water effluent, wherein chlorate species formed in said fertigation water effluent is below about 2 mg/L in said treated effluent; and/or ammonium, nitrate and sulphate ions are increased in said treated fertigation water effluent compared to the fertigation water before treatment.

2. The method of claim 1, wherein the oxidative species are selected from the group consisting of $O_2$, $O_3$, $H_2O_2$ and $OH^+$.

3. The method of claim 2, wherein the macronutrient content of the fertigation water remains substantially unaltered during treatment.

4. The method of claim 1, wherein said treatment method mineralizes and solubilizes organic matter thereby increasing levels of ammonium nutrient and nitrate nutrient.

5. The method of claim 1, wherein:
(a) the current density is about 0.76 $mA/cm^2$ to about 9.09 $mA/cm^2$, about 1.14 $mA/cm^2$, about 2.27 $mA/cm^2$, about 3.41 $mA/cm^2$, about 4.55 $mA/cm^2$, about 6.82 $mA/cm^2$ or about 9.09 $mA/cm^2$; and/or
(b) the pH of the fertigation water during treatment is about 5.4 to about 8.5 or about 5.5 to 6.5; and/or
(c) the flow rate is selected to provide a residence time in the electrochemical cell of up to about 30 minutes.

6. The method of claim 1, wherein the method is conducted at about room temperature and/or conducted under ambient light.

7. The method of claim 1, wherein the oxidant-susceptible pathogen is selected from fungi, bacteria, viruses, oocymetes, and mycoplasmas.

8. The method of claim 1, wherein said fertigation water is derived from a municipal water source or an industrial water source.

9. The method of claim 1, wherein the fertigation water comprises organic waste, compost, guano, sewage, manure, bone meal, soya meal, kelp extract, plant leaves, plant roots, wood debris or combinations thereof.

10. The method of claim 1, further comprising re-using the treated effluent and re-treating said re-used effluent.

11. The method of claim 1, wherein said treatment method degrades a recalcitrant organic contaminant in said fertigation water.

12. The method of claim 1, wherein said treated effluent comprises one or more of stable levels of oxidative species, increased stable nutrient levels, mineralized species derived from organic matter, and chlorate species levels less than about 2 mg/L.

13. A regenerative in situ oxidant generating method for the treatment of fertigation water, comprising:

flowing fertigation water containing organic species including a pesticide through an electrochemical cell to effect regenerative mediate electrolysis, the electrochemical cell comprising at least one anode and at least one complementary cathode while simultaneously adjusting one or more of current density, flow rate and pH, wherein said flowing of said fertigation water continuously regenerates an oxidative species in an effective amount to degrade said pesticide in said fertigation water; and collecting the electrochemically treated fertigation water effluent, wherein chlorate species formed in said fertigation water is below about 2 mg/L.

14. The method of claim 13, wherein the at least one anode is a boron-doped diamond (BDD) electrode that continuously produces reactive oxidative species selected from the group consisting of $O_2$, $O_3$, $H_2O_2$ and $OH^-$.

15. The method of claim 13, wherein:
(a) the current density is about 0.76 $mA/cm^2$ to about 9.09 $mA/cm^2$, about 1.14 $mA/cm^2$, about 2.27 $mA/cm^2$, about 3.41 $mA/cm^2$, about 4.55 $mA/cm^2$, about 6.82 $mA/cm^2$ or about 9.09 $mA/cm^2$; and/or
(b) the pH of the fertigation water during treatment is about 5.4 to about 8.5 or about 5.5 to about 6.5; and/or
(c) the flow rate is selected to provide a treatment residence time in the electrochemical cell of up to about 30 minutes; and/or
(d) the method is conducted at about room temperature and/or is conducted under ambient light.

16. The method of claim 13, wherein the pesticide is an organophosphate pesticide or a carbamate pesticide.

17. The method of claim 16, wherein the pesticide comprises glyphosate or paclobutrazol.

18. The method of claim 13, wherein the pesticide is aminomethylphosphonic acid (AMPA).

19. The method of claim 13, wherein the fertigation water is contaminated with one or more herbicide, one or more plant growth regulator, or a combination thereof.

* * * * *